US011363627B2

(12) United States Patent
Cirik et al.

(10) Patent No.: US 11,363,627 B2
(45) Date of Patent: Jun. 14, 2022

(54) MULTIPLEXING AND/OR PRIORITIZATION OF UPLINK SIGNALS

(71) Applicant: Ofinno, LLC, Reston, VA (US)

(72) Inventors: Ali Cagatay Cirik, Herndon, VA (US); Esmael Hejazi Dinan, McLean, VA (US); Hua Zhou, Herndon, VA (US); Yunjung Yi, Vienna, VA (US); Alireza Babaei, Fairfax, VA (US); Youngwoo Kwak, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 17/478,612

(22) Filed: Sep. 17, 2021

(65) Prior Publication Data

US 2022/0007410 A1   Jan. 6, 2022

Related U.S. Application Data

(63) Continuation of application No. PCT/US2020/025380, filed on Mar. 27, 2020.

(60) Provisional application No. 62/825,781, filed on Mar. 28, 2019.

(51) Int. Cl.
*H04L 12/28* (2006.01)
*H04W 72/12* (2009.01)
*H04L 5/00* (2006.01)
*H04W 72/04* (2009.01)
*H04J 1/16* (2006.01)

(52) U.S. Cl.
CPC ....... *H04W 72/1289* (2013.01); *H04L 5/0051* (2013.01); *H04W 72/0446* (2013.01); *H04W 72/0453* (2013.01); *H04W 72/1273* (2013.01)

(58) Field of Classification Search
CPC .............. H04L 5/0053; H04W 72/042; H04W 72/1278
USPC ................................ 370/252, 329, 386, 503
See application file for complete search history.

(56) References Cited

U.S. PATENT DOCUMENTS

2020/0196346 A1* 6/2020 Khoshnevisan .. H04W 72/1289
2020/0305168 A1* 9/2020 Liou ...................... H04L 5/0053
2021/0045141 A1* 2/2021 Lee ........................ H04L 5/0053

OTHER PUBLICATIONS

R1-1903014; Comparison between SFN and other multi-TRP schemes for PDSCH Reliability; 3GPP TSG-RAN WG1 Meeting #96; Feb. 25-Mar. 1, 2019; Athens, Greece; Agenda item:7.2.8.6.
R1-1903043; 3GPP TSG-RAN WG1 Meeting #96R1-1903043; Feb. 25-Mar. 1, 2019 ; Athens, Greece Agenda item:7 2.8 2.
(Continued)

*Primary Examiner* — John Pezzlo
(74) *Attorney, Agent, or Firm* — Jacob L. Mangan; Kavon Nasabzadeh; Philip R. Smith

(57) ABSTRACT

A wireless device may receive, via a first control resource set (coreset) with a first coreset group index, downlink control information (DCI) scheduling a physical downlink shared channel (PDSCH) transmission. The wireless device may determine that a first quasi co-location (QCL) of the PDSCH transmission is different from a second QCL of a second coreset that overlaps in at least one symbol with the PDSCH transmission, and that the first coreset group index is the same as a second coreset group index of the second coreset. Based on the determining, the wireless device may receive the PDSCH transmission with the second QCL of the second coreset.

20 Claims, 28 Drawing Sheets

(56) References Cited

OTHER PUBLICATIONS

R1-1903044; Enhancements on Multi-beam Operation; 3GPP TSG-RAN WG1 Meeting #96 Athens, Greece, Feb. 25-Mar. 1, 2019; Agenda item:7.2.8.3; Source: Qualcomm Incorporated.
R1-1903046; 3GPP TSG RAN WG1 #96; Athens, Greece, Feb. 25-Mar. 1, 2019; Agenda Item:7.2.8.2 Source:ASUSTeK; Title: Enhancements on multiple TRP or panel transmission.
R1-1903047; 3GPP TSG RAN WG1 #96; Athens, Greece, Feb. 25-Mar. 1, 2019; Agenda Item:7.2.8.3 Source:ASUSTeK; Title: Enhancements on multi-beam operation.
R1-1903090; 3GPP TSG RAN WG1 Meeting #96; Athens, Greece, Feb. 25-Mar. 1, 2019; Agenda Item:7.2 8 6; Source:Huawei, HiSilicon; Title:UL/DL BM for latency/overhead reduction.
R1-1903093; 3GPP TSG RAN WG1 Meeting #96; Athens, Greece, Feb. 25-Mar. 1, 2019; Agenda Item:7.2 8 6; Source:Huawei, HiSilicon; Title:Beam failure recovery for SCell.
R1-1903099; 3GPP TSG RAN WG1 Meeting #96; Athens, Greece, Feb. 25-Mar. 1, 2019; Agenda Item:7.2 8 6; Source:Huawei, HiSilicon; Title:Single PDCCH based multi-TRP/panel transmission.
R1-1903100; 3GPP TSG RAN WG1 Meeting #96; Athens, Greece, Feb. 25-Mar. 1, 2019; Agenda Item:7.2 8 6; Source:Huawei, HiSilicon; Title:CSI measurement enhancement for multi-TRP/panel transmission.
R1-1903101; 3GPP TSG RAN WG1 meeting #96; Athens, Greece, Feb. 25-Mar. 1, 2019; Agenda Item:7.2 8 6; Source:Huawei, HiSilicon; Title:Reliability/robustness enhancement with multi-TRP/panel.
R1-1903105; 3GPP TSG RAN WG1 Meeting #96; Athens, Greece, Feb. 25-Mar. 1, 2019; Agenda Item:7.2.8.6; Source:Huawei, HiSilicon; Title:Discussion on CW to layer mapping in single-DCI based multi-TRP transmission.
R1-1903159; 3GPP TSG-RAN WG1 #96; Athens, Greece, Feb. 25-Mar. 1, 2019; Agenda item:7.2.8.3; Title: On Beam Failure Recovery for SCell; Source:Convida Wireless.
R1-1903244; 3GPP TSG RAN WG1 Meeting #96; Athens, Greece, Feb. 25-Mar. 1, 2019; Agenda item: 7.2.8.3; Source: LG Electronics; Title: Feature lead summary of Enhancements on Multi-beam Operations; Document for: Discussion and Decision.
R1-1903382; 3GPP TSG-RAN WG1 Meeting #96Tdoc; Athens, Feb. 25-Mar. 1, 2019; Agenda:7.1.2; Source:Ericsson; Title:Summary of draft CRs for beam management and QCL.
R1-1903541; 3GPP TSG RAN WG1 Meeting #96; Athens, Greece, Feb. 25-Mar. 1, 2019; Agenda Item:7.2.8.2; Source:Huawei, HiSilicon; Title:Summary of AI: 7.28.2 Enhancements on Multi-TRP/Panel Transmission of Offline Discussion.
R1-1903818; Summary of Fri offline discussion on intra-UE prioritization multiplexing in AI 7.2.6.4; 3GPP TSG-RAN WG1 #96; Athens, Greece, Feb. 25-Mar. 1, 2019; Agenda item:7.2.6.4; Source:Nokia, Nokia Shanghai Bell.
R1-1903766; Summary of Thurs offline discussion on intra-UE prioritization multiplexing in AI 7.2.6.4_v02; 3GPP TSG-RAN WG1 #96; Athens, Greece, Feb. 25-Mar. 1, 2019; Agenda item:7.2.6.4; Source:Nokia, Nokia Shanghai Bell.
R1-1809321; 3GPP TSG RAN WG1 Meeting #94; Gothenburg, Sweden, Aug. 20-24, 2018; Source: WILUS Inc. Title: Remaining Issues on PUCCH; Agenda item: 7 1.3.2; Document for: Discussion/Decision.
R1-1810879; 3GPP TSG RAN WG1 #94bis; Chengdu, China, Oct. 8-12, 2018; Agenda item: 7.2.6.1 Source: Samsung; Title: Layer 1 enhancements for URLLC; Document for: Discussion and Decision.
International Search Report and Written Opinion for International Application No. PCT/US/2020/025380, dated Jun. 17, 2020.
3GPP TSG RAN WG1 Meeting #95 R1-1814380; Spokane, USA, Nov. 12-16, 2018; CR-Form-v112 Change Request; Title: CR to 38.213 capturing the RAN1#94bis and RAN1#95 meeting agreements; Source to NG: Samsung; Work item code: NR_newRAT-Core; Date: 2018-11-21; Category: F; Release: Rel-15.
3GPP TSG RAN WG1 Meeting #95 R1-1814400; Spokane, USA, Nov. 12-16, 2018; CR-Form-v11.2 Change Request; Title: Combined CR of all essential corrections to 38.212 from RAN1#94bis and RAN1#95 Source to WG: Huawei; Source to TSG: R1; Work item code: NR_newRAT-Core; Date: 2018-11-18; Category: F Release: Rel-15.
3GPP TS 38.213 V15.3.0 (Sep. 2018); Technical Specification; 3rd Generation Partnership Project; Technical Specification Group Radio Access Network; NR; Physical layer procedures for control (Release 15).
3GPP TS 38.214 V15.3.0 (Sep. 2018); Technical Specification; 3rd Generation Partnership Project; Technical Specification Group Radio Access Network; NR; Physical layer procedures for data (Release 15).
3GPP TSG-RAN1 Meeting #95 R1-1814395; Spokane, USA, Nov. 12-16, 2018; CR-Form-v112 Change Request; Title: Combined CR of all essential corrections to 38.214 from RAN1#94bis and RAN1#95; Source to WG Nokia; Source to TSG: R1;Work item code: NR_newRAT-Core; Date: Nov. 30, 2018; Category: F; Release: Rel-15.
3GPP TS 38.321 V15.3.0 (Sep. 2018); Technical Specification; 3rd Generation Partnership Project; Technical Specification Group Radio Access Network; NR; Medium Access Control (MAC) protocol specification; (Release 15).
3GPP TS 38.331 V15.3.0 (Sep. 2018); Technical Specification; 3rd Generation Partnership Project; Technical Specification Group Radio Access Network; NR; Radio Resource Control (RRC) protocol specification; (Release 15).
3GPP TSG RAN WG1#96 R1-18xxxxx; Athens, Greece, Feb. 25-Mar. 1, 2019; Agenda item: 7.1.2 Source: Intel Title: Feature lead summary on simultaneous Tx/Rx Document for: Discussion ; Introduction.
3GPP TSG-RAN WG2 Meeting #104 R2-1818749; Spokane, WA, USA, Nov. 12-16, 2018; CR-Form-v11.2 Change Request; Title: Miscellaneous corrections; Source to WG: Samsung; Source to TSG: RAN2; Work item code: NR_newRAT-Core; Date: Nov. 15, 2018; Category: F; Release: Rel-15.
3GPP TSG RAN WG1 Meeting #96 R1-1903610; Athens, Greece, Feb. 25-Mar. 1, 2019; Agenda Item 7.2.8.2 Source: Huawei, HiSilicon Title: Offline Discussion for Multi-TRP/Panel Transmission and General plan for RAN1 96bis; Document for: Discussion and decision.
R1-1808142; 3GPP TSG RAN WG1 Meeting #94; Gothenburg, Sweden, Aug. 20-24, 2018; Agenda tem:7.1.2.5; Source:Huawei, HiSilicon; Title:Remaining issues on simultaneous reception or transmission over CCs and BWPs.
R1-1808198; 3GPP TSG RAN WG1 Meeting #94; Gothenburg, Sweden, Aug. 20-24, 2018; Source:ZTE; Title Simultaneous transmission and reception of different channels and reference signals; Agenda Item: 7.12.5; Document for: Discussion and Decision.
R1-1808199; 3GPP TSG RAN WG1 Meeting #94; Gothenburg, Sweden, Aug. 20-24, 2018; Source:ZTE; Title Enhancements on multi-beam operation; Agenda Item: 7.1 2.5; Document for: Discussion and Decision.
R1-1808223; 3GPP TSG RAN WG1 Meeting #94; Gothenburg, Sweden, Aug. 20-24, 2018;; Source:vivo; Title Remaining issues on simultaneous reception of DL/UL physical channels and RSs; Agenda Item:? 1.2 5.
R1-1808265; 3GPP TSG RAN WG1 Meeting #94; Gothenburg, Sweden, Aug. 20-Aug. 24, 2018; Agenda Item: 7.1.2.5; Source: MediaTek Inc.; Title: Discussions on simultaneous reception and transmission across CCs Document for: Discussion.
R1-1808377; 3GPP TSG RAN WG1 Meeting #94; Gothenburg, Sweden, Aug. 20-24, 2018; Source:CATT; Title:Discussion on simultaneous transmission and reception of physical; signals/channels.
R1-1808489; 3GPP TSG RAN WG1 Meeting #94;Gothenburg, Sweden, Aug. 20-24, 2018; Agenda item 7.1.2.5; Source: LG Electronics; Title: Remaining issues on simultaneous Tx/Rx; Document for: Discussion and Decision.
R1-1808671; 3GPP TSG RAN WG1 Meeting #94; Gothenburg, Sweden, Aug. 20-24, 2018; Source: Intel Corporation; Title:Simultaneous Tx and Rx of channels and RS; Agenda item:7.1 2.5.
R1-1808752; 3GPP TSG RAN WG1 Meeting #94; Gothenburg, Sweden, Aug. 20-24, 2018; Agenda Item: 7.1.2.5; Source: Samsung;

(56) References Cited

OTHER PUBLICATIONS

Title: Simultaneous reception of physical channels and reference signals; Document for:Discussion and Decision.
R1-1809140; 3GPP TSG RAN WG1 Meeting #94; Gothenburg, Sweden, Aug. 20-24, 2018; Source:NTT Docomo, Inc.; Title:Simultaneous Tx/Rx of UL/DL physical channels and reference signals; Agenda Item:7.1.2.5.
R1-1809199; 3GPP TSG-RAN WG1 Meeting #94Tdoc; Gothenburg, Sweden, Aug. 20-24, 2018; Agenda tem:7.1.2.5; Source:Ericsson; Title:On simultaneous transmission and reception in FR2; Agenda Item: 7.1.2.5; Document for: Discussion and Decision.
R1-1809240; 3GPP TSG RAN WG1 Meeting #94; Gothenburg, Sweden, Aug. 20-24, 2018 ; Agenda item:7.1.2.5 Source:Nokia, Nokia Shanghai Bell; Title:On simultaneous transmission and reception of multiplexed channels Document for: Discussion and Decision.
R1-1809425; 3GPP TSG RAN WG1 Meeting #94; Gothenburg, Sweden, Aug. 20-24, 2018; Agenda Item:7.1.2.5; Source: Qualcomm Incorporated; Title: Details on simultaneous reception/transmission of PHY channels and RS in FR2; Document for:Discussion/Decision.
R1-1809820; 3GPP TSG RAN WG1 Meeting #94; Gothenburg, Sweden, Aug. 20-24, 2018; Source: Intel Corporation; Title:Summary of simultaneous Rx and Tx; Agenda item:7.1.2 5.
R1-1809882; 3GPP TSG RAN WG1 Meeting #94; Gothenburg, Sweden, Aug. 20-24, 2018; Source: Intel Corporation; Title:Guidance on simultaneous reception of channels or RS; Agenda item:7.1.2.5.
R1-1809881; 3GPP TSG RAN WG1 Meeting #94; Gothenburg, Sweden, Aug. 20-24, 2018; Title:draft LS on UE behaviour on reception of channels or RS in the same OFDM symbol; Release:Rel-15; Work Item: NR_newRAT-Core.
R1-1810102; 3GPP TSG RAN WG1 Meeting #94bis; Chengdu, China, Oct. 8-12, 2018; Agenda ltem:7.1.2.5 Source:Huawei, HiSilicon; Title:Remaining issues on simultaneous reception or transmission over CC/BWP(s); Document for: Discussion and Decision.
R1-1810216; 3GPP TSG RAN WG1 Meeting #94bis; Chengdu, China, Oct. 8-12, 2018; Source:ZTE; Title Simultaneous transmission and reception of channels/signals; Agenda Item: 7.1.2.5; Document for: Discussion and Decision.
R1-1810368; 3GPP TSG RAN WG1 #94b; Chengdu, China, Oct. 8-Oct. 12, 2018; Source:vivo; Title Maintenance for simultaneous reception of DL/UL physical channels and RSs; Agenda Item:7.1.2.5.
R1-1810753; 3GPP TSG RAN WG1 Meeting #94bis; Chengdu, China, Oct. 8-12, 2018; Source: Intel Corporation; Title:Simultaneous Tx and Rx of channels and RS; Agenda item:7.1.2.5.
R1-1810841 Simultaneous reception of physical channels and reference signals; 3GPP TSG RAN WG1 Meeting #94bis; Chengdu, China, Oct. 8-12, 2018; Agenda item:7.1.2.5; Source: Samsung; Title: Simultaneous reception of physical channels and reference signals; Document for: Discussion and Decision.
R1-1811233; 3GPP TSG RAN WG1 Meeting #94bis; Chengdu, China, Oct. 8-12, 2018; Agenda item:7.1.2.5; Source: Qualcomm Incorporated; Title: Details on simultaneous reception/transmission of PHY channels and RS in FR2; Document for: Discussion/Decision.
R1-1811353; 3GPP TSG RAN WG1 Meeting #94bis; Chengdu, China, Oct. 8-12, 2018; Source:NTT Docomo, Inc.; Title:Simultaneous Tx/Rx for physical channels; Agenda Item:7.1 2.5.
R1-1811549; 3GPP TSG-RAN WG1 Meeting #94bisTdoc; Chengdu, China, Oct. 8-12, 2018 ; Agenda tem:7.1.2.5; Source:Ericsson; Title:On simultaneous transmission and reception in FR2; Document forDiscussion, Decision.
R1-1811820; 3GPP TSG RAN WG1 Meeting #94bis; Chengdu, China, Oct. 8-12, 2018; Source:NTT Docomo, Inc.; Title:Offline summary for PDCCH structure and search space; Agenda Item:7.1.3.1.

R1-1812004; 3GPP TSG RAN WG1 Meeting #94; Chengdu, China, Oct. 8-12, 2018; Source: Intel Corporation; Title:Summary of simultaneous Rx and Tx; Agenda item:7.1.2 5.
R1-1812241; 3GPP TSG RAN WG1 Meeting #95; Spokane, USA, Nov. 12-16, 2018; Agenda Item:7.1.2.5 Source:Huawei, HiSilicon; Title:Simultaneous Rx orTx over CC/BWP(s).
R1-1812268; 3GPP TSG RAN WG1 Meeting #95; Spokane, USA, Nov. 12-16, 2018; Source:ZTE; Title Discussion on draft CR on simultaneous transmission and reception; Agenda Item: 7.1.2.5; Document for: Discussion and Decision.
R1-1812268; Draft CR to TS 38.213 on simultaneous transmission of CORESET+PDSCH v5; 3GPP TSG RAN WG1 Meeting #95; Spokane, USA, Nov. 12-16, 2018; CR-Form-v11.2; Change Request.
R1-1812287; Draft CR on simultaneous reception of DL and UL physical channels and RSs for 38.214; 3GPP TSG-RAN WG1 Meeting #95; Spokane, USA, Nov. 12-16, 2018; CR-Form-v11.2; Change Request.
R1-1812287; Maintenance for simultaneous reception of DL and UL physical channels and RSs; 3GPP TSG RAN WG1 Meeting #95; Spokane, USA, Nov. 12-16, 2018; Source:vivo; Title:Draft CR on simultaneous reception of DL/UL physical channels and RSs; Agenda Item:7.1.2.5.
R1-1812469; 3GPP TSG RAN WG1 Meeting #95; Spokane, USA, Nov. 12-16, 2018; CR-Form-v11.4 Change Request.
R1-1812469; 3GPP TSG RAN WG1 Meeting #95; Spokane, USA, Nov. 12-16, 2018; Source: Intel Corporation; Title:Simultaneous Tx and Rx of channels and RS; Agenda item:7.1 2.5.
R1-1812548; CR on Simultaneous TXRX; 3GPP TSG-RAN1 Meeting #95; Spokane, USA, Nov. 12-16, 2018; CR-Form-v11.2; Change Request.
R1-1812959; 3GPP TSG RAN WG1 Meeting #95; Spokane, USA, Nov. 12-16, 2018; Agenda item:7.1.2.5 Source: Samsung; Title: Simultaneous reception of physical channels and reference signals; Document for:Discussion and Decision.
R1-1813251; CR1-38214 Correction to 38.214 on simultaneous reception of PDCCH and PDSCH; 3GPP TSG RAN NG1 Meeting #95; Spokane, United States, Nov. 12-16, 2018; CR-Form-v11.2; Draft Change Request.
R1-1813251; Draft CR to TS 38.213 on PDCCH QCL TypeD collision; 3GPP TSG RAN WG1 Meeting #95 Spokane, United States, Nov. 12-16, 2018; CR-Form-v11 2; Draft Change Request.
R1-1813251; 3GPP TSG-RAN WG1 Meeting #95Tdoc; Spokane, United States, Nov. 12-16, 2018 ; Agenda Item:7.1.2.5; Source:Ericsson; Title:Maintenance for simultaneous RX and TX; Document for:Decision.
R1-1813300; 3GPP TSG RAN WG1 Meeting #95; Spokane, USA, Nov. 12-16, 2018; Source:NTT Docomo, Inc.; Title:Simultaneous Tx for physical channels; Agenda Item:7.1.2.5.
R1-1813398; 3GPP TSG RAN WG1 Meeting #95; Spokane, USA, Nov. 12-16, 2018; Agenda item:7.1.2.5 Source: Qualcomm Incorporated; Title: Details on simultaneous reception/transmission of PHY channels and RS in FR2; Document for:Discussion/Decision.
R1-1813933; 3GPP TSG RAN WG1 Meeting #95; Spokane, USA, Nov. 12-16, 2018; Source:NTT Docomo, Inc.; Title:Offline summary for PDCCH structure and search space; Agenda Item:7.1.3.1.
R1-1814011; 3GPP TSG RAN WG1 Meeting #95; Spokane, USA, Nov. 12-16, 2018; Source: Intel, Ericsson, Huawei, Vivo, Nokia; Title:Proposal for simultaneous Tx and Rx of channels and RS; Agenda item:7.1.2.5.
R1-1813896; 3GPP TSG RAN WG1 Meeting #95; Spokane, USA, Nov. 12-16, 2018; Source: Intel Corporation; Title:Summary for simultaneous Tx and Rx of channels and RS; Agenda item:7.1.2.5.
R1-1901567; 3GPP TSG RAN WG1 Meeting #96; Athens, Greece, Feb. 25-Mar. 1, 2019; Agenda tem:7.2.8.2; Source:Huawei, HiSilicon; Title:Enhancements on Multi-TRP/panel transmission.
R1-1901568; 3GPP TSG RAN WG1 Meeting #96; Athens, Greece, Feb. 25-Mar. 1, 2019; Agenda Item:7.2.8.3; Source:Huawei, HiSilicon; Title:Enhancements on multi-beam operation.
R1-1901634; 3GPP TSG RAN WG1 #96; Athens, Greece, Feb. 25-Mar. 1, 2019; Source: ZTE; Title Enhancements on multi-TRP/Panel transmission; Agenda item:7.2.8.2.

(56) References Cited

OTHER PUBLICATIONS

R1-1901635; 3GPP TSG RAN WG1 Meeting #96; Athens, Greece, Feb. 25-Mar. 1, 2019; Source:ZTE Title: Enhancements on multi-beam operation; Agenda Item: 7.2.8.3; Document for: Discussion and Decision.

R1-1901702; 3GPP TSG RAN1 #96; Athens, Greece, Feb. 25-Mar. 1, 2019; Source:vivo; Title:Further Discussion on Multi-TRP Transmission; Agenda Item:7.2.8.2.

R1-1901703; 3GPP TSG RAN WG1 Meeting #96; Athens, Greece, Feb. 25-Mar. 1, 2019; Sourcevivo Title:Further discussion on Multi-Beam Operation; Agenda Item:7.2.8.3.

R1-1901789;3GPP TSG RAN WG1 #96; Athens, Greece, Feb. 25-Mar. 1, 2019; Agenda Item: 7.2.8.2 Source: MediaTek Inc.; Title: Enhancements on multi-TRP/panel transmission; Document for: Discussion.

R1-1901790; 3GPP TSG RAN WG1 #96; Athens, Greece, Feb. 25-Mar. 1, 2019; Agenda Item: 7.2.8.3 Source: MediaTek Inc.; Title:Enhancements on multi-beam operations; Document for: Discussion.

R1-1901906; 3GPP TSG RAN WG1 #96; Athens, Greece, Feb. 25-Mar. 1, 2019; Agenda item:7.2.8.2 Source: AT Title: Multi-TRP/Panel Enhancements for Release 16 MIMO.

R1-1901917; 3GPP TSG RAN WG1 Meeting #96; Athens, Greece, Feb. 25-Mar. 1, 2019; Agenda Item:7.2.6.4; Source:Nokia, Nokia Shanghai Bell; Title:On intra-UE DL/UL prioritization for NR URLLC.

R1-1902019; 3GPP TSG RAN WG1 Meeting #96; Athens, Greece, Feb. 25-Mar. 1, 2019; Source:CATT Title: Consideration on multi-TRP/panel transmission; Agenda Item:7.2.8.2.

R1-1902074; 3GPP TSG RAN WG1 Meeting #96; Athens, Greece, Feb. 25-Mar. 1, 2019; Source:Fujitsu Title: Enhancements on Multi-beam Operation; Agenda Item:7.2.8.3.

R1-1902091; 3GPP TSG RAN WG1 #96; Athens, Greece, Feb. 25-Mar. 1, 2019; Agenda item:7.2.8.2 Source:LG Electronics; Title:Enhancements on multi-TRP/panel transmission; Document for:Discussion and Decision.

R1-1902092; 3GPP TSG RAN WG1 Meeting #96; Athens, Greece, Feb. 25-Mar. 1, 2019; Agenda item 7.2.8.3; Source: LG Electronics; Title: Discussion on multi-beam based operations and enhancements; Document for: Discussion and Decision.

R1-1902162; 3GPP TSG RAN WG1 #96; Athens, Greece, Feb. 25-Mar. 1, 2019; Agenda Item:7.2.8.3 Source:Lenovo, Motorola Mobility; Title:Discussion of multi-beam operation.

R1-1902183; Multi-TRP-V0.5; 3GPP TSG RAN WG1 Meeting #96; Athens, Greece, Feb. 25-Mar. 1, 2019 Agenda Item:7.2.8.2; Source: Sony; Title:Considerations on Multi-TRP/Panel Transmission.

R1-1902305; NCJT; 3GPP TSG RAN WG1 Meeting #96; Athens, Greece, Feb. 25-Mar. 1, 2019; Agenda Item:7.2.8.2; Source: Samsung; Title: Enhancements on Multi-TRP/Panel Transmission; Document for:Discussion and Decision.

R1-1902306; R16 Multi-Beam; 3GPP TSG RAN WG1 96; Athens, Greece, Feb. 25-Mar. 1, 2019; Agenda Item:7.2.8.3; Source: Samsung; Title: Enhancements on multi-beam operations.

R1-1902338; 3GPP TSG RAN WG1 #96; Athens, Greece, Feb. 25-Mar. 1, 2019; Source: CMCC; Title Discussion on multi-TRP/panel transmission; Agenda item:7.2.8.2; Document for:Discussion & Decision.

R1-1902339; 3GPP TSG RAN WG1 #96; Athens, Greece, Feb. 25-Mar. 1, 2019; Agenda item:7.2.8.3; Source: CMCC; Title: Enhancements on multi-beam operation; Document for:Discussion and Decision.

R1-1902408; 3GPP TSG-RAN WG1 Meeting #96; Athens, Greece, Feb. 25-Mar. 1, 2019; Source: Asia Pacific Telecom; Title: Enhancements on UL Multi-beam Operation ; Agenda item:7.2.8.3.

R1-1902502; 3GPP TSG RAN WG1 Meeting #96; Athens, Greece, Feb. 25-Mar. 1, 2019; Source: Intel Corporation; Title:On multi-TRP/multi-panel transmission; Agenda item:7.2.8.2.

R1-1902503; 3GPP TSG RAN WG1 Meeting #96; Athens, Greece, Feb. 25-Mar. 1, 2019; Source: Intel Corporation; Title:On Beam Management Enhancement; Agenda item:7.2.8.3.

R1-1902522;Panasonic_NR_MIMO_multi_trp_enhancements_vfinal; 3GPP TSG RAN WG1 #96; Athens, Greece, Feb. 25-Mar. 1, 2019; ; Source:Panasonic; Title: On multi-TRP enhancements for NR MIMO in Rel. 16; Agenda Item: 7.2.8 2.

R1-1902529; 3GPP TSG-RAN WG1 Meeting #96Tdoc; Athens, Greece, Feb. 25-Mar. 1, 2019; Agenda Item:7.2.8.3; Source:Ericsson; Title:Enhancements to multi-beam operation.

R1-1902540; 3GPP TSG RAN WG1 Meeting #96; Athens, Greece, Feb. 25-Mar. 1, 2019; Source:Ericsson Fitle:On multi-TRP and multi-panel; Agenda Item:7.2.8.2.

R1-1902551; 3GPP TSG RAN WG1 Meeting #96; Athens, Greek, Feb. 25-Mar. 1, 2019; Source Fraunhofer HHI, Fraunhofer IIS; Title:Discussion on enhancements for multi-TRP/panel transmission; Agenda Item:7.2.8.2.

R1-1902563; 3GPP TSG RAN WG1 #96 Meeting; Athens, Greece, Feb. 25-Mar. 1, 2019; Agenda Item:7.2.8.2; Source:Nokia, Nokia Shanghai Bell; Title:Enhancements on Multi-TRP/Panel Transmission.

R1-1902564; 3GPP TSG RAN WG1 Meeting #96; Athens, Greece, Feb. 25-Mar. 1, 2019; Agenda Item:7 2.8.3; Source:Nokia, Nokia Shanghai Bell; Title:Enhancements on Multi-beam Operation.

R1-1902614;Performance Evaluation of Multi-TRP Schemes; 3GPP TSG RAN WG1 Meeting 96; Athens, Greece, Feb. 25-Mar. 1, 2019; Source: InterDigital Inc.; Title:Performance Evaluation of Multi-TRP Schemes; Agenda Item:7.2.8.2.

R1-1902615; Enhancement for Multi-Beam Uplink Operation; 3GPP TSG RAN WG1 #96; Athens, Greece, Feb. 25-Mar. 1, 2019; Agenda Item:7.2.8.3; Source:InterDigital, Inc.; Title:Enhancement for Multi-Beam Uplink Dperation.

R1-1902630; 3GPP TSG RAN WG1 #96; Athens, Greece, Feb. 25-Mar. 1, 2019; Agenda item:7.2.8.3 Source:China Telecom; Title:Enhancements on multi-beam operation for multi-panel transmission.

R1-1902687; 3GPP TSG RAN WG1 #96; Athens, Greece, Feb. 25-Mar. 1, 2019; Agenda item:7.2.8.3; Source:NEC; Title:Discussion on multi-beam operation.

R1-1902689; 3GPP TSG RAN WG1 #96; Athens, Greece, Feb. 25-Mar. 1, 2019; Agenda item:7.2.8.2; Source:NEC; Title: Discussion on multi-TRP transmission.

R1-1902701; 3GPP TSG RAN WG1 Meeting #96;Athens, Greece, Feb. 25-Mar. 1, 2019; Source:OPPO Title: Enhancements on multi-TRP and multi-panel transmission; Agenda Item:7.2.8.2.

R1-1902704; 3GPP TSG RAN WG1 #96; Athens, Greece, Feb. 25-Mar. 1, 2019; Source:OPPO; Title Discussion on Multi-beam Operation Enhancements; Agenda Item:7.2.8.3.

R1-1902714;3GPP TSG RAN WG1 #96; Athens, Greece, Feb. 25-Mar. 1, 2019; Agenda Item: 7.2.8.3 Source:Spreadtrum Communications; Title:Discussion on multi-beam operation; Document for:Discussion and decision.

R1-1902739; Discussion on Multi-TRP transmission-final; 3GPP TSG RAN WG1 Meeting #96; Athens, Greece, Feb. 25-Mar. 1, 2019; ; Agenda Item:7.2.8.2; Source:Spreadtrum Communications; Title:Discussion on Multi-TRP transmission.

R1-1902813; 3GPP TSG RAN WG1 #96; Athens, Greece, Feb. 25-Mar. 1, 2019; Source:NTT Docomo, Inc.; Title:Discussion on multi-beam enhancement; Agenda Item:7.2.8.3.

R1-1902848; 3GPP TSG RAN WG1 #96; Athens, Greece, Feb. 25-Mar. 1, 2019; Agenda Item:7.2.8.6 Source: Motorola Mobility, Lenovo; Title:Interrupted transmission indication for Multi-TRP Transmission.

R1-1902859; 3GPP TSG RAN WG1 Meeting #96Tdoc; Athens, Greece, Feb. 25-Mar. 1, 2019; Agenda Item:7.2.8.6; Source:Ericsson; Title:Multi-TRP diversity strategies at 4 GHz.

R1-1902866; 3GPP TSG RAN WG1 #96; Athens, Greece, Feb. 25-Mar. 1, 2019; Agenda Item:7.2.8.3; Source:Xiaomi; Title: Enhancements on beam management.

R1-1902912; 3GPP TSG RAN WG1 #96; Athens, Greece, Feb. 25-Mar. 1, 2019; Agenda Item:7.2.8.6 Source: ASUSTeK; Title:Discussion on preemption indication enhancement.

(56) References Cited

OTHER PUBLICATIONS

R1-1903013; Comparison between Single-CW and Multi-CW for Multi-TRP; 3GPP TSG-RAN WG1 Meeting #Feb. 25-Mar. 1, 2019 ; Athens, Greece; Agenda item:7.2.8.6.

* cited by examiner

*TCI-State information element*

```
-- ASN1START
-- TAG-TCI-STATE-START

TCI-State ::=            SEQUENCE {
    tci-StateId              TCI-StateId,
    qcl-Type1                QCL-Info,
    qcl-Type2                QCL-Info
    OPTIONAL,            -- Need R
    ...
}

QCL-Info ::=             SEQUENCE {
    cell                     ServCellIndex
    OPTIONAL,            -- Need R
    bwp-Id                   BWP-Id
    OPTIONAL,            -- Cond CSI-RS-Indicated
    referenceSignal          CHOICE {
        csi-rs                   NZP-CSI-RS-ResourceId,
        ssb                      SSB-Index
    },
    qcl-Type                 ENUMERATED {typeA, typeB, typeC, typeD},
    ...
}
```

FIG. 16

MULTIPLEXING AND/OR PRIORITIZATION OF UPLINK SIGNALS

CROSS-REFERENCE TO RELATED APPLICATIONS

This application is a continuation of International Application No. PCT/US2020/025380, filed Mar. 27, 2020, which claims the benefit of U.S. Provisional Application No. 62/825,781, filed Mar. 28, 2019, which are hereby incorporated by reference in their entireties.

BRIEF DESCRIPTION OF THE SEVERAL VIEWS OF THE DRAWINGS

Examples of several of the various embodiments of the present disclosure are described herein with reference to the drawings.

FIG. 16 is an example of a downlink beam management as per an aspect of an embodiment of the present disclosure.

DETAILED DESCRIPTION OF EMBODIMENTS

Figure 1:
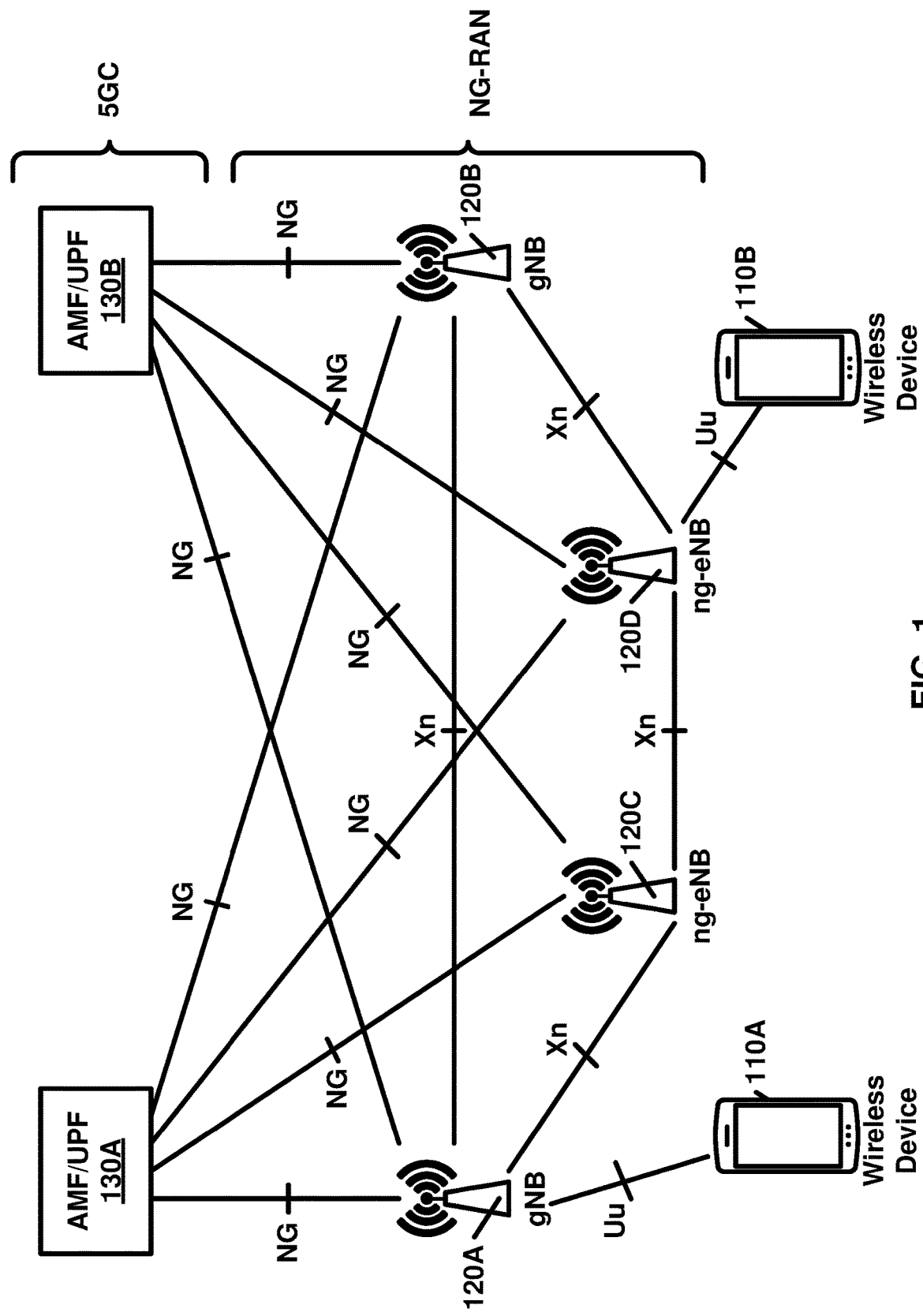
FIG. 1 is a diagram of an example RAN architecture as per an aspect of an embodiment of the present disclosure.

Example embodiments of the present disclosure enable operation of beam management. Embodiments of the technology disclosed herein may be employed in the technical field of multicarrier communication systems. More particularly, the embodiments of the technology disclosed herein may relate to beam management in a multicarrier communication system.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
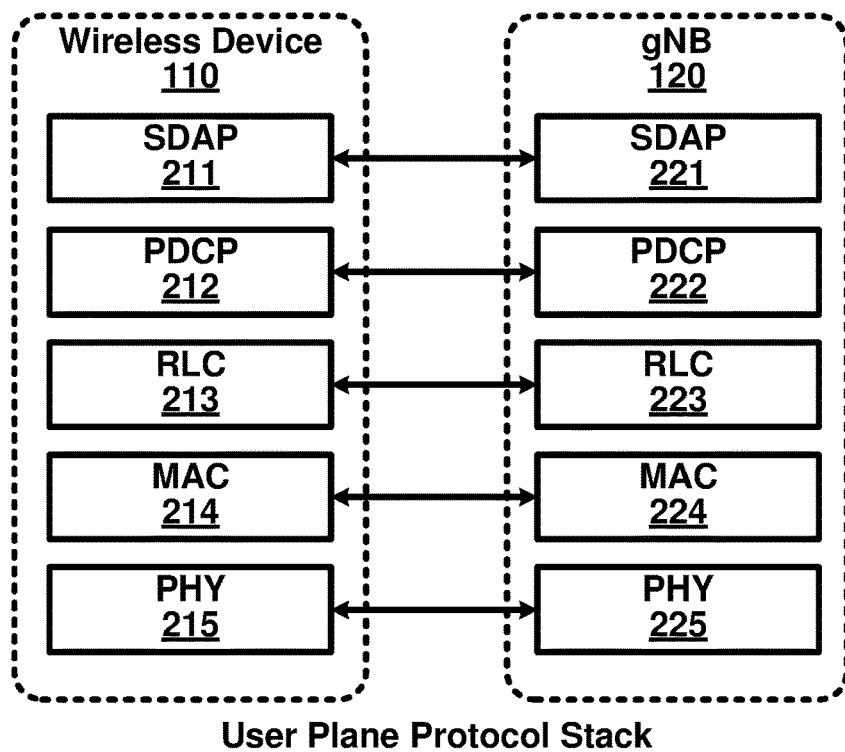
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TB s) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
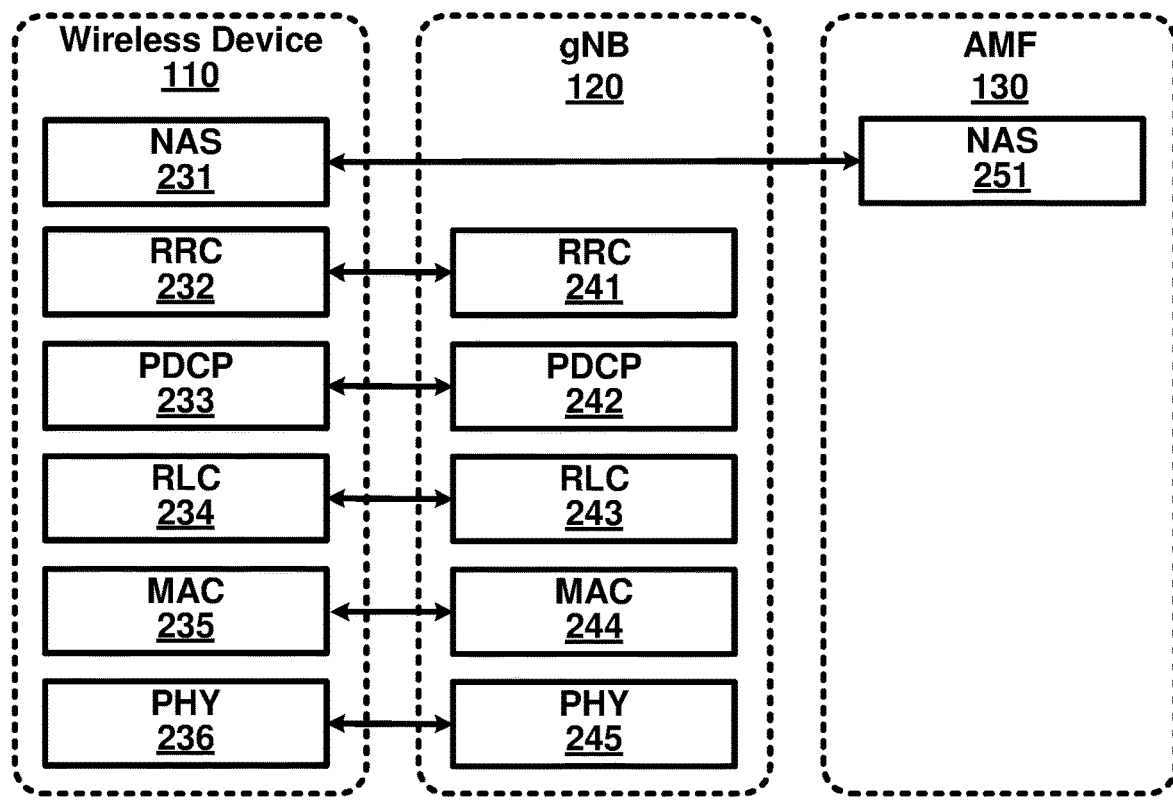
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
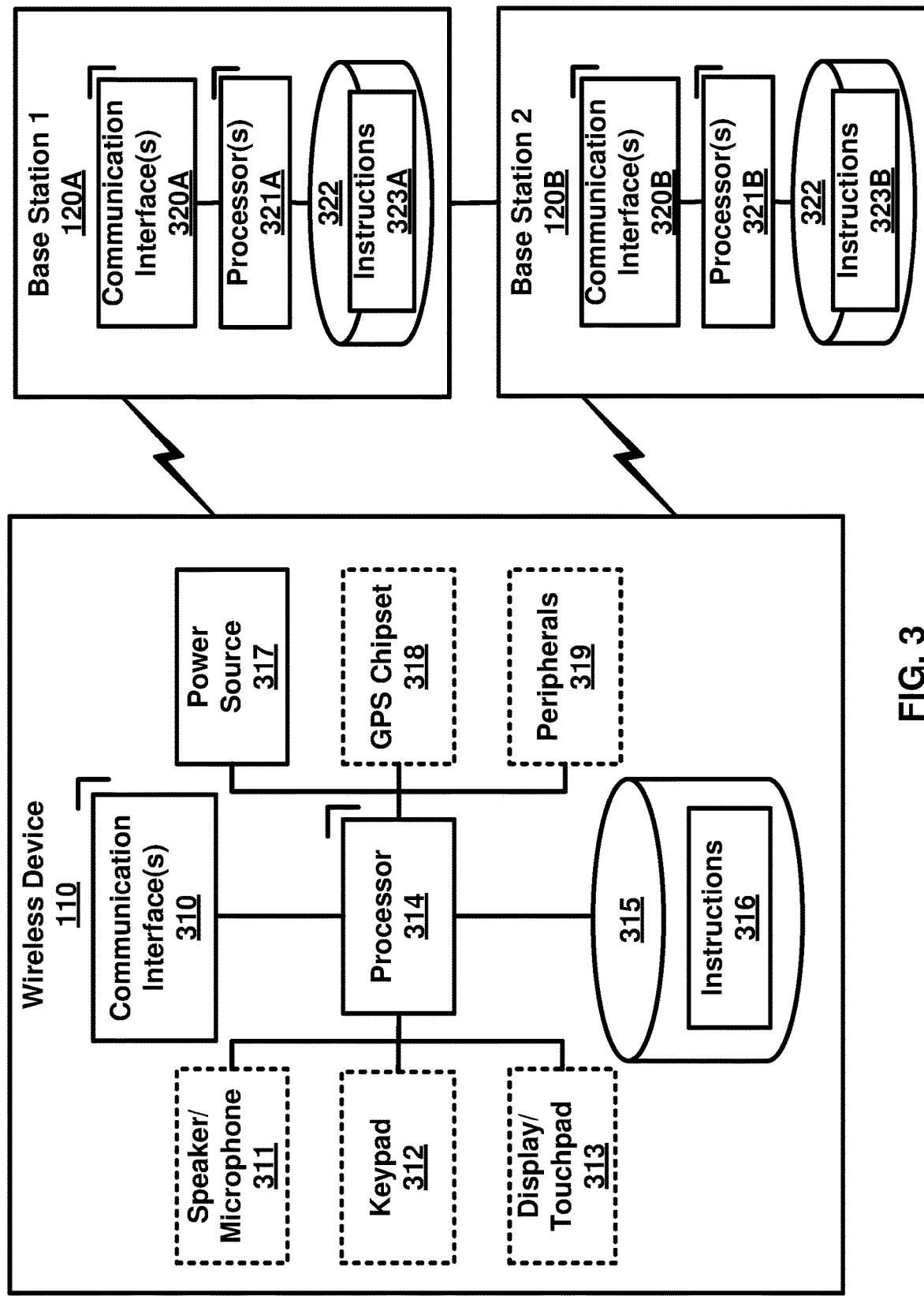
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to reestablish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG.

4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

Figure 4A:
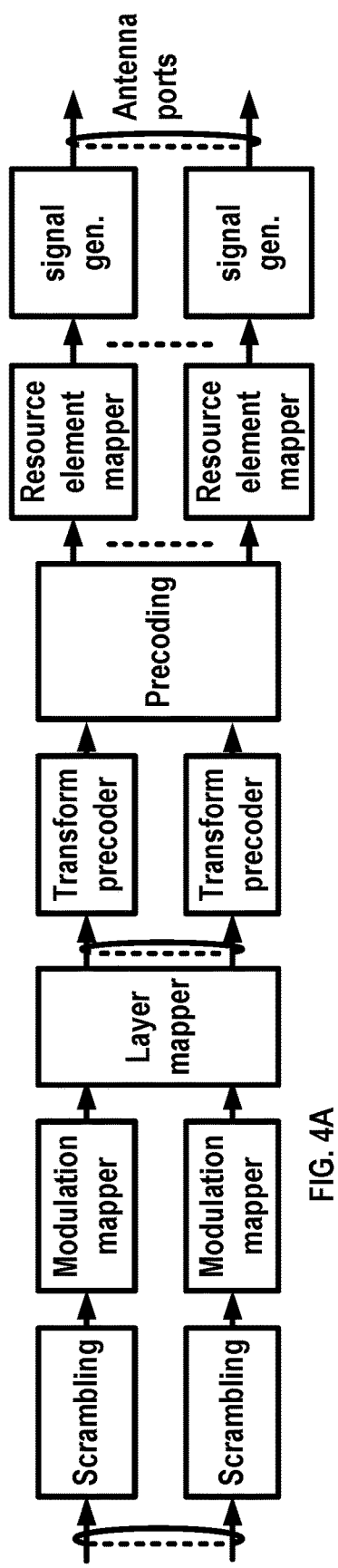
FIG. 4A, FIG. 4B, FIG. 4C and FIG. 4D are example diagrams for uplink and downlink signal transmission as per an aspect of an embodiment of the present disclosure.
Figure 4B:
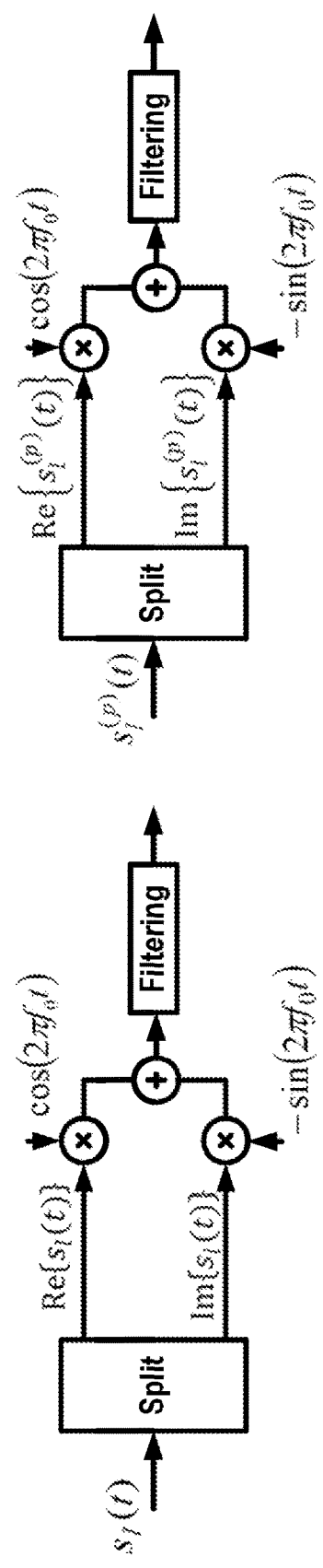

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

Figure 4D:
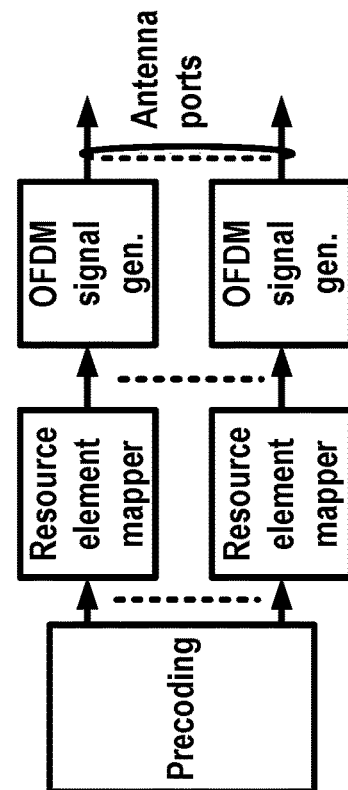
Figure 4C:
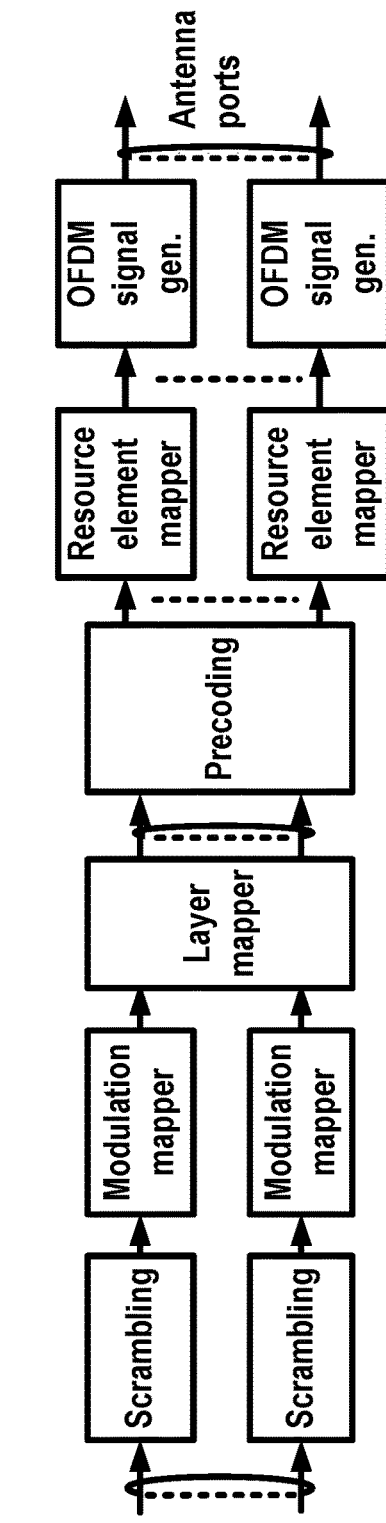

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
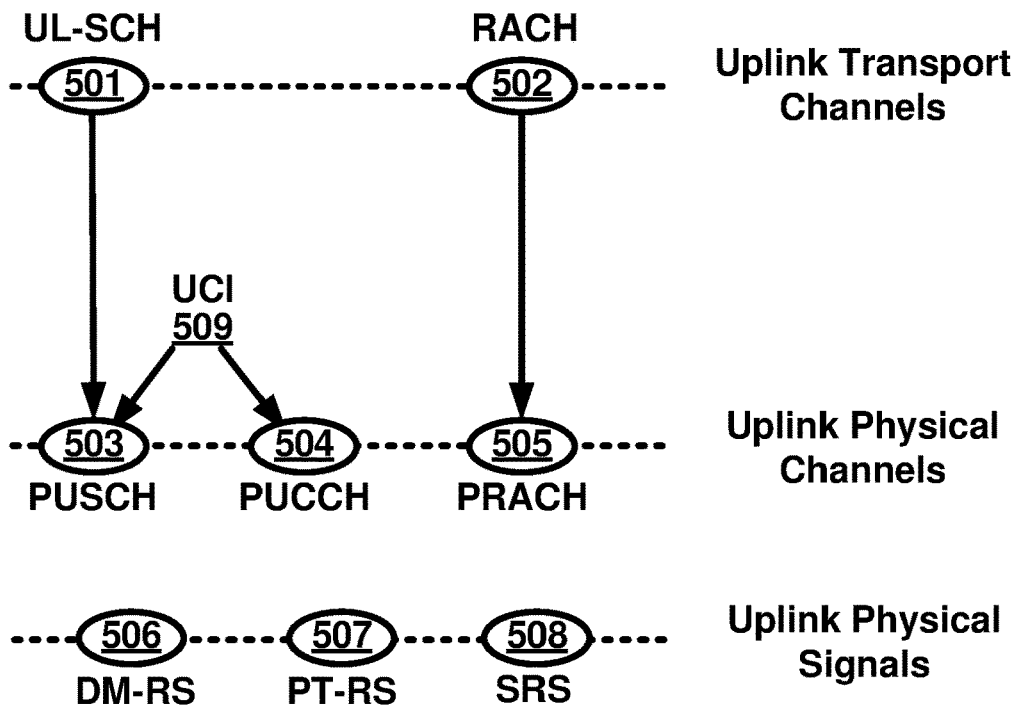
FIG. 5A is a diagram of an example uplink channel mapping and example uplink physical signals as per an aspect of an embodiment of the present disclosure.
Figure 5B:
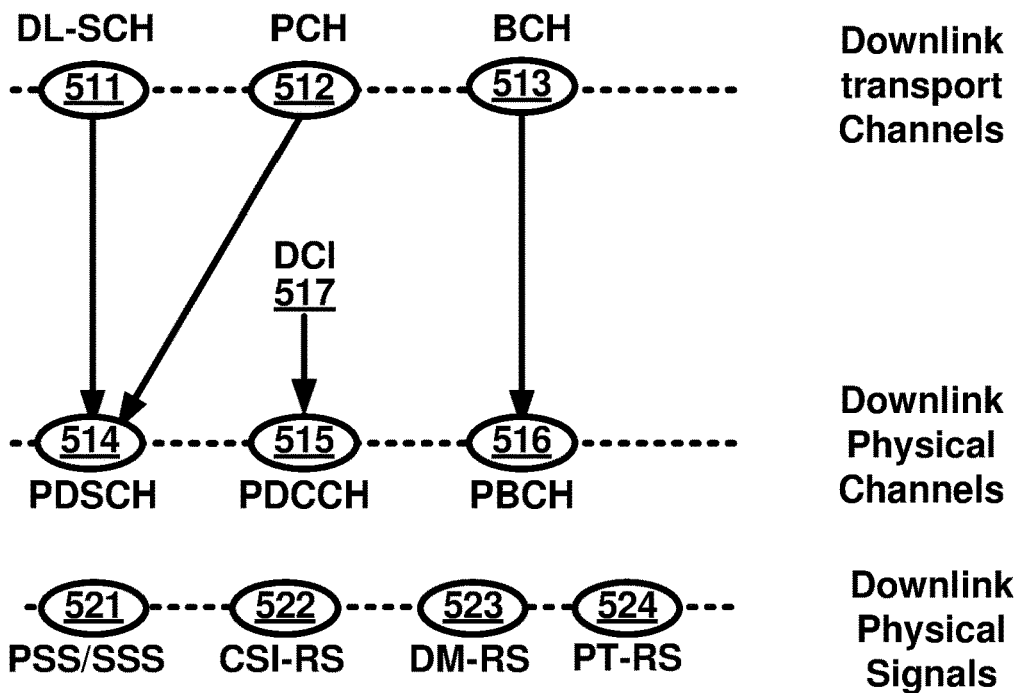
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SS/PBCH blocks when the downlink CSI-RS 522 and SS/PBCH blocks are spatially quasi co-located and resource elements associated with the downlink CSI-RS 522 are the outside of PRBs configured for SS/PBCH blocks.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
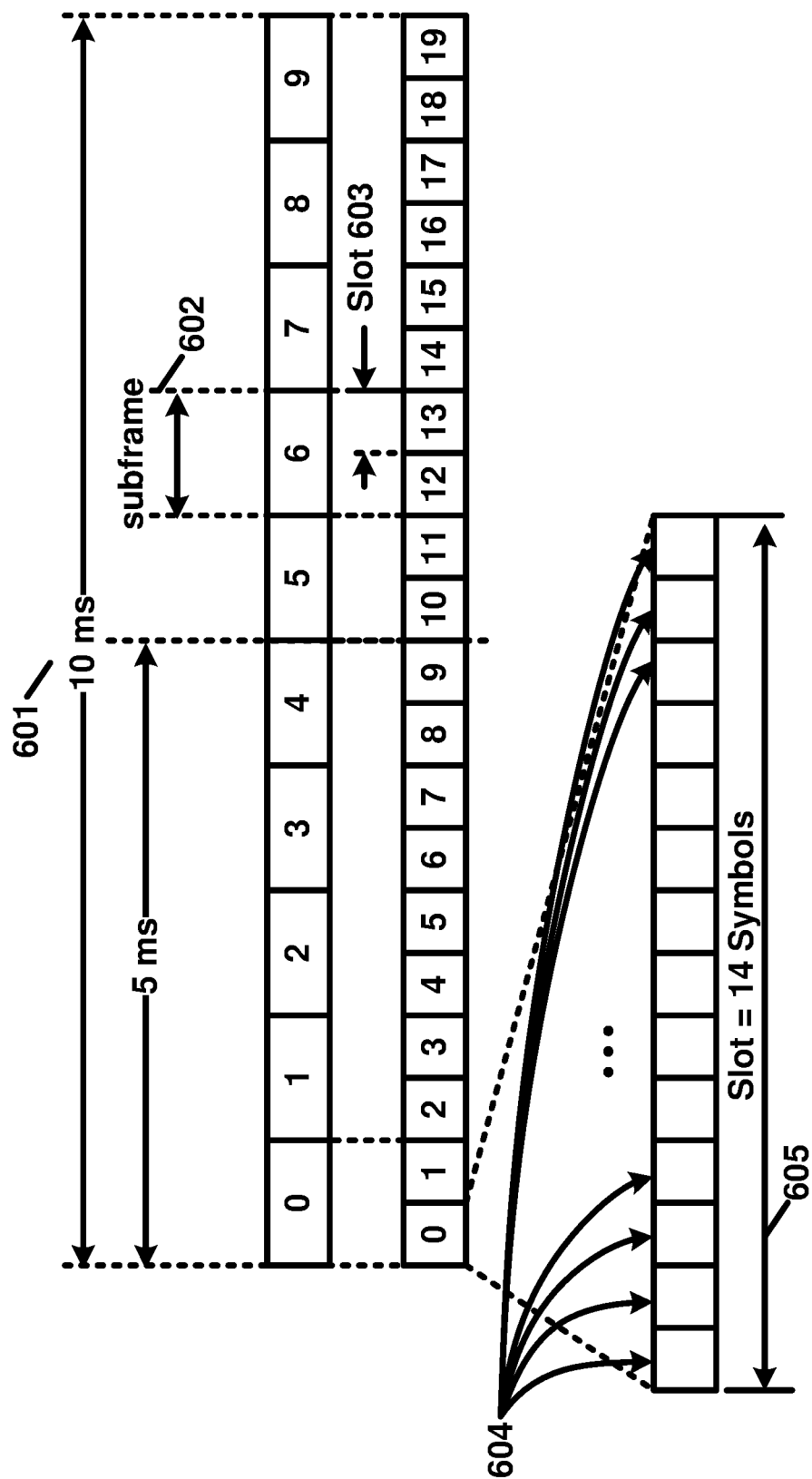
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
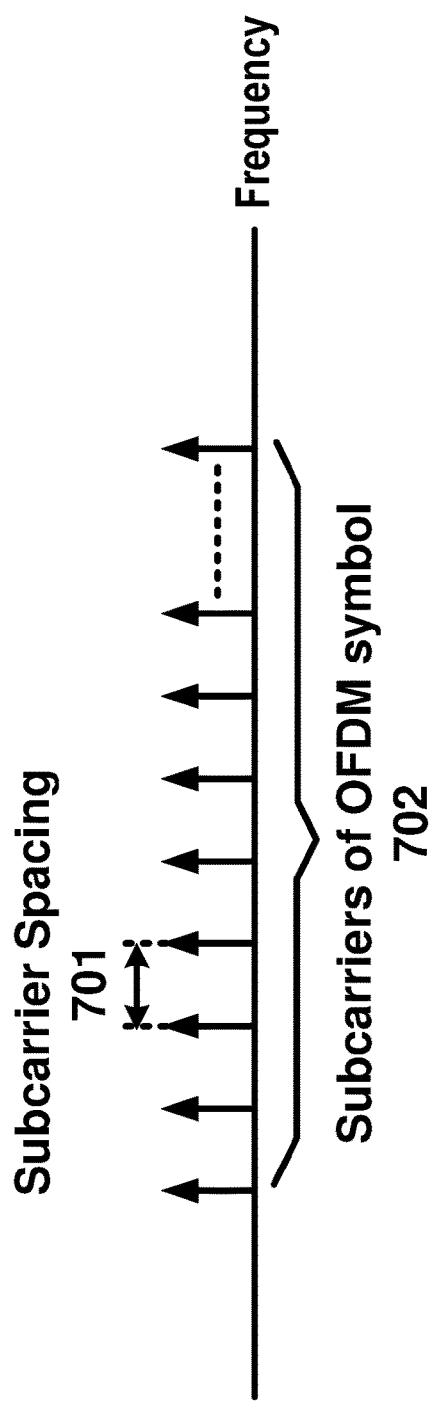
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
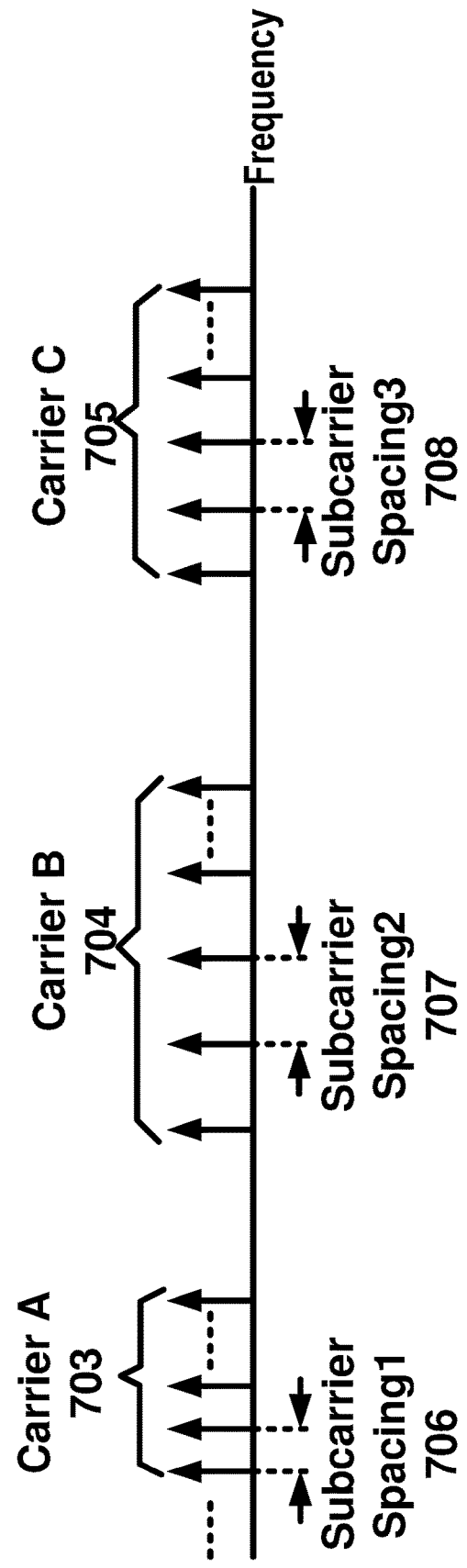

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
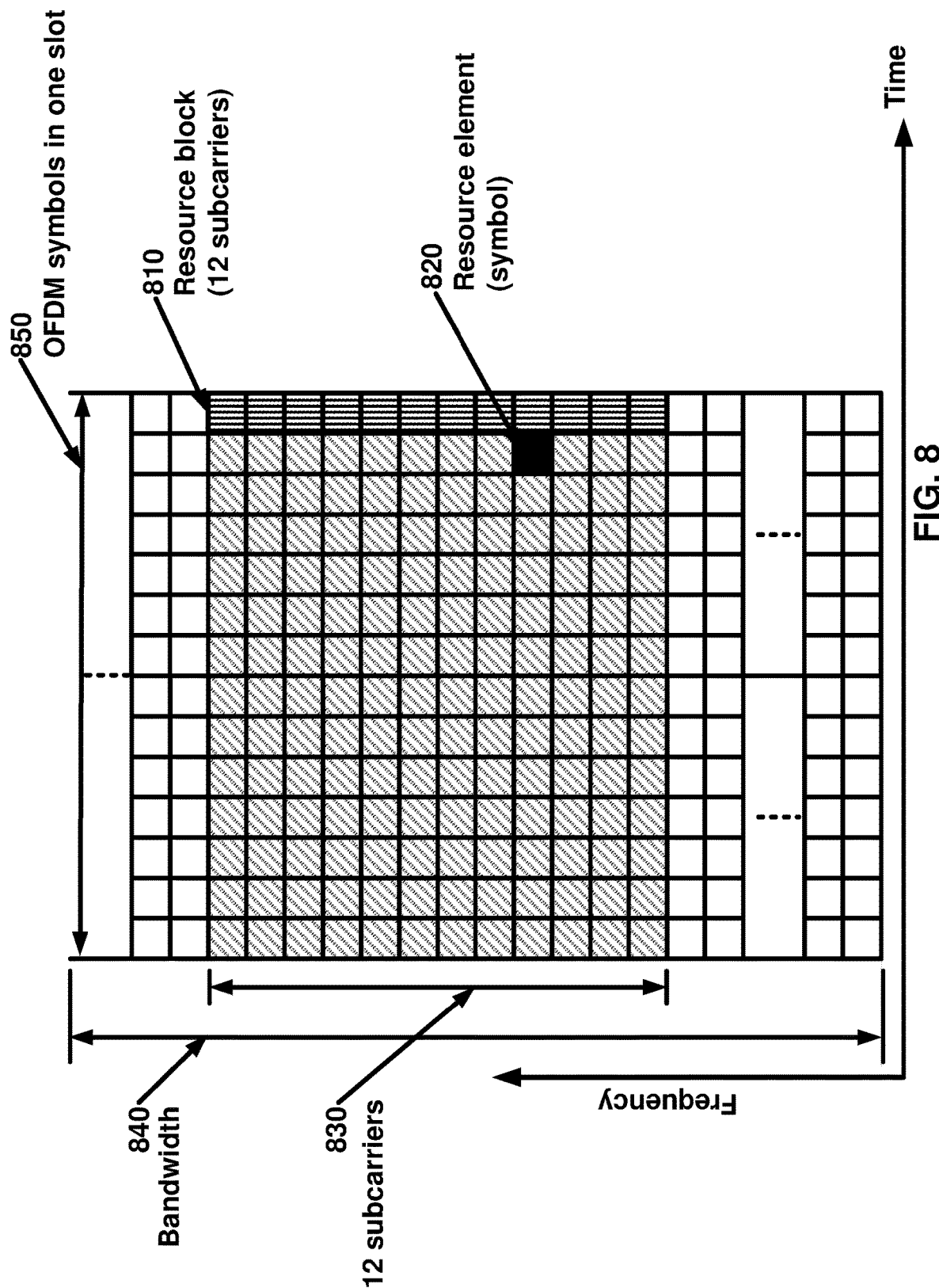
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
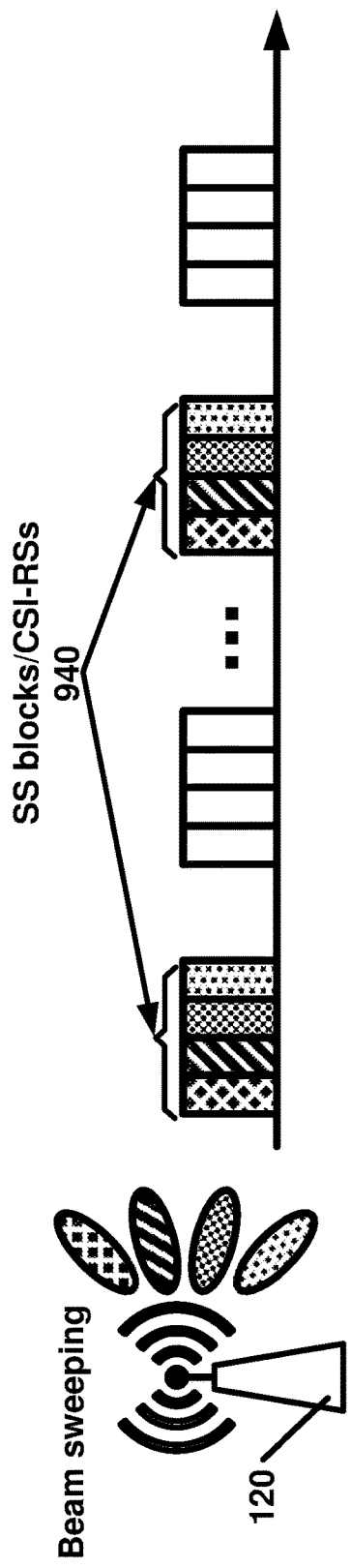
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
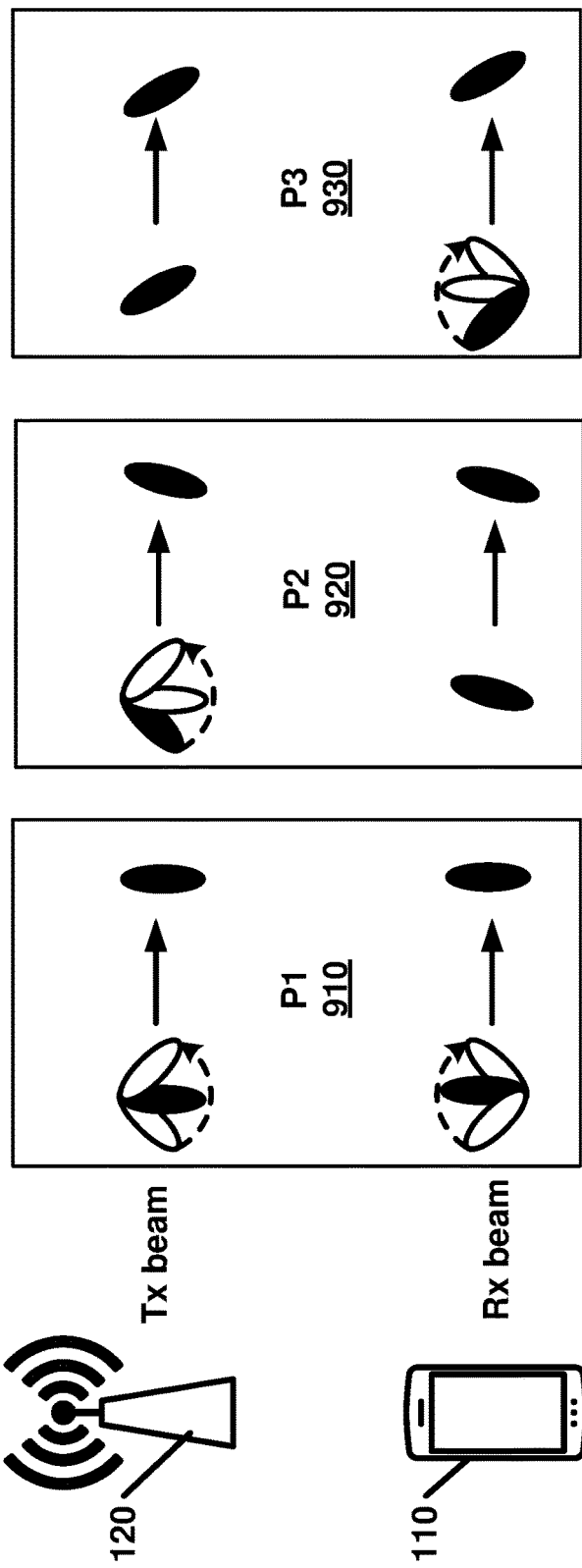
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
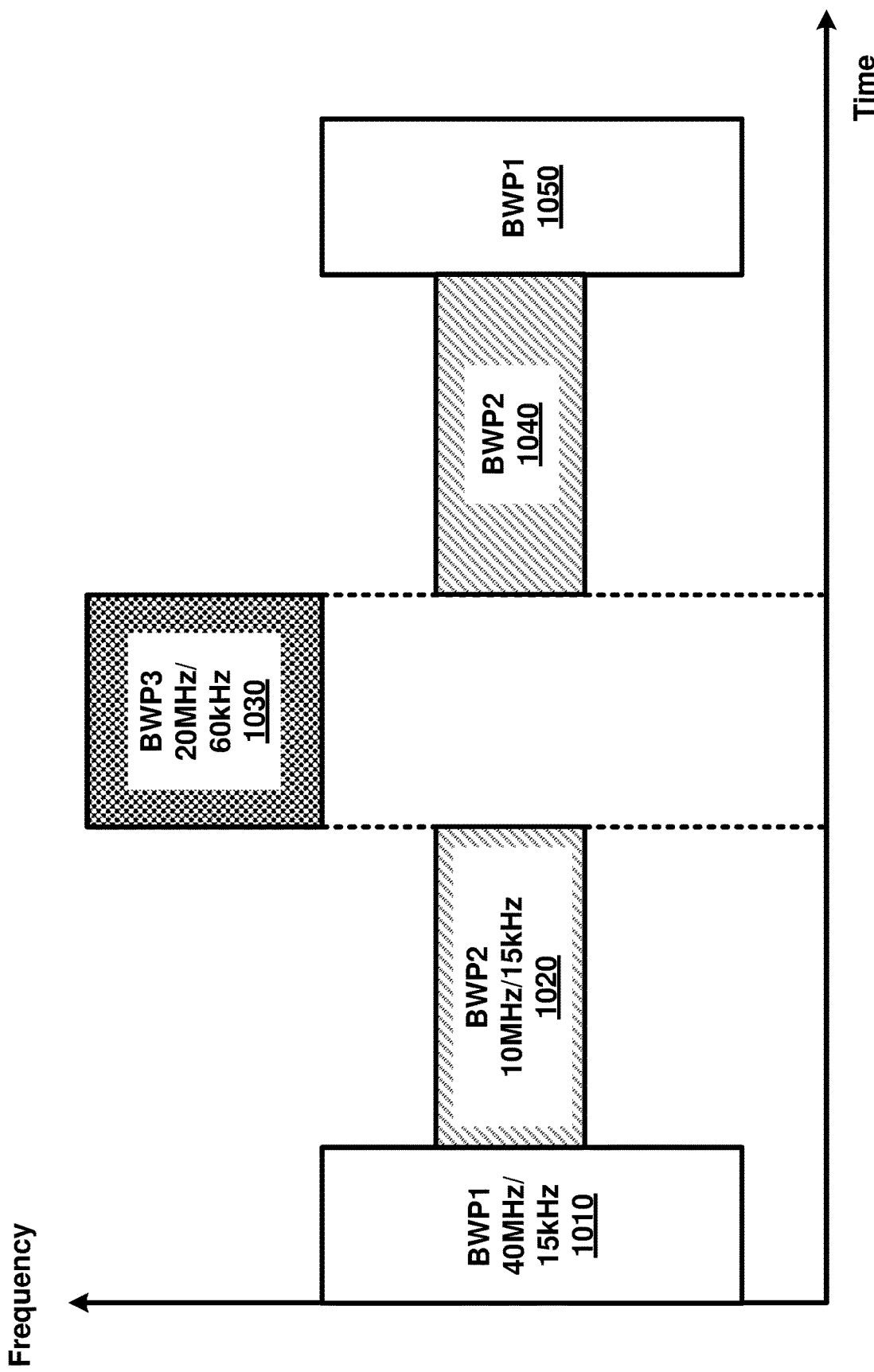
FIG. 10 is an example diagram of configured bandwidth parts (BWPs) as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base station may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
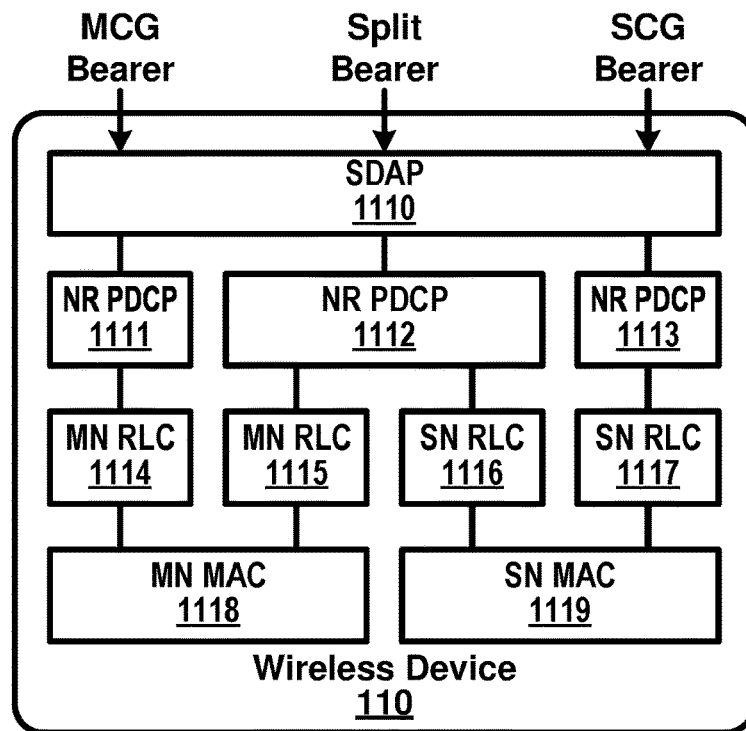
FIG. 11A, and FIG. 11B are diagrams of an example multi connectivity as per an aspect of an embodiment of the present disclosure.
Figure 11B:
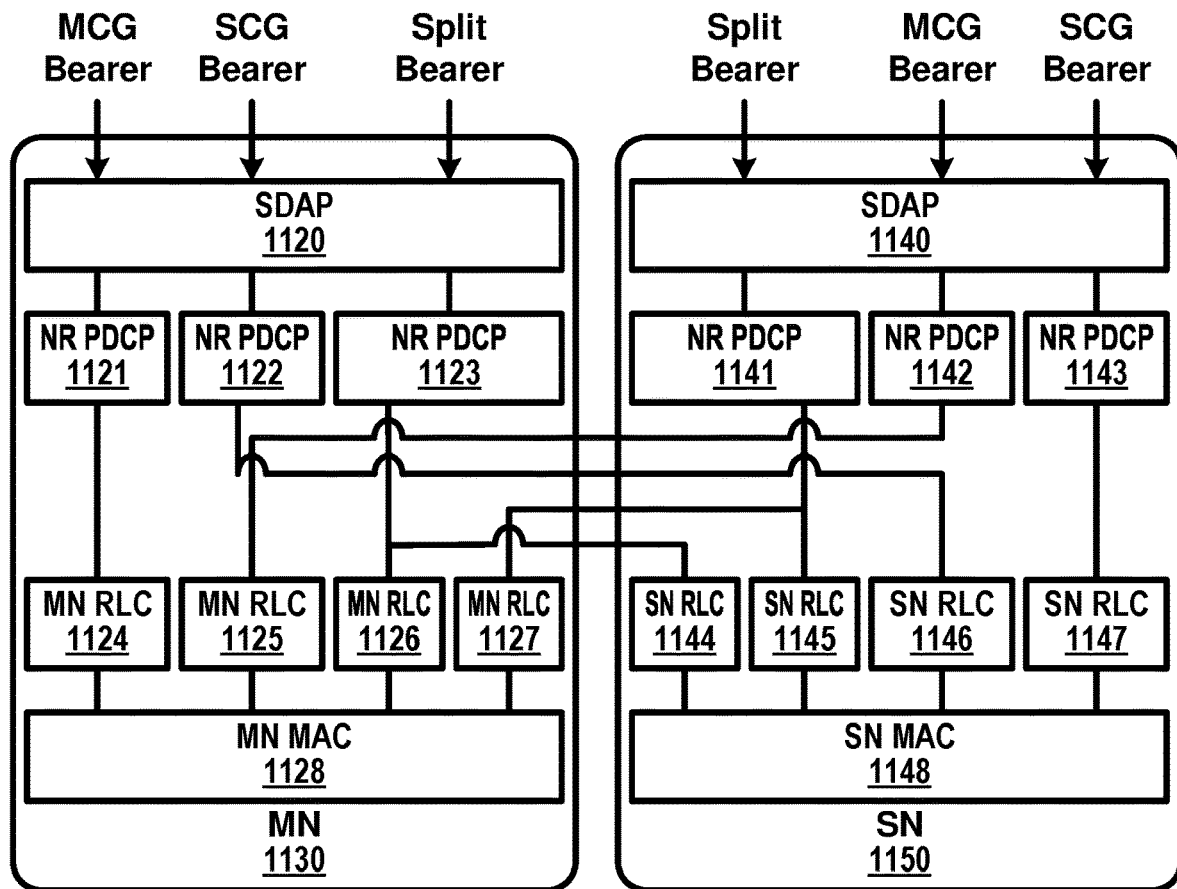

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
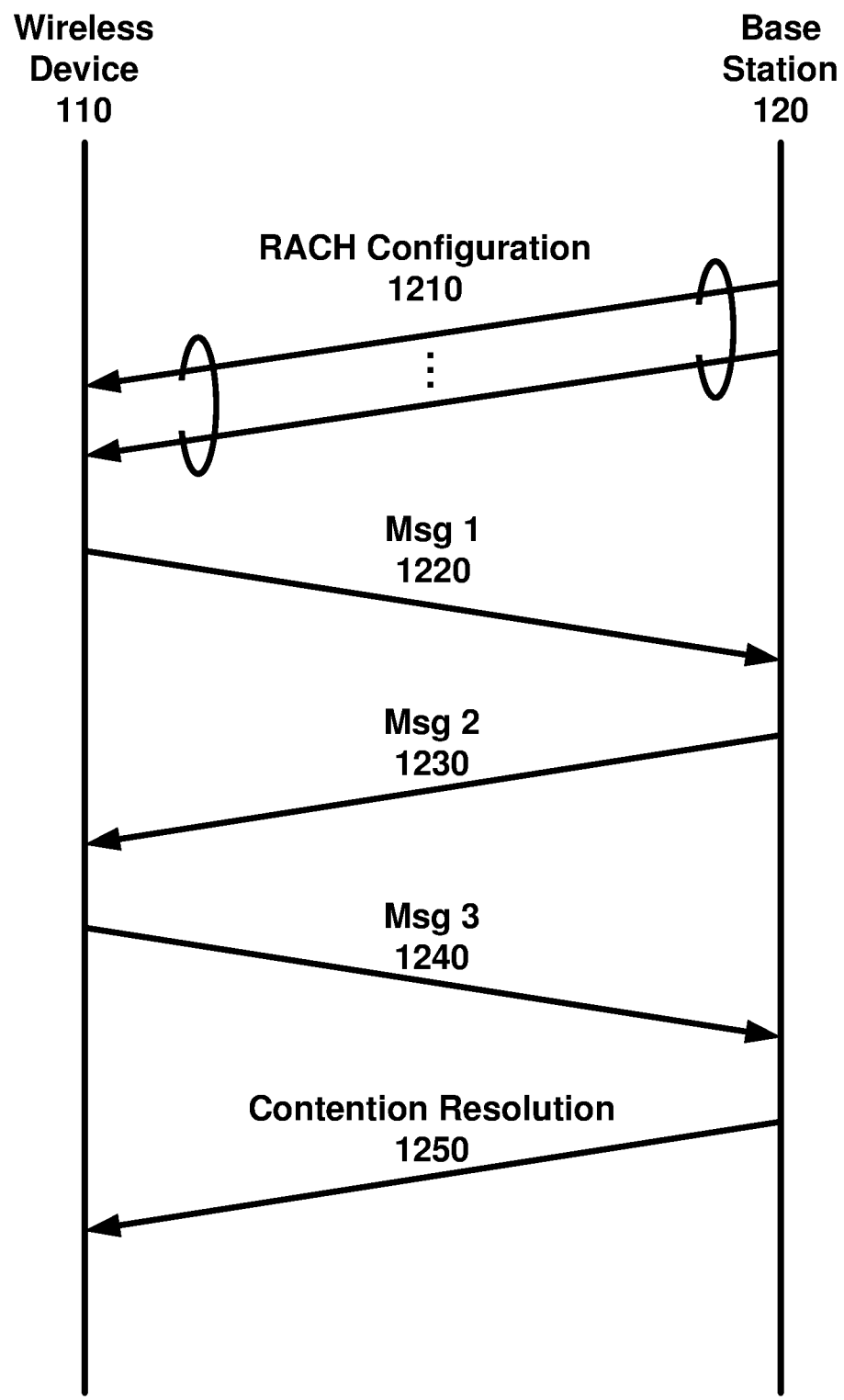
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-Response Window) to monitor response on beam failure recovery request. For example, a UE may start a time window (e.g., ra-Response Window or bfr-Response Window) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
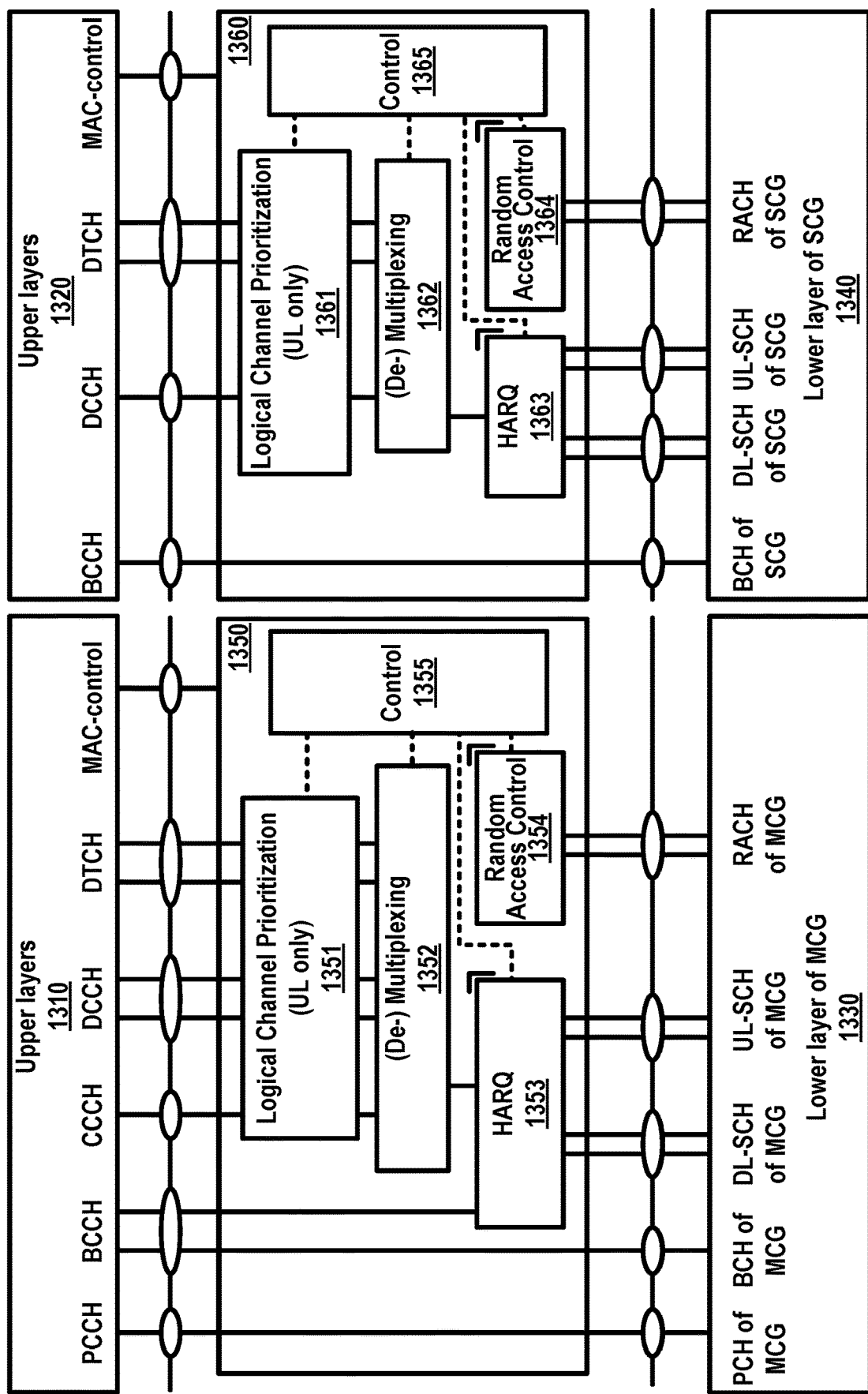
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
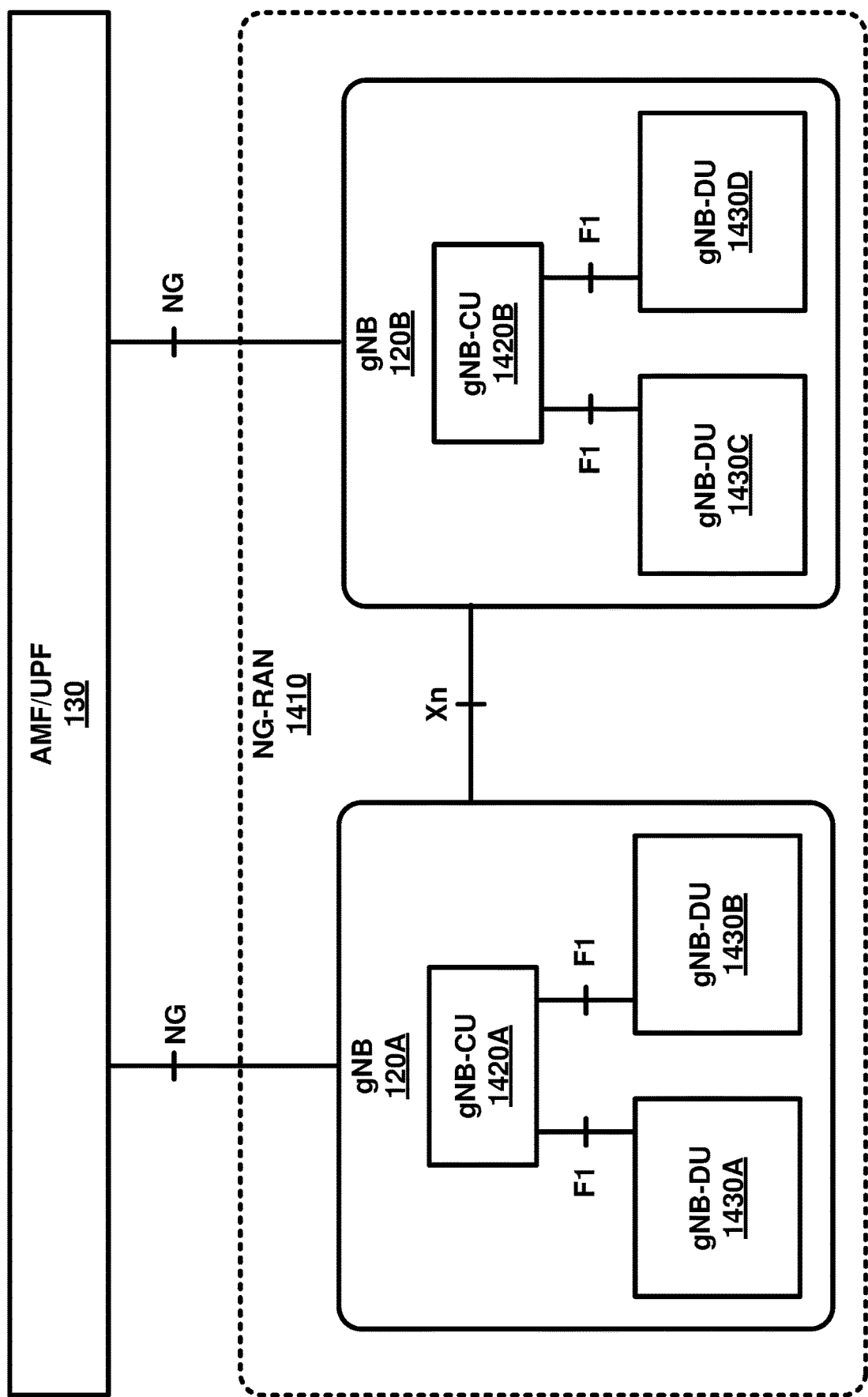
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
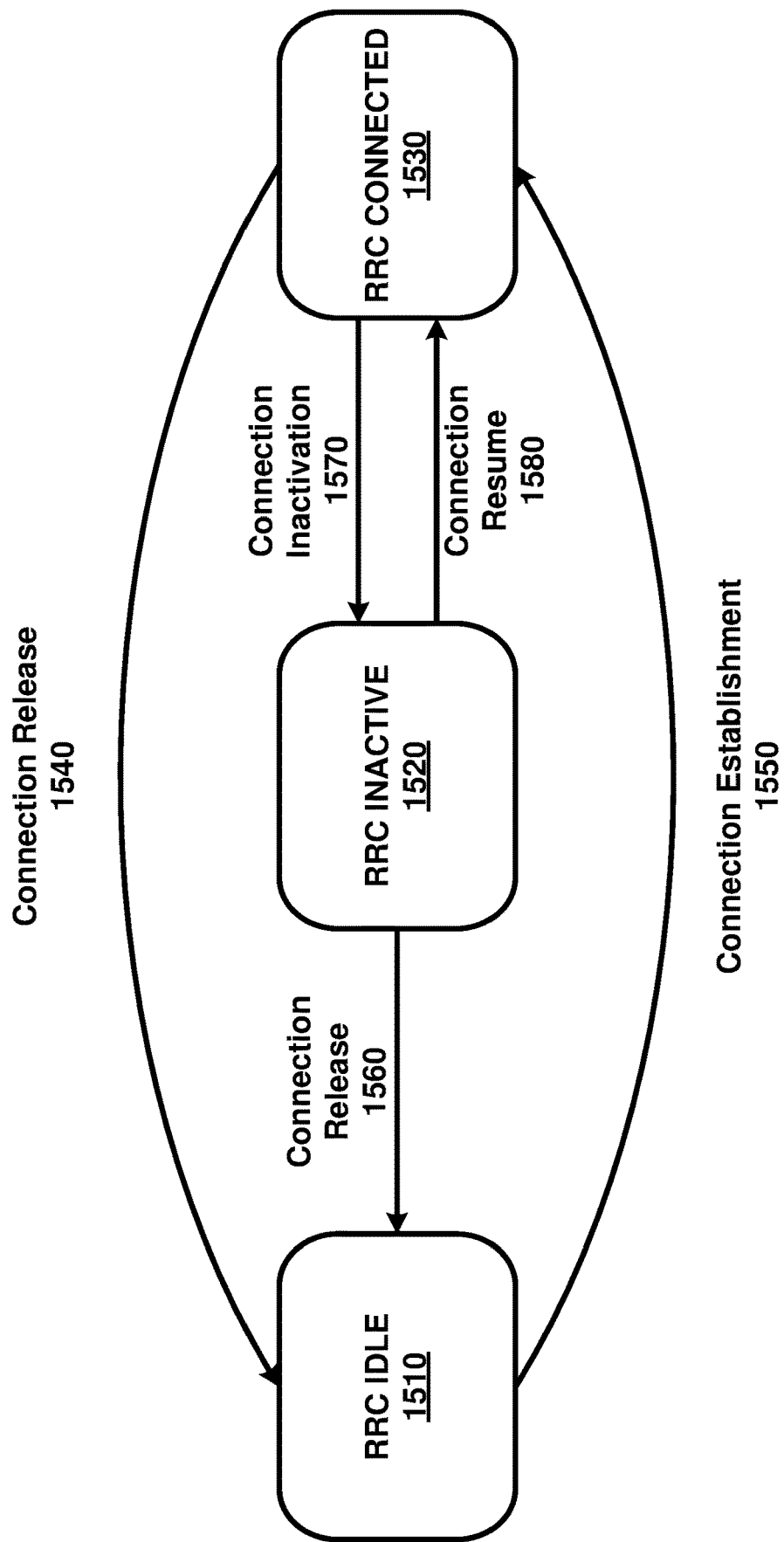
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC_Connected 1530, RRC_Connected), an RRC idle state (e.g. RRC_Idle 1510, RRC_Idle), and/or an RRC inactive state (e.g. RRC_Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

Example Downlink Control Information (DCI)

In an example, a gNB may transmit a DCI via a PDCCH for at least one of: scheduling assignment/grant; slot format notification; pre-emption indication; and/or power-control commends. More specifically, the DCI may comprise at least one of: identifier of a DCI format; downlink scheduling assignment(s); uplink scheduling grant(s); slot format indicator; pre-emption indication; power-control for PUCCH/PUSCH; and/or power-control for SRS.

In an example, a downlink scheduling assignment DCI may comprise parameters indicating at least one of: identifier of a DCI format; PDSCH resource indication; transport format; HARQ information; control information related to multiple antenna schemes; and/or a command for power control of the PUCCH.

In an example, an uplink scheduling grant DCI may comprise parameters indicating at least one of: identifier of a DCI format; PUSCH resource indication; transport format; HARQ related information; and/or a power control command of the PUSCH.

In an example, different types of control information may correspond to different DCI message sizes. For example, supporting multiple beams and/or spatial multiplexing in the spatial domain and noncontiguous allocation of RBs in the frequency domain may require a larger scheduling message, in comparison with an uplink grant allowing for frequency-contiguous allocation. DCI may be categorized into different DCI formats, where a format corresponds to a certain message size and/or usage.

In an example, a wireless device may monitor one or more PDCCH for detecting one or more DCI with one or more DCI format, in common search space or wireless device-specific search space. In an example, a wireless device may monitor PDCCH with a limited set of DCI format, to save power consumption. The more DCI format to be detected, the more power be consumed at the wireless device.

In an example, the information in the DCI formats for downlink scheduling may comprise at least one of: identifier of a DCI format; carrier indicator; frequency domain resource assignment; time domain resource assignment; bandwidth part indicator; HARQ process number; one or more MCS; one or more NDI; one or more RV; MIMO related information; Downlink assignment index (DAI); PUCCH resource indicator; PDSCH-to-HARQ_feedback timing indicator; TPC for PUCCH; SRS request; and padding if necessary. In an example, the MIMO related information may comprise at least one of: PMI; precoding information; transport block swap flag; power offset between PDSCH and reference signal; reference-signal scrambling sequence; number of layers; and/or antenna ports for the transmission; and/or Transmission Configuration Indication (TCI).

In an example, the information in the DCI formats used for uplink scheduling may comprise at least one of: an identifier of a DCI format; carrier indicator; bandwidth part indication; resource allocation type; frequency domain resource assignment; time domain resource assignment; MCS; NDI; Phase rotation of the uplink DMRS; precoding information; CSI request; SRS request; Uplink index/DAI; TPC for PUSCH; and/or padding if necessary.

In an example, a gNB may perform CRC scrambling for a DCI, before transmitting the DCI via a PDCCH. The gNB may perform CRC scrambling by binary addition of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, or TPC-SRS-RNTI) and the CRC bits of the DCI. The wireless device may check the CRC bits of the DCI, when detecting the DCI. The wireless device may receive the DCI when the CRC is scrambled by a sequence of bits that is the same as the at least one wireless device identifier.

In an example, in order to support wide bandwidth operation, a gNB may transmit one or more PDCCH in different control resource sets (coresets). A gNB may transmit one or more RRC message comprising configuration parameters of one or more coresets. A coreset may comprise at least one of: a first OFDM symbol; a number of consecutive OFDM symbols; a set of resource blocks; a CCE-to-REG mapping. In an example, a gNB may transmit a PDCCH in a dedicated coreset for particular purpose, for example, for beam failure recovery confirmation.

In an example, a wireless device may monitor PDCCH for detecting DCI in one or more configured coresets, to reduce the power consumption.

Example MAC PDU Structure.

A gNB may transmit one or more MAC PDU to a wireless device. In an example, a MAC PDU may be a bit string that is byte aligned (e.g., multiple of eight bits) in length. In an example, bit strings may be represented by tables in which the most significant bit is the leftmost bit of the first line of the table, and the least significant bit is the rightmost bit on the last line of the table, and more generally, the bit string may be read from the left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., multiple of eight bits) in length. In an example, a MAC SDU may be included into a MAC PDU from the first bit onward.

In an example, a MAC CE may be a bit string that is byte aligned (e.g., multiple of eight bits) in length.

In an example, a MAC subheader may be a bit string that is byte aligned (e.g., multiple of eight bits) in length. In an example, a MAC subheader may be placed immediately in front of the corresponding MAC SDU, or MAC CE, or padding.

In an example, a MAC entity may ignore a value of reserved bits in a DL MAC PDU.

In an example, a MAC PDU may comprise one or more MAC subPDUs. a MAC subPDU of the one or more MAC subPDUs may comprise at least one of: a MAC subheader only (including padding); a MAC subheader and a MAC SDU; a MAC subheader and a MAC CE; and/or a MAC subheader and padding. In an example, the MAC SDU may be of variable size. In an example, a MAC subheader may correspond to a MAC SDU, or a MAC CE, or padding.

In an example, a MAC subheader may comprise: an R field with one bit; a F field with one bit in length; a LCID field with multiple bits in length; a L field with multiple bits in length, when the MAC subheader corresponds to a MAC SDU, or a variable-sized MAC CE, or padding.

In an example, a MAC subheader may comprise an eight-bit L field. In the example, the LCID field may have six bits in length, and the L field may have eight bits in length. In an example, a MAC subheader may comprise a sixteen-bit L field. In the example, the LCID field may have six bits in length, and the L field may have sixteen bits in length.

In an example, a MAC subheader may comprise: a R field with two bits in length; and a LCID field with multiple bits in length, when the MAC subheader corresponds to a fixed sized MAC CE, or padding. In an example, the LCID field may have six bits in length, and the R field may have two bits in length.

In an example DL MAC PDU, multiple MAC CEs may be placed together. A MAC subPDU comprising MAC CE may be placed before any MAC subPDU comprising a MAC SDU, or a MAC subPDU comprising padding.

In an example UL MAC PDU, multiple MAC CEs may be placed together. A MAC subPDU comprising MAC CE may be placed after all MAC subPDU comprising a MAC SDU. The MAC subPDU may be placed before a MAC subPDU comprising padding.

In an example, a MAC entity of a gNB may transmit to a MAC entity of a wireless device one or more MAC CEs. In an example, multiple LCIDs may be associated with the one or more MAC CEs. In the example, the one or more MAC CEs may comprise at least one of: a SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a UE contention resolution identity MAC CE; a timing advance command MAC CE; a DRX command MAC CE; a Long DRX command MAC CE; a SCell activation/deactivation MAC CE (1 Octet); a SCell activation/deactivation MAC CE (4 Octet); and/or a duplication activation/deactivation MAC CE. In an example, a MAC CE may have a LCID in the corresponding MAC subheader. Different MAC CE may have different LCID in the corresponding MAC subheader. For example, the LCID with 111011 in a MAC subheader may indicate a MAC CE associated with the MAC subheader is a long DRX command MAC CE.

In an example, the MAC entity of the wireless device may transmit to the MAC entity of the gNB one or more MAC CEs. In an example, the one or more MAC CEs may comprise at least one of: a short buffer status report (BSR) MAC CE; a long BSR MAC CE; a C-RNTI MAC CE; a configured grant confirmation MAC CE; a single entry PHR MAC CE; a multiple entry PHR MAC CE; a short truncated BSR; and/or a long truncated BSR. In an example, a MAC CE may have a LCID in the corresponding MAC subheader. Different MAC CE may have different LCID in the corresponding MAC subheader. For example, the LCID with 111011 in a MAC subheader may indicate a MAC CE associated with the MAC subheader is a short-truncated command MAC CE.

Example of Carrier Aggregation

In a carrier aggregation (CA), two or more component carriers (CCs) may be aggregated. A wireless device may simultaneously receive or transmit on one or more CCs depending on capabilities of the wireless device. In an example, the CA may be supported for contiguous CCs. In an example, the CA may be supported for non-contiguous CCs.

When configured with a CA, a wireless device may have one RRC connection with a network. During an RRC connection establishment/re-establishment/handover, a cell providing a NAS mobility information may be a serving cell. During an RRC connection re-establishment/handover procedure, a cell providing a security input may be a serving cell. In an example, the serving cell may be referred to as a primary cell (PCell). In an example, a gNB may transmit, to a wireless device, one or more messages comprising configuration parameters of a plurality of one or more secondary cells (SCells), depending on capabilities of the wireless device.

When configured with CA, a base station and/or a wireless device may employ an activation/deactivation mechanism of an SCell for an efficient battery consumption. When a wireless device is configured with one or more SCells, a gNB may activate or deactivate at least one of the one or more SCells. Upon configuration of an SCell, the SCell may be deactivated.

In an example, a wireless device may activate/deactivate an SCell in response to receiving an SCell Activation/Deactivation MAC CE.

In an example, a base station may transmit, to a wireless device, one or more messages comprising an sCellDeactivationTimer timer. In an example, a wireless device may deactivate an SCell in response to an expiry of the sCellDeactivationTimer timer.

When a wireless device receives an SCell Activation/Deactivation MAC CE activating an SCell, the wireless device may activate the SCell. In response to the activating the SCell, the wireless device may perform operations comprising SRS transmissions on the SCell, CQI/PMI/RI/ CRI reporting for the SCell on a PCell, PDCCH monitoring on the SCell, PDCCH monitoring for the SCell on the PCell, and/or PUCCH transmissions on the SCell.

In an example, in response to the activating the SCell, the wireless device may start or restart an sCellDeactivationTimer timer associated with the SCell. The wireless device may start the sCellDeactivationTimer timer in the slot when the SCell Activation/Deactivation MAC CE has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

In an example, when a wireless device receives an SCell Activation/Deactivation MAC CE deactivating an activated SCell, the wireless device may deactivate the activated SCell.

In an example, when an sCellDeactivationTimer timer associated with an activated SCell expires, the wireless device may deactivate the activated SCell. In response to the deactivating the activated SCell, the wireless device may stop the sCellDeactivationTimer timer associated with the activated SCell. In an example, in response to the deactivating the activated SCell, the wireless device may clear one or more configured downlink assignments and/or one or more configured uplink grant Type 2 associated with the activated SCell. In an example, in response to the deactivating the activated SCell, the wireless device may further suspend one or more configured uplink grant Type 1 associated with the activated SCell. The wireless device may flush HARQ buffers associated with the activated SCell.

In an example, when an SCell is deactivated, a wireless device may not perform operations comprising transmitting SRS on the SCell, reporting CQI/PMI/RI/CRI for the SCell on a PCell, transmitting on UL-SCH on the SCell, transmitting on RACH on the SCell, monitoring at least one first PDCCH on the SCell, monitoring at least one second PDCCH for the SCell on the PCell, transmitting a PUCCH on the SCell.

In an example, when at least one first PDCCH on an activated SCell indicates an uplink grant or a downlink assignment, a wireless device may restart an sCellDeactivationTimer timer associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart an sCellDeactivationTimer timer associated with the activated SCell.

In an example, when an SCell is deactivated, if there is an ongoing random access procedure on the SCell, a wireless device may abort the ongoing random access procedure on the SCell.

Example of SCell Activation/Deactivation MAC-CE

An example SCell Activation/Deactivation MAC CE may comprise one octet. A first MAC PDU subheader with a first LCID may identify the SCell Activation/Deactivation MAC CE of one octet. The SCell Activation/Deactivation MAC CE of one octet may have a fixed size. The SCell Activation/ Deactivation MAC CE of one octet may comprise a single octet. The single octet may comprise a first number of C-fields (e.g. seven) and a second number of R-fields (e.g. one).

An example SCell Activation/Deactivation MAC CE may comprise four octets. A second MAC PDU subheader with a second LCID may identify the SCell Activation/Deactivation MAC CE of four octets. The SCell Activation/ Deactivation MAC CE of four octets may have a fixed size. The SCell Activation/Deactivation MAC CE of four octets may comprise four octets. The four octets may comprise a third number of C-fields (e.g. 31) and a fourth number of R-fields (e.g. 1).

In an example, a $C_i$ field may indicate an activation/ deactivation status of an SCell with an SCell index i, if a SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In an example, an R field may indicate a reserved bit. The R field may be set to zero.

Example of Beam Management

A base station may configure a wireless device with a list of one or more TCI-State configurations by a higher layer parameter PDSCH-Config for a serving cell. A number of the one or more TCI states may depend on a capability of the wireless device. The wireless device may use the one or more TCI-States to decode a PDSCH according to a detected PDCCH with a DCI. The DCI may be intended for the wireless device and a serving cell of the wireless device.

In an example, a TCI state of the one or more TCI-State configurations may contain one or more parameters. The wireless device may use the one or more parameters to configure a quasi co-location relationship between one or two downlink reference signals (e.g., first DL RS and second DL RS) and DM-RS ports of a PDSCH. The quasi co-location relationship may be configured by a higher layer parameter qcl-Type1 for the first DL RS. The quasi co-location relationship may be configured by a higher layer parameter qcl-Type2 for the second DL RS (if configured).

In an example, when the wireless device configures a quasi co-location relationship between the two downlink reference signals (e.g., first DL RS and second DL RS), a first QCL type of the first DL RS and a second QCL type of the second DL RS may not be the same. In an example, the first DL RS and the second DL RS may be the same. In an example, the first DL RS and the second DL RS may be different.

In an example, a quasi co-location type (e.g., the first QCL type, the second QCL type) of a DL RS (e.g., the first DL RS, the second DL RS) may be provided to the wireless device by a higher layer parameter qcl-Type in QCL-Info. The higher layer parameter QCL-Type may take at least one of: QCL-TypeA: {Doppler shift, Doppler spread, average delay, delay spread}; QCL-TypeB: {Doppler shift, Doppler spread}; QCL-TypeC: {average delay, Doppler shift} and QCL-TypeD: {Spatial Rx parameter}.

In an example, a wireless device may receive an activation command. The activation command may be used to map one or more TCI states (e.g., up to 8) to one or more codepoints of a DCI field "Transmission Configuration Indication (TCI)". In an example, the wireless device may transmit a HARQ-ACK corresponding to a PDSCH in slot n. The PDSCH may comprise/carry the activation command. In response to the transmitting the HARQ-ACK in the slot n, the wireless device may apply the mapping between the one or more TCI states and the one or more codepoints of the DCI field "Transmission Configuration Indication" starting from slot $n+3N_{slot}^{subframe,\mu}+1$.

In an example, after the wireless device receives an initial higher layer configuration of one or more TCI states and before the reception of the activation command, the wireless device may assume that one or more DM-RS ports of a PDSCH of a serving cell are quasi co-located with an SSB/PBCH block. In an example, the wireless device may determine the SSB/PBCH block in an initial access procedure with respect 'QCL-TypeA'. In an example, the wireless device may determine the SSB/PBCH block in the initial access procedure with respect to 'QCL-TypeD' (when applicable).

In an example, a wireless device may be configured, by a base station, with a higher layer parameter TCI-PresentInDCI. When the higher layer parameter TCI-PresentInDCI is set as 'enabled' for a control resource set (coreset) scheduling a PDSCH, the wireless device may assume that a TCI field is present in a DCI format (e.g., DCI format 1_1) of a PDCCH transmitted on the CORESET.

In an example, a base station may not configure a coreset with a higher layer parameter TCI-PresentInDCI. In an example, the coreset may schedule a PDSCH. In an example, a time offset between a reception of a DCI (e.g., DCI format 1_1, DCI format 1_0) received in the coreset and the (corresponding) PDSCH may be equal to or greater than a threshold (e.g., Threshold-Sched-Offset). In an example, the threshold may be based on a reported UE capability. In an example, the wireless device may apply a second TCI state for the coreset used for a PDCCH transmission of the DCI. In an example, the wireless device may apply a second QCL assumption for the coreset used for a PDCCH transmission of the DCI. In an example, in response to the base station not configuring the coreset with the higher layer parameter TCI-PresentInDCI and the time offset between the reception of the DCI and the PDSCH being equal or greater than the threshold, the wireless device may assume, in order to determine antenna port quasi co-location of the PDSCH, that a first TCI state or a first QCL assumption for the PDSCH is identical to the second TCI state or the second QCL assumption applied for the coreset.

In an example, a base station may configure a coreset with a higher layer parameter TCI-PresentInDCI. In an example, the higher layer parameter TCI-PresentInDCI may be set as "enabled". In an example, the coreset may schedule a PDSCH with a DCI (e.g., DCI format 1_0). In an example, the DCI may not comprise a TCI field. In an example, a time offset between a reception of the DCI received in the coreset and the (corresponding) PDSCH may be equal to or greater than a threshold (e.g., Threshold-Sched-Offset). In an example, the threshold may be based on a reported UE capability. In an example, the wireless device may apply a second TCI state for the coreset used for a PDCCH transmission of the DCI. In an example, the wireless device may apply a second QCL assumption for the coreset used for a PDCCH transmission of the DCI. In an example, in response to the base station scheduling the PDSCH with the DCI not comprising the TCI field and the time offset between the reception of the DCI and the PDSCH being equal or greater than the threshold, the wireless device may assume, in order to determine antenna port quasi co-location of the PDSCH, that a first TCI state or a first QCL assumption for the PDSCH is identical to the second TCI state or the second QCL assumption applied for the coreset.

In an example, a base station may configure a coreset with a higher layer parameter TCI-PresentInDCI. In an example, the higher layer parameter TCI-PresentInDCI may be set as "enabled". The wireless device may receive a DCI in the coreset of a scheduling component carrier. The DCI may comprise a TCI field. In response to the higher layer parameter TCI-PresentinDCI being set as 'enabled', the TCI field in the DCI in the scheduling component carrier may point to one or more activated TCI states (e.g., after receiving the activation command) in a scheduled component carrier or in a DL BWP.

In an example, a base station may configure a coreset with a higher layer parameter TCI-PresentInDCI. In an example, the higher layer parameter TCI-PresentInDCI may be set as "enabled". The wireless device may receive a DCI (e.g., DCI format 1_1) in the coreset. In an example, the DCI may schedule a PDSCH of a wireless device. In an example, a TCI field may be present in the DCI. In an example, a time offset between a reception of the DCI and the (corresponding scheduled) PDSCH may be equal to or greater than a threshold (e.g., Threshold-Sched-Offset). In an example, the threshold may be based on a reported UE capability. In an example, in response to the TCI field being present in the DCI scheduling the PDSCH and the higher layer parameter TCI-PresentinDCI being set as 'enabled' for the coreset, the wireless device may, in order to determine antenna port quasi co-location for the PDSCH, use a TCI State according to a value of the TCI field in a detected PDCCH with the DCI. In an example, the using the TCI State according to the value of the TCI field may comprise that the wireless device may assume that one or more DM-RS ports of the PDSCH of a serving cell are quasi co-located with one or more RS(s) in the TCI State with respect to one or more QCL type parameter(s) given by the TCI state when the time offset between the reception of the DCI and the PDSCH is equal or greater than the threshold. In an example, the value of the TCI field may indicate the TCI state.

In an example, a base station may configure a wireless device with a single slot PDSCH. In an example, the single slot PDSCH may be scheduled in a slot. In an example, the base station may activate one or more TCI states in the slot. In response to being configured with the single slot PDSCH, a TCI state (e.g., indicated by a TCI field in a DCI scheduling the single slot PDSCH) may be based on the one or more activated TCI states in the slot with the scheduled single slot PDSCH. In an example, the TCI state may be one of the one or more activated TCI states in the slot. In an example, the TCI field in the DCI may indicate a TCI state of the one or more activated TCI states in the slot.

In an example, a wireless device may be configured with a coreset. In an example, the coreset may be associated with a search space set for cross-carrier scheduling. In an example, in response to the coreset being associated with the search space set for cross-carrier scheduling, the wireless device may expect the higher layer parameter TCI-PresentInDCI set as 'enabled' for the coreset. In an example, a base station may configure a serving cell with one or more TCI states. In an example, the wireless device may detect, in the search space set, a PDCCH, with a DCI, scheduling a PDSCH. In an example, a TCI field in the DCI may indicate at least one of the one or more TCI states. In an example, the at least one of the one more TCI states (scheduled by the search space set) may comprise/contain a QCL type (e.g., QCL-TypeD). In an example, in response to the at least one of the one or more TCI states scheduled by the search space set containing the QCL type, the wireless device may expect a time offset between a reception of the PDCCH detected in the search space set and the (corresponding) PDSCH is larger than or equal to the threshold (e.g., Threshold-Sched-Offset).

In an example, a base station may configure a coreset with a higher layer parameter TCI-PresentInDCI. In an example, the higher layer parameter TCI-PresentInDCI may be set as "enabled". In an example, when the higher layer parameter TCI-PresentInDCI is set to 'enabled' for the coreset, an offset between a reception of a DCI in the coreset and a PDSCH scheduled by the DCI may be less than the threshold (e.g., Threshold-Sched-Offset).

In an example, a base station may not configure a coreset with a higher layer parameter TCI-PresentInDCI. In an example, the wireless device may be in an RRC connected mode. In an example, the wireless device may be in an RRC idle mode. In an example, the wireless device may be in an RRC inactive mode. In an example, when the higher layer parameter TCI-PresentInDCI is not configured for the coreset, an offset between a reception of a DCI in the coreset and a PDSCH scheduled by the DCI may be less than the threshold (e.g., Threshold-Sched-Offset).

In an example, a wireless device may monitor one or more coresets (or one or more search spaces) within/in an active BWP (e.g., active downlink BWP) of a serving cell in one or more slots. In an example, the monitoring the one or more coresets within/in the active BWP of the serving cell in the one or more slots may comprise monitoring at least one coreset within/in the active BWP of the serving cell in each slot of the one or more slots. In an example, a latest slot of the one or more slots may occur latest in time. In an example, the wireless device may monitor, within/in the active BWP of the serving cell, one or more second coresets of the one or more coresets in the latest slot. In response to the monitoring the one or more second coresets in the latest slot and the latest slot occurring latest in time, the wireless device may determine the latest slot. In an example, each coreset of the one or more second coresets may be identified by a coreset specific index (e.g., indicated by a higher layer CORESET-ID). In an example, a coreset specific index of a coreset of the one or more secondary coresets may be the lowest among the coreset specific indices of the one or more second coresets. In an example, the wireless device may monitor a search space associated with the coreset in the latest slot. In an example, in response to the coreset specific index of the coreset being the lowest and the monitoring the search space associated with the coreset in the latest slot, the wireless device may select the coreset of the one or more secondary coresets.

In an example, when the offset between the reception of the DCI in the coreset and the PDSCH scheduled by the DCI is less than the threshold (e.g., Threshold-Sched-Offset), the wireless device may assume that one or more DM-RS ports of the PDSCH of a serving cell are quasi co-located with one or more RSs in a TCI state with respect to one or more QCL type parameter(s). The one or more RSs in the TCI state may be used for PDCCH quasi co-location indication of the (selected) coreset of the one or more second coresets in response to the selecting the coreset.

In an example, a wireless device may receive a DCI via a PDCCH in a coreset. In an example, the DCI may schedule a PDSCH. In an example, an offset between a reception of the DCI and the PDSCH may be less than a threshold (e.g., Threshold-Sched-Offset). A first QCL type (e.g., 'QCL-TypeD') of one or more DM-RS ports of the PDSCH may be different from a second QCL type (e.g., 'QCL-TypeD') of one or more second DM-RS ports of the PDCCH. In an example, the PDSCH and the PDCCH may overlap in at least one symbol. In an example, in response to the PDSCH and the PDCCH overlapping in at least one symbol and the first QCL type being different from the second QCL type, the wireless device may prioritize a reception of the PDCCH associated with the coreset. In an example, the prioritizing may apply to an intra-band CA case (when the PDSCH and the coreset are in different component carriers). In an example, the prioritizing the reception of the PDCCH may comprise receiving the PDSCH with the second QCL type of one or more second DM-RS ports of the PDCCH. In an example, the prioritizing the reception of the PDCCH may comprise overwriting the first QCL type of the one or more DM-RS ports of the PDSCH with the second QCL type of the one or more second DM-RS ports of the PDCCH. In an example, the prioritizing the reception of the PDCCH may comprise assuming a spatial QCL of the PDCCH (e.g., the second QCL type), for the simultaneous reception of the PDCCH and PDSCH, on the PDSCH. In an example, the prioritizing the reception of the PDCCH may comprise applying a spatial QCL of the PDCCH (e.g., the second QCL type), for the simultaneous reception of the PDCCH and PDSCH, on the PDSCH.

In an example, none of the configured TCI states may contain a QCL type (e.g., 'QCL-TypeD'). In response to the none of the configured TCI states containing the QCL type, the wireless device may obtain the other QCL assumptions from the indicated TCI states for its scheduled PDSCH irrespective of the time offset between the reception of the DCI and the corresponding PDSCH.

In an example, a wireless device may use CSI-RS for at least one of: time/frequency tracking, CSI computation, L1-RSRP computation and mobility.

In an example, a base station may configure a wireless device to monitor a coreset on one or more symbols. In an example, a CSI-RS resource may be associated with a NZP-CSI-RS-ResourceSet. A higher layer parameter repetition of the NZP-CSI-RS-ResourceSet may be set to 'on'. In an example, in response to the CSI-RS resource being associated with the NZP-CSI-RS-ResourceSet with the higher layer parameter repetition set to 'on', the wireless device may not expect to be configured with a CSI-RS of the CSI-RS resource over the one or more symbols.

In an example, a higher layer parameter repetition of the NZP-CSI-RS-ResourceSet may not be set to 'on'. In an example, a base station may configure a CSI-RS resource and one or more search space sets associated with a coreset in the same one or more symbols (e.g., OFDM symbols). In an example, in response to the higher layer parameter repetition of the NZP-CSI-RS-ResourceSet not being set to 'on', and the CSI-RS resource and the one or more search space sets associated with the coreset being configured in the same one or more symbols, the wireless device may assume that a CSI-RS of the CSI-RS resource and one or more DM-RS ports of a PDCCH are quasi co-located with 'QCL-TypeD'. In an example, the base station may transmit the PDCCH in the one or more search space sets associated with the coreset.

In an example, a higher layer parameter repetition of the NZP-CSI-RS-ResourceSet may not be set to 'on'. In an example, a base station may configure a CSI-RS resource of a first cell and one or more search space sets associated with a coreset of a second cell in the same one or more symbols (e.g., OFDM symbols). In an example, in response to the higher layer parameter repetition of the NZP-CSI-RS-ResourceSet not being set to 'on', and the CSI-RS resource and the one or more search space sets associated with the coreset being configured in the same one or more symbols, the wireless device may assume that a CSI-RS of the CSI-RS resource and one or more DM-RS ports of a PDCCH are quasi co-located with 'QCL-TypeD'. In an example, the base station may transmit the PDCCH in the one or more search space sets associated with the coreset. In an example, the first cell and the second cell may be in different intra-band component carriers.

In an example, a base station may configure a wireless device with a CSI-RS in a first set of PRBs. In an example, the base station may configure the wireless device with one or more search space sets associated with a coreset in one or more symbols (e.g., OFDM symbols) and in a second set of PRBs. In an example, the wireless device may not expect the first set of PRBs sand the second set of PRBs overlapping in the one or more symbols.

In an example, a base station may configure a wireless device with a CSI-RS resource and an SS/PBCH block in the same one or more (OFDM) symbols. In an example, in response to the CSI-RS resource and the SS/PBCH block being configured in the same one or more (OFDM) symbols, the wireless device may assume that the CSI-RS resource and the SS/PBCH block are quasi co-located with a QCL type (e.g., 'QCL-TypeD').

In an example, the base station may configure the CSI-RS resource in a first set of PRBs for the wireless device. In an example, the base station may configure the SS/PBCH block in a second set of PRBs for the wireless device. In an example, the wireless device may not expect the first set of PRBs overlapping with the second set of PRBs.

In an example, the base station may configure the CSI-RS resource with a first subcarrier spacing for the wireless device. In an example, the base station may configure the SS/PBCH block with a second subcarrier spacing for the wireless device. In an example, the wireless device may expect the first subcarrier spacing and the second subcarrier spacing being the same.

In an example, a base station may configure a wireless device with a NZP-CSI-RS-ResourceSet. In an example, the NZP-CSI-RS-ResourceSet may be configured with a higher layer parameter repetition set to 'on'. In an example, in response to the NZP-CSI-RS-ResourceSet being configured with the higher layer parameter repetition set to 'on', the wireless device may assume that the base station transmits one or more CSI-RS resources within the NZP-CSI-RS-ResourceSet with the same downlink spatial domain transmission filter. In an example, the base station may transmit each CSI-RS resource of the one or more CSI-RS resources in different symbols (e.g., OFDM symbols).

In an example, the NZP-CSI-RS-ResourceSet may be configured with a higher layer parameter repetition set to 'off'. In an example, in response to the NZP-CSI-RS-ResourceSet being configured with the higher layer parameter repetition set to 'off', the wireless device may not assume that the base station transmits one or more CSI-RS resources within the NZP-CSI-RS-ResourceSet with the same downlink spatial domain transmission filter.

In an example, a base station may configure a wireless device with a higher layer parameter groupBasedBeamReporting. In an example, the base station may set the higher layer parameter groupBasedBeamReporting to "enabled". In response to the higher layer parameter groupBasedBeamReporting set to "enabled", the wireless device may report at least two different resource indicators (e.g., CRI, SSBRI) in a single reporting instance for a reporting setting of one or more report settings. In an example, the wireless device may receive at least two RSs (e.g., CSI-RS, SSB) indicated by the at least two different resource indicators simultaneously. In an example, the wireless device may receive the at least two RSs simultaneously with a single spatial domain receive filter. In an example, the wireless device may receive the at least two RSs simultaneously with a plurality of simultaneous spatial domain receive filters.

In an example, a wireless device may be configured, by a base station, with one or more serving cells. In an example, the base station may activate one or more second serving cells of the one or more serving cells. In an example, the base station may configure each activated serving cell of the one or more second serving cells with a respective PDCCH monitoring. In an example, the wireless device may monitor a set of PDCCH candidates in one or more coresets on an active DL BWP of each activated serving cell configured with the respective PDCCH monitoring. In an example, the wireless device may monitor the set of PDCCH candidates in the one or more coresets according to corresponding search space sets. In an example, the monitoring may comprise decoding each PDCCH candidate of the set of PDCCH candidates according to monitored DCI formats.

In an example, a set of PDCCH candidates for a wireless device to monitor may be defined in terms of PDCCH search space sets. In an example, a search space set may be a common search space (CSS) set or a UE specific search space (USS) set.

In an example, one or more PDCCH monitoring occasions may be associated with a SS/PBCH block. In an example, the SS/PBCH block may be quasi-co-located with a CSI-RS. In an example, a TCI state of an active BWP may comprise the CSI-RS. In an example, the active BWP may comprise a coreset identified with index being equal to zero (e.g., Coreset zero). In an example, the wireless device may determine the TCI state by the most recent of: an indication by a MAC CE activation command or a random-access procedure that is not initiated by a PDCCH order that triggers a non-contention based random access procedure. In an example, for a DCI format with CRC scrambled by a C-RNTI, a wireless device may monitor corresponding PDCCH candidates at the one or more PDCCH monitoring occasions in response to the one or more PDCCH monitoring occasions being associated with the SS/PBCH block.

In an example, a base station may configure a wireless device with one or more DL BWPs in a serving cell. In an example, for a DL BWP of the one or more DL BWPs, the wireless device may be provided by a higher layer signaling with one or more (e.g., 2, 3) control resource sets (coresets). For a coreset of the one or more coresets, the base station may provide the wireless device, by a higher layer parameter ControlResourceSet, at least one of: a coreset index (e.g., provided by higher layer parameter controlResourceSetId), a DMRS scrambling sequence initialization value (e.g., provided by a higher layer parameter pdcch-DMRS-ScramblingID); a number of consecutive symbols (e.g., provided by a higher layer parameter duration), a set of resource blocks (e.g., provided by higher layer parameter frequencyDomainResources), CCE-to-REG mapping parameters (e.g., provided by higher layer parameter cce-REG-MappingType), an antenna port quasi co-location (e.g., from a set of antenna port quasi co-locations provided by a first higher layer parameter tci-StatesPDCCH-ToAddList and a second higher layer parameter tci-StatesPDCCH-ToReleaseList), and an indication for a presence or absence of a transmission configuration indication (TCI) field for a DCI format (e.g., DCI format 1_1) transmitted by a PDCCH in the coreset (e.g., provided by higher layer parameter TCI-PresentInDCI). In an example, the antenna port quasi co-location may indicate a quasi co-location information of one or more DM-RS antenna ports for a PDCCH reception in the coreset. In an example, the coreset index may be unique among the one or more DL BWPs of the serving cell. In an example, when the higher layer parameter TCI-PresentInDCI is absent, the wireless device may consider that a TCI field is absent/disabled in the DCI format.

In an example, a first higher layer parameter tci-StatesPDCCH-ToAddList and a second higher layer parameter tci-StatesPDCCH-ToReleaseList may provide a subset of TCI states defined in pdsch-Config. In an example, the wireless device may use the subset of the TCI states to provide one or more QCL relationships between one or more RS in a TCI state of the subset of the TCI states and one or more DM-RS ports of a PDCCH reception in the coreset.

In an example, a base station may configure a coreset for a wireless device. In an example, a coreset index (e.g., provided by higher layer parameter controlResourceSetId) of the coreset may be non-zero. In an example, the base station may not provide the wireless device with a configuration of one or more TCI states, by a first higher layer parameter tci-StatesPDCCH-ToAddList and/or a second higher layer parameter tci-StatesPDCCH-ToReleaseList, for the coreset. In an example, in response to not being provided with the configuration of the one or more TCI states for the coreset, the wireless device may assume that one or more DMRS antenna ports for a PDCCH reception in the coreset is quasi co-located with an RS (e.g., SS/PBCH block). In an example, the wireless device may identify the RS during an initial access procedure.

In an example, a base station may configure a coreset for a wireless device. In an example, a coreset index (e.g., provided by higher layer parameter controlResourceSetId) of the coreset may be non-zero. In an example, the base station may provide the wireless device with an initial configuration of at least two TCI states, by a first higher layer parameter tci-StatesPDCCH-ToAddList and/or a second higher layer parameter tci-StatesPDCCH-ToReleaseList, for the coreset. In an example, the wireless device may receive the initial configuration of the at least two TCI states from the base station. In an example, the wireless device may not receive a MAC CE activation command for at least one of the at least two TCI states for the coreset. In an example, in response to being provided with the initial configuration for the coreset and not receiving the MAC CE activation command for the coreset, the wireless device may assume that one or more DMRS antenna ports for a PDCCH reception in the coreset is quasi co-located with an RS (e.g., SS/PBCH block). In an example, the wireless device may identify the RS during an initial access procedure.

In an example, a base station may configure a coreset for a wireless device. In an example, a coreset index (e.g., provided by higher layer parameter controlResourceSetId) of the coreset may be equal to zero. In an example, the wireless device may not receive a MAC CE activation command for a TCI state for the coreset. In response to not receiving the MAC CE activation command, the wireless device may assume that one or more DMRS antenna ports for a PDCCH reception in the coreset is quasi co-located with an RS (e.g., SS/PBCH block). In an example, the wireless device may identify the RS during an initial access procedure. In an example, the wireless device may identify the RS from a most recent random-access procedure. In an example, the wireless device may not initiate the most recent random-access procedure in response to receiving a PDCCH order triggering a non-contention based random-access procedure.

In an example, a base station may provide a wireless device with a single TCI state for a coreset. In an example, the base station may provide the single TCI state by a first higher layer parameter tci-StatesPDCCH-ToAddList and/or a second higher layer parameter tci-StatesPDCCH-ToReleaseList. In response to being provided with the single TCI state for the coreset, the wireless device may assume that one or more DM-RS antenna ports for a PDCCH reception in the coreset is quasi co-located with one or more DL RSs configured by the single TCI state.

In an example, a base station may configure a coreset for a wireless device. In an example, the base station may provide the wireless device with a configuration of at least two TCI states, by a first higher layer parameter tci-StatesPDCCH-ToAddList and/or a second higher layer parameter tci-StatesPDCCH-ToReleaseList, for the coreset. In an example, the wireless device may receive the configuration of the at least two TCI states from the base station. In an example, the wireless device may receive a MAC CE activation command for at least one of the at least two TCI states for the coreset. In response to the receiving the MAC CE activation command for the at least one of the at least two TCI states, the wireless device may assume that one or more DM-RS antenna ports for a PDCCH reception in the coreset is quasi co-located with one or more DL RSs configured by the single TCI state.

In an example, a base station may configure a coreset for a wireless device. In an example, a coreset index (e.g., provided by higher layer parameter controlResourceSetId) of the coreset may be equal to zero. In an example, the base station may provide the wireless device with a configuration of at least two TCI states for the coreset. In an example, the wireless device may receive the configuration of the at least two TCI states from the base station. In an example, the wireless device may receive a MAC CE activation command for at least one of the at least two TCI states for the coreset. In an example, in response to the coreset index being equal to zero, the wireless device may expect that a QCL type (e.g., QCL-TypeD) of a first RS (e.g., CSI-RS) in the at least one of the at least two TCI states is provided by a second RS (e.g., SS/PBCH block). In an example, in response to the coreset index being equal to zero, the wireless device may expect that a QCL type (e.g., QCL-TypeD) of a first RS (e.g., CSI-RS) in the at least one of the at least two TCI states is spatial QCL-ed with a second RS (e.g., SS/PBCH block).

In an example, a wireless device may receive a MAC CE activation command for at least one of at least two TCI states for a coreset. In an example, a PDSCH may provide the MAC CE activation command. In an example, the wireless device may transmit a HARQ-ACK information for the PDSCH in a slot. In an example, when the wireless device receives the MAC CE activation command for the at least one of the at least two TCI states for the coreset, in response to the transmitting HARQ-ACK information in the slot, the wireless device may apply the MAC CE activation command X msec (e.g., 3 msec, 5 msec) after the slot. In an example, when the wireless device applies the MAC CE activation command in a second slot, a first BWP may be active in the second slot. In response to the first BWP being active in the second slot, the first BWP may be an active BWP.

In an example, a base station may configure a wireless device with one or more DL BWPs in a serving cell. In an example, for a DL BWP of the one or more DL BWPs, the wireless device may be provided by higher layers with one or more (e.g., 3, 5, 10) search space sets. In an example, for a search space set of the one or more search space sets, the wireless device may be provided, by a higher layer parameter SearchSpace, at least one of: a search space set index (e.g., provided by higher layer parameter searchSpaceId), an association between the search space set and a coreset (e.g., provided by a higher layer parameter controlResourceSetId); a PDCCH monitoring periodicity of a first number of slots and a PDCCH monitoring offset of a second number of slots (e.g., provided by a higher layer parameter monitoringSlotPeriodicityAndOffset); a PDCCH monitoring pattern within a slot, indicating first symbol(s) of the coreset within the slot for PDCCH monitoring, (e.g., provided by a higher layer parameter monitoringSymbolsWithinSlot); a duration of a third number of slots (e.g., provided by a higher layer parameter duration); a number of PDCCH candidates; an indication that the search space set is either a common search space set or a UE-specific search space set (e.g., provided by a higher layer parameter searchSpaceType). In an example, the duration may indicate a number of slots that the search space set may exist.

In an example, the wireless device may determine a PDCCH monitoring occasion on an active DL BWP based on the PDCCH monitoring periodicity, the PDCCH monitoring offset, and the PDCCH monitoring pattern within a slot. In an example, for the search space set, the wireless device may determine that a PDCCH monitoring occasion exists in a slot. In an example, the wireless device may monitor at least one PDCCH for the search space set for the duration of third number of slots (consecutive) starting from the slot.

In an example, a wireless device may monitor one or more PDCCH candidates in a USS set on an active DL BWP of a serving cell. In an example, a base station may not configure the wireless device with a carrier indicator field. In response to not being configured with the carrier indicator field, the wireless device may monitor the one or more PDCCH candidates without the carrier indicator field.

In an example, a wireless device may monitor one or more PDCCH candidates in a USS set on an active DL BWP of a serving cell. In an example, a base station may configure the wireless device with a carrier indicator field. In response to being configured with the carrier indicator field, the wireless device may monitor the one or more PDCCH candidates with the carrier indicator field.

In an example, a base station may configure a wireless device to monitor one or more PDCCH candidates with a carrier indicator field in a first cell. In an example, the carrier indicator field may indicate a second cell. In an example, the carrier indicator field may correspond to a second cell. In response to monitoring the one or more PDCCH candidates, in the first cell, with the carrier indicator field indicating the second cell, the wireless device may not expect to monitor the one or more PDCCH candidates on an active DL BWP of the second cell.

In an example, a wireless device may monitor one or more PDCCH candidates on an active DL BWP of a serving cell. In response to the monitoring the one or more PDCCH candidates on the active DL BWP of the serving cell, the wireless device may monitor the one or more PDCCH candidates for the serving cell.

In an example, a wireless device may monitor one or more PDCCH candidates on an active DL BWP of a serving cell. In response to the monitoring the one or more PDCCH candidates on the active DL BWP of the serving cell, the wireless device may monitor the one or more PDCCH candidates at least for the serving cell. In an example, the wireless device may monitor the one or more PDCCH candidates for the serving cell and at least a second serving cell.

In an example, a base station may configure a wireless device with one or more cells. In an example, when a number of the one or more cells is one, the base station may configure the wireless device for a single-cell operation. In an example, when a number of the one or more cells is more than one, the base station may configure the wireless device for an operation with a carrier aggregation in a same frequency band (e.g., intra-band).

In an example, the wireless device may monitor one or more PDCCH candidates in overlapping PDCCH monitoring occasions in a plurality of coresets on active DL BWP(s) of the one or more cells. In an example, the plurality of the coresets may have a different QCL-TypeD property.

In an example, a first PDCCH monitoring occasion in a first coreset, of the plurality of coresets, of a first cell of the one or more cells may overlap with a second PDCCH monitoring occasion in a second coreset, of the plurality of coresets, of the first cell. In an example, the wireless device may monitor at least one first PDCCH candidate in the first PDCCH monitoring occasion on an active DL BWP, of the active DL BWP(s), of the first cell. In an example, the wireless device may monitor at least one second PDCCH candidate in the second PDCCH monitoring occasion on the active DL BWP, of the active DL BWP(s), of the first cell.

In an example, a first PDCCH monitoring occasion in a first coreset, of the plurality of coresets, of a first cell of the one or more cells may overlap with a second PDCCH monitoring occasion in a second coreset, of the plurality of coresets, of a second cell of the one or more cells. In an example, the wireless device may monitor at least one first PDCCH candidate in the first PDCCH monitoring occasion on a first active DL BWP, of the active DL BWP(s), of the first cell. In an example, the wireless device may monitor at least one second PDCCH candidate in the second PDCCH monitoring occasion on a second active DL BWP, of the active DL BWP(s), of the second cell.

In an example, a first QCL type property (e.g., QCL-TypeD) of the first coreset may be different from a second QCL type property (e.g., QCL-TypeD) of the second coreset.

In an example, in response to the monitoring the one or more PDCCH candidates in the overlapping PDCCH monitoring occasions in the plurality of coresets and the plurality of the coresets having the different QCL-TypeD property, for a coreset determination rule, the wireless device may determine a selected coreset, of the plurality of the coresets, of a cell of the one or more cells. In an example, in response to the determining, the wireless device may monitor at least one PDCCH candidate, in the overlapping PDCCH monitoring occasions, in the selected coreset on an active DL BWP of the cell. In an example, the selected coreset may be associated with a search space set (e.g., association provided by a higher layer parameter controlResourceSetId).

In an example, one or more coresets of the plurality of coresets may be associated with a CSS set. In an example, the one or more coresets of the plurality of coresets being associated with the CSS set may comprise that at least one search space set of a coreset (e.g., association between the at least one search space set and the coreset provided by a higher layer parameter controlResourceSetId) of the one or more coresets has at least one PDCCH candidate in the overlapping PDCCH monitoring occasions and/or is a CSS set.

In an example, the first coreset may be associated with a first CSS set. In an example, the first coreset may be associated with a first USS set. In an example, the second coreset may be associated with a second CSS set. In an example, the second coreset may be associated with a second USS set. In an example, a coreset (e.g., the first coreset, the second coreset) being associated with a CSS set (e.g., first CSS set, second CSS set) may comprise that at least one search space of the coreset is the CSS set. In an example, a coreset (e.g., the first coreset, the second coreset)

being associated with an USS set (e.g., first USS set, second USS set) may comprise that at least one search space of the coreset is the USS set.

In an example, when the first coreset is associated with the first CSS set and the second coreset is associated with the second CSS set, the one or more coresets may comprise the first coreset and the second coreset.

In an example, when the one or more coresets comprises the first coreset and the second coreset, the one or more selected cells may comprise the first cell and the second cell in response to the first coreset being configured in the first cell and the second coreset being configured in the second cell.

In an example, when the one or more coresets comprises the first coreset and the second coreset, the one or more selected cells may comprise the first cell in response to the first coreset being configured in the first cell and the second coreset being configured in the first cell. In an example, the at least one coreset may comprise the first coreset and the second coreset. In an example, a first search space set of the first coreset of the at least one coreset may be identified by a first search space set specific index (e.g., provided by a higher layer parameter searchSpaceId). In an example, the wireless device may monitor the at least one first PDCCH candidate in the first PDCCH monitoring occasion in the first coreset associated with the first search space set (e.g., association provided by a higher layer parameter controlResourceSetId). In an example, a second search space set of the second coreset of the at least one coreset may be identified by a second search space set specific index (e.g., provided by a higher layer parameter searchSpaceId). In an example, the wireless device may monitor the at least one second PDCCH candidate in the second PDCCH monitoring occasion in the second coreset associated with the second search space set (e.g., association provided by a higher layer parameter controlResourceSetId). In an example, the first search space set specific index may be lower than the second search space set specific index. In response to the first search space set specific index being lower than the second search space set specific index, for a coreset determination rule, the wireless device may select the first search space set. In an example, in response to the selecting, for the coreset determination rule, the wireless device may monitor the at least one first PDCCH candidate in the first PDCCH monitoring occasion in the first coreset on the active DL BWP of the first cell. In an example, in response to the selecting, for the coreset determination rule, the wireless device may stop monitoring the at least one second PDCCH candidate in the second PDCCH monitoring occasion in the second coreset on the active DL BWP of the first cell. In an example, in response to the selecting, the wireless device may drop monitoring the at least one second PDCCH candidate in the second PDCCH monitoring occasion in the second coreset on the active DL BWP of the first cell.

In an example, the first cell may be identified by a first cell-specific index. In an example, the second cell may be identified by a second cell-specific index. In an example, the first cell-specific index may be lower than the second cell-specific index. In an example, when the one or more selected cells comprises the first cell and the second cell, the wireless device may select the first cell in response to the first cell-specific index being lower than the second cell-specific index.

In an example, when the first coreset is associated with the first CSS set and the second coreset is associated with the second USS set, the one or more coresets may comprise the first coreset. In an example, when the one or more coresets comprises the first coreset, the one or more selected cells may comprise the first cell in response to the first coreset being configured in the first cell.

In an example, when the first coreset is associated with the first USS set and the second coreset is associated with the second CSS set, the one or more coresets may comprise the second coreset. In an example, when the one or more coresets comprises the second coreset, the one or more selected cells may comprise the first cell in response to the second coreset being configured in the first cell. In an example, when the one or more coresets comprises the second coreset, the one or more selected cells may comprise the second cell in response to the second coreset being configured in the second cell.

In an example, the wireless device may determine that the one or more coresets are associated with one or more selected cells of the one or more cells. In an example, the base station may configure a first coreset of the one or more coresets in a first cell of the one or more selected cells. In an example, the base station may configure a second coreset of the one or more coresets in the first cell. In an example, the base station may configure a third coreset of the one or more coresets in a second cell of the one or more selected cells. In an example, the first cell and the second cell may be different.

In an example, the wireless device may receive, from the base station, one or more configuration parameters. The one or more configuration parameters may indicate cell-specific indices (e.g., provided by a higher layer parameter servCellIndex) for the one or more cells. In an example, each cell of the one or more cells may be identified by a respective one cell-specific index of the cell-specific indices. In an example, a cell-specific index of a cell of the one or more selected cells may be lowest among the cell-specific indices of the one or more selected cells.

In an example, when the wireless device determines that the one or more coresets are associated with the one or more selected cells of the one or more cells, for the coreset determination rule, the wireless device may select the cell in response to the cell-specific index of the cell being lowest among the cell-specific indices of the one or more selected cells.

In an example, the base station may configure at least one coreset of the one or more coresets in the (selected) cell. In an example, at least one search space set of the at least one coreset may have at least one PDCCH candidate in the overlapping PDCCH monitoring occasions and/or may be a CSS set.

In an example, the one or more configuration parameters may indicate search space set specific indices (e.g., provided by a higher layer parameter searchSpaceId) for the at least one search space set of the cell. In an example, each search space set of the at least one search space set may be identified by a respective one search space set specific index of the search space set specific indices. In an example, the wireless device may determine that a search space specific index of a search space set of the at least one search space set may be the lowest among the search space set specific indices of the at least one search space set. In response to the determining that the search space specific index of the search space set specific index being the lowest among the search space set specific indices of the at least one search space set, for the coreset determination rule, the wireless device may select the search space set. In an example, the search space set may be associated with a selected coreset of the at least one coreset (e.g., association provided by a higher layer parameter controlResourceSetId).

In an example, when the wireless device monitors the one or more PDCCH candidates in the overlapping PDCCH monitoring occasions in the plurality of coresets and the plurality of the coresets have the different QCL-TypeD property, the wireless device may monitor at least one PDCCH in the selected coreset of the plurality of the coresets on an active DL BWP of the cell of the one or more cells in response to the selecting the cell and/or the selecting the search space set associated with the selected coreset. In an example, the wireless device may select the selected coreset associated with the search space set and the cell for the coreset determination rule.

In an example, the selected coreset may have a first QCL-TypeD property. In an example, a second coreset of the plurality of the coresets may have a second QCL-TypeD property. In an example, the selected coreset and the second coreset may be different.

In an example, the first QCL-TypeD property and the second QCL-TypeD property may be the same. In an example, the wireless device may monitor at least one second PDCCH candidate (in the overlapping PDCCH monitoring occasions) in the second coreset of the plurality of the coresets in response to the first QCL-TypeD property of the selected coreset and the second QCL-TypeD property of the second coreset being the same.

In an example, the first QCL-TypeD property and the second QCL-TypeD property may be different. In an example, the wireless device may stop monitoring at least one second PDCCH candidate (in the overlapping PDCCH monitoring occasions) in the second coreset of the plurality of the coresets in response to the first QCL-TypeD property of the selected coreset and the second QCL-TypeD property of the second coreset being different. In an example, the wireless device may drop monitoring at least one second PDCCH candidate (in the overlapping PDCCH monitoring occasions) in the second coreset of the plurality of the coresets in response to the first QCL-TypeD property of the selected coreset and the second QCL-TypeD property of the second coreset being different.

In an example, for the coreset determination rule, a wireless device may consider that a first QCL type (e.g., QCL TypeD) property of a first RS (e.g., SS/PBCH block) is different from a second QCL type (e.g., QCL TypeD) property of a second RS (CSI-RS)

In an example, for the coreset determination rule, a first RS (e.g., CSI-RS) may be associated (e.g., QCL-ed) with an RS (e.g., SS/PBCH block) in a first cell. In an example, a second RS (e.g., CSI-RS) may be associated (e.g., QCL-ed) with the RS in a second cell. In response to the first RS and the second RS being associated with the RS, the wireless device may consider that a first QCL type (e.g., QCL TypeD) property of the first RS and a second QCL type (e.g., QCL TypeD) property of the second RS are the same.

In an example, the wireless device may determine a number of active TCI states from the plurality of coresets.

In an example, a wireless device may monitor multiple search space sets associated with different CORESETs for one or more cells (e.g., for a single cell operation or for an operation with carrier aggregation in a same frequency band). In an example, at least two monitoring occasions of at least two search space sets of the multiple search space sets may overlap in time (e.g., at least one symbol, at least one slot, subframe, etc.). In an example, the at least two search space sets may be associated with at least two first coresets. The at least two first coresets may have different QCL-TypeD properties. In an example, for the coreset determination rule, the wireless device may monitor at least one search space set associated with a selected coreset in an active DL BWP of a cell. In an example, the at least one search space set may be a CSS set. In an example, a cell-specific index of the cell may be lowest among cell-specific indices of the one or more cells comprising the cell. In an example, at least two second coresets of the cell may comprise a CSS set. In response to the at least two second coresets of the cell comprising the CSS set, the wireless device may select a selected coreset of the at least two second coresets in response to a search space specific index of a search space set associated with the selected coreset being the lowest among search space specific indices of search space sets associated with the at least two second coresets. In an example, the wireless device monitors the search space set in the at least two monitoring occasions.

In an example, the wireless device may determine that the at least two first coresets may not be associated with a CSS set. In an example, the wireless device may determine that each coreset of the at least two first coresets may not be associated with a CSS set. In an example, for the coreset determination rule, in response to the determining, the wireless device may monitor at least one search space set associated with a selected coreset in an active DL BWP of a cell. In an example, the at least one search space set may be a USS set. In an example, a cell-specific index of the cell may be lowest among cell-specific indices of the one or more cells comprising the cell. In an example, at least two second coresets of the cell may comprise a USS set. In response to the at least two second coresets of the cell comprising the USS set, the wireless device may select a selected coreset of the at least two second coresets in response to a search space specific index of a search space set associated with the selected coreset being the lowest among search space specific indices of search space sets associated with the at least two second coresets. In an example, the wireless device monitors the search space set in the at least two monitoring occasions.

In an example, a base station may indicate, to a wireless device, a TCI state for a PDCCH reception for a coreset of a serving cell by sending a TCI state indication for UE-specific PDCCH MAC CE. In an example, when a MAC entity of the wireless device receives a TCI state indication for UE-specific PDCCH MAC CE on/for a serving cell, the MAC entity may indicate to lower layers (e.g., PHY) the information regarding the TCI state indication for the UE-specific PDCCH MAC CE.

In an example, a TCI state indication for UE-specific PDCCH MAC CE may be identified by a MAC PDU subheader with LCID. The TCI state indication for UE-specific PDCCH MAC CE may have a fixed size of 16 bits comprising one or more fields. In an example, the one or more fields may comprise a serving cell ID, coreset ID, TCI state ID and a reserved bit.

In an example, the serving cell ID may indicate the identity of the serving cell for which the TCI state indication for the UE-specific PDCCH MAC CE applies. The length of the serving cell ID may be n bits (e.g., n=5 bits).

In an example, the coreset ID may indicate a control resource set. The control resource set may be identified with a control resource set ID (e.g., ControlResourceSetId). The TCI State is being indicated to the control resource set ID for which. The length of the coreset ID may be n3 bits (e.g., n3=4 bits).

In an example, the TCI state ID may indicate a TCI state identified by TCI-StateId. The TCI state may be applicable to the control resource set identified by the coreset ID. The length of the TCI state ID may be n4 bits (e.g., n4=6 bits).

An information element ControlResourceSet may be used to configure a time/frequency control resource set (CORESET) in which to search for downlink control information.

An information element TCI-State may associate one or two DL reference signals with a corresponding quasi-colocation (QCL) type. The information element TCI-State may comprise one or more fields including TCI-StateId and QCL-Info. The QCL-Info may comprise one or more second fields. The one or more second fields may comprise serving cell index, BWP ID, a reference signal index (e.g., SSB-index, NZP-CSI-RS-ResourceID), and a QCL Type (e.g., QCL-typeA, QCL-typeB, QCL-typeC, QCL-typeD). In an example, the TCI-StateID may identify a configuration of a TCI state.

In an example, the serving cell index may indicate a serving cell in which a reference signal indicated by the reference signal index is located in. When the serving cell index is absent in an information element TCI-State, the information element TCI-State may apply to a serving cell in which the information element TCI-State is configured. The reference signal may be located on a second serving cell other than the serving cell in which the information element TCI-State is configured only if the QCL-Type is configured as first type (e.g., TypeD, TypeA, TypeB). In an example, the BWP ID may indicate a downlink BWP of the serving cell in which the reference signal is located in.

An information element SearchSpace may define how/where to search for PDCCH candidates in a search space. The search space may be identified by a searchSpaceId field in the information element SearchSpace. Each search space may be associated with a control resource set (e.g., ControlResourceSet). The control resource set may be identified by a controlResourceSetId field in the information element SearchSpace. The controlResourceSetId field may indicate the control resource set (CORESET) applicable for the SearchSpace.

In an example, a base station may need (additional) one or more UE radio access capability information of a wireless device. In response to the needing the UE radio access capability information, the base station may initiate a procedure to the wireless device to request the one or more UE radio access capability information (e.g., by an information element UECapabilityEnquiry). In an example, the wireless device may use an information element (e.g., UECapabilityInformation message) to transfer one or more UE radio access capability information requested by the base station. In an example, the wireless device may provide "timeDurationForQCL" in FeatureSetDownlink indicating a set of features that the wireless device supports.

In an example, a wireless device may report, to a base station, an RF capability of the wireless device on the reception and/or transmission via a capability signaling of the wireless device. In response to receiving the capability signaling, the base station may know whether the wireless device may receive (transmit) simultaneous physical channels and/or RSs via different receiving (transmitting) beams from one or more component carriers in the downlink (uplink) at the same time instant.

In an example, in an intra-band carrier aggregation (CA) case, a base station may configure one or more component carriers in the same band to a wireless device. The one or more component carriers may be powered by a same and a single RF chain. In this case, the wireless device may apply a single and a same set of TX/RX spatial parameters to the one or more component carriers in the same band at the same time instant. In an example, the applying the single and the same set of TX/RX spatial parameters may impose limitations on the flexibility of multiplexing physical channels (e.g., PDSCH/PUSCH, PDCCH/PUCCH, SRS, PRACH, etc.) and/or reference signals (RSs) (e.g., CSI-RS, SSB, etc.) both within and across the one or more component carriers.

In an example, when a first channel/RS of a first serving cell (e.g., PCell, BWP) is associated (e.g., QCL-TypeD') with a second channel/RS of a second serving cell (e.g., SCell, BWP), the first channel/RS and the second channel/RS may be multiplexed in the same OFDM symbols. A wireless device may transmit (or receive) the multiplexed first channel/RS and the second channel/RS simultaneously in the uplink (or downlink).

In an example, one or more first antenna ports of a first serving cell and one or more second antenna ports of a second serving cell may not be associated (e.g., QCL-TypeD'). A wireless device may not infer one or more channel properties of the one or more first antenna ports of the first serving cell from the one or more second antenna ports of the second serving cell.

In an example, the first channel/RS (e.g., PDSCH/PUSCH, PDCCH/PUCCH, SRS, PRACH, CSI-RS, SSB, etc.) and the second channel/RS (e.g., PDSCH/PUSCH, PDCCH/PUCCH, SRS, PRACH, CSI-RS, SSB, etc.) may not be associated (e.g., QCL-TypeD'). A base station may configure the first channel/RS may with a first QCL assumption and the second channel/RS with a second QCL assumption. In an example, a first transmission/reception of the first channel/RS and a second transmission/reception of the second channel/RS may overlap (e.g., in at least one OFDM symbol). When the first QCL assumption and the second QCL assumption are not same, the wireless device may not perform the first transmission/reception and the second transmission/reception simultaneously.

FIG. 16 shows an example of a TCI-state information element (IE) for a downlink beam management as per an aspect of an embodiment of the present disclosure.

In an example, a base station may configure a wireless device with one or more TCI-State configurations by a higher layer parameter (e.g., tci-StatesToAddModList, tci-StatesToReleaseList in IE PDSCH-Config) for a serving cell (e.g., PCell, SCell). In an example, the wireless device may detect a PDCCH with a DCI for the serving cell. The wireless device may use at least one of the TCI states of the one or more TCI-State configurations to decode a PDSCH (or for a reception of a PDSCH) scheduled by the PDCCH (or the DCI). The DCI may be intended for the wireless device and/or the serving cell of the wireless device.

In an example, FIG. 16 shows an example of a TCI state of the one or more TCI-State configurations. In an example, the DCI may indicate the TCI state. In an example, the wireless device may receive the PDSCH (or the PDCCH) based on the TCI state. The TCI state may comprise one or more parameters (e.g., qcl-Type1, qcl-Type2, referenceSignal, etc.). In an example, the TCI state may be identified by a TCI state index (e.g., tci-StateId in FIG. 16). In an example, the receiving the PDSCH (or the PDCCH) based on the TCI state may comprise that the wireless device may use the one or more parameters in the TCI state to configure one or more quasi co-location relationships between at least one downlink reference signal (e.g., SS/PBCH block, CSI-RS) and at least one DM-RS port of the PDSCH (scheduled by the DCI). In an example, in FIG. 16, a first quasi co-location relationship of the one or more quasi co-location relationships may be configured by a higher layer parameter qcl-Type1 for a first DL RS (e.g., indicated by the referencSignal in FIG. 16) of the at least one downlink reference signal. In an example, in FIG. 16, a second quasi co-location relationship of the one or more quasi co-location relationships may be configured by a higher layer parameter qcl-Type2 for, if configured, a second DL RS (e.g., indicated by the referenceSignal in FIG. 16) of the at least one downlink reference signal.

In an example, at least one quasi co-location type of the at least one downlink reference signal (e.g., the first DL RS, the second DL RS) may be provided to the wireless device by a higher layer parameter qcl-Type in QCL-Info in FIG. 16. The first quasi co-location relationship of the first DL RS may comprise a first QCL type (e.g., QCL-TypeA, QCL-TypeB) of the at least one quasi co-location type. The second quasi co-location relationship of the second DL RS may comprise a second QCL type (e.g., QCL-TypeC, QCL-TypeD) of the at least one quasi co-location type. In an example, the first QCL type of the first DL RS and the second QCL type of the second DL RS may not be the same. In an example, the first DL RS and the second DL RS may be the same. In an example, the first DL RS and the second DL RS may be different.

In an example, the using the one or more parameters in the TCI state to configure the one or more quasi co-location relationships between the at least one downlink reference signal (e.g., the first DL RS and the second DL RS) and the at least one DM-RS port of the PDSCH (or the PDCCH) may comprise that the at least one DM-RS port of the PDSCH (or the PDCCH) is quasi co-located with the first DL RS with respect to the first QCL type. In an example, the using the one or more parameters in the TCI state to configure the one or more quasi co-location relationships between the at least one downlink reference signal (e.g., the first DL RS and the second DL RS) and the at least one DM-RS port of the PDSCH (or the PDCCH) may comprise that the at least one DM-RS port of the PDSCH (or the PDCCH) is quasi co-located with the second DL RS with respect to the second QCL type.

Figure 17:
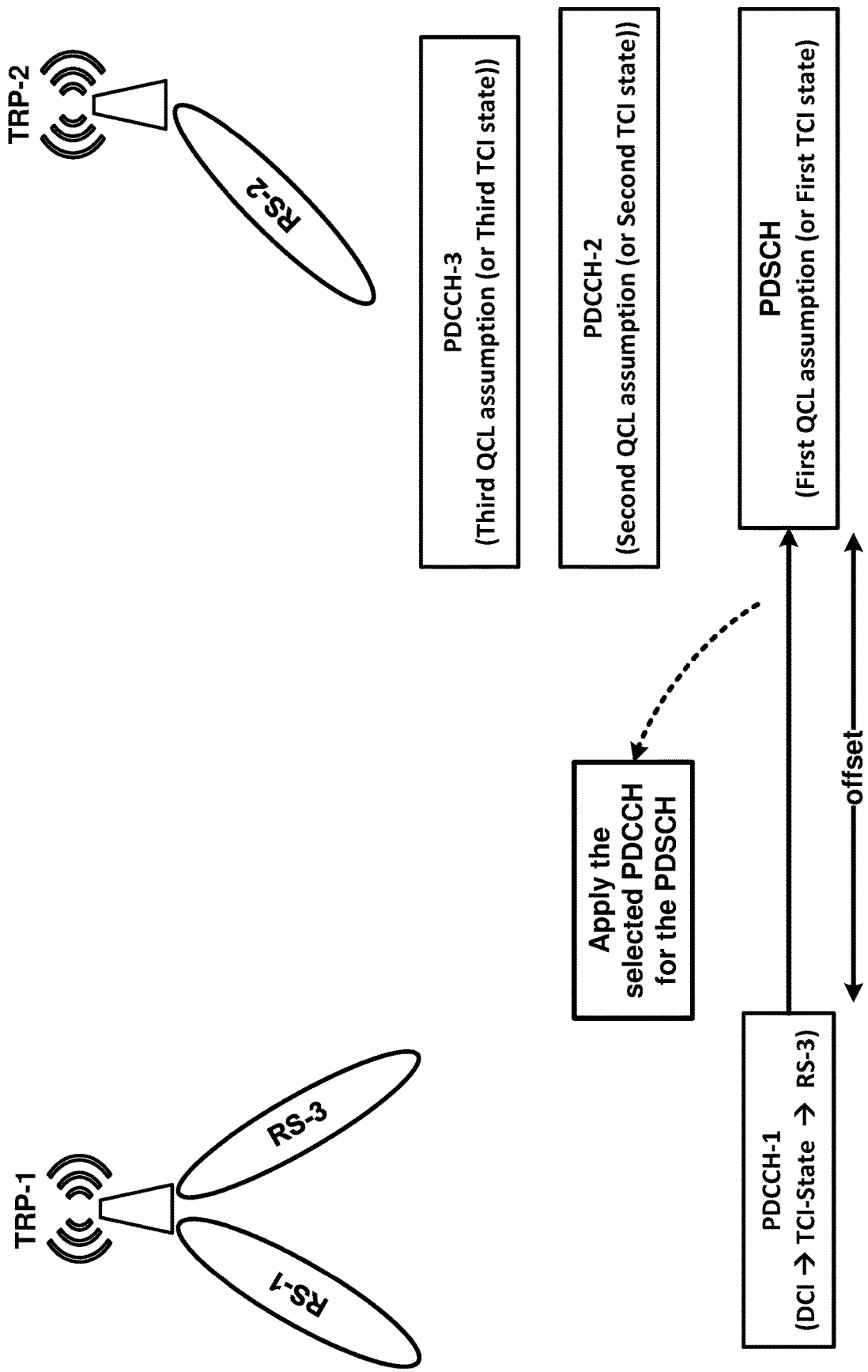
FIG. 17 is an example of a downlink beam management as per an aspect of an embodiment of the present disclosure.

FIG. 17 shows an example of a downlink beam management as per an aspect of an embodiment of the present disclosure.

In an example, a wireless device may receive, from a base station, one or more messages. The one or more messages may comprise one or more configuration parameters of one or more cells (e.g., PCell, SCell. SpCell). The one or more cells may comprise a first cell and a second cell.

In an example, the one or more configuration parameters may indicate cell-specific indices (e.g., provided by a higher layer parameter servCellIndex) for the one or more cells. In an example, each cell of the one or more cells may be identified by a respective one cell-specific index of the cell-specific indices. In an example, the first cell may be identified by a first cell-specific index. In an example, the second cell may be identified by a second cell-specific index.

In an example, the one or more configuration parameters may indicate one or more control resource sets (coresets). The one or more coresets may comprise a first coreset, a second coreset and a third coreset.

In an example, the one or more configuration parameters may indicate coreset-specific indices (e.g., provided by a higher layer parameter controlResourceSetId) for the one or more coresets. In an example, each coreset of the one or more coresets may be identified by a respective one coreset-specific index of the coreset-specific indices. In an example, the first coreset (e.g., PDCCH-1 in FIG. 17) may be identified by a first coreset-specific index. In an example, the second coreset (e.g., PDCCH-2 in FIG. 17) may be identified by a second coreset-specific index. In an example, the third coreset (e.g., PDCCH-3 in FIG. 17) may be identified by a third coreset-specific index.

In an example, the wireless device may apply a second QCL assumption (or a second TCI state) for a second PDCCH reception in the second coreset (e.g., PDCCH-3 in FIG. 17). In an example, the second QCL assumption (or the second TCI state) may indicate at least one second RS (e.g., CSI-RS, SS/PBCH block, for example RS-1 in FIG. 17). In an example, the second QCL assumption (or the second TCI state) may indicate a second QCL type (for example, QCL-TypeD).

In an example, the wireless device may identify/use/select the at least one second RS for a random-access procedure (e.g., initial access procedure). In an example, the wireless device may determine/use the at least one second RS for the second PDCCH reception in the second coreset based on receiving a first higher layer parameter tci-StatesPDCCH-ToAddList and/or a second higher layer parameter tci-StatesPDCCH-ToReleaseList, for the second coreset. In an example, the one or more configuration parameters may comprise the first higher layer parameter tci-StatesPDCCH-ToAddList and/or the second higher layer parameter tci-StatesPDCCH-ToReleaseList. In an example, the wireless device may determine/use the at least one second RS for the second PDCCH reception in the second coreset based on a MAC CE activation command (e.g., TCI State Indication for UE-specific PDCCH MAC CE) for the second coreset.

In an example, based on the applying the second QCL assumption (or the second TCI state) for the second PDCCH reception in the second coreset, the wireless device may determine that at least one second DM-RS antenna port for the second PDCCH reception in the second coreset is quasi co-located with the at least one second RS. In an example, based on the applying the second QCL assumption (or the second TCI state) for the second PDCCH reception in the second coreset, the wireless device may determine that at least one second DM-RS antenna port for the second PDCCH reception in the second coreset is quasi co-located with the at least one second RS with the second QCL type.

In an example, the wireless device may apply a third QCL assumption (or a third TCI state) for a third PDCCH reception in the third coreset (e.g., PDCCH-3 in FIG. 17). In an example, the third QCL assumption (or the third TCI state) may indicate at least one third RS (e.g., CSI-RS, SS/PBCH block, for example RS-2 in FIG. 17). In an example, the third QCL assumption (or the third TCI state) may indicate a third QCL type (for example, QCL-TypeD).

In an example, the wireless device may identify/use/select the at least one third RS for a random-access procedure (e.g., initial access procedure). In an example, the wireless device may determine/use the at least one third RS for the third PDCCH reception in the third coreset based on receiving a first higher layer parameter tci-StatesPDCCH-ToAddList and/or a second higher layer parameter tci-StatesPDCCH-ToReleaseList, for the third coreset. In an example, the one or more configuration parameters may comprise the first higher layer parameter tci-StatesPDCCH-ToAddList and/or the second higher layer parameter tci-StatesPDCCH-ToReleaseList. In an example, the wireless device may determine/use the at least one third RS for the third PDCCH reception in the third coreset based on a MAC CE activation command (e.g., TCI State Indication for UE-specific PDCCH MAC CE) for the third coreset.

In an example, based on the applying the third QCL assumption (or the third TCI state) for the third PDCCH reception in the third coreset, the wireless device may determine that at least one third DM-RS antenna port for the third PDCCH reception in the third coreset is quasi co-located with the at least one third RS. In an example, based on the applying the third QCL assumption (or the third TCI state) for the third PDCCH reception in the third coreset, the wireless device may determine that at least one third DM-RS antenna port for the third PDCCH reception in the third coreset is quasi co-located with the at least one third RS with the third QCL type.

In an example, the wireless device may receive a DCI. In an example, the wireless device may detect a PDCCH with the DCI. In an example, the wireless device may receive the DCI when monitoring the PDCCH. In an example, the DCI may schedule a PDSCH (e.g., PDSCH in FIG. 17). In an example, the wireless device may receive the DCI in the first coreset (e.g., PDCCH-1 in FIG. 17).

In an example, the wireless device may apply a first QCL assumption (or a first TCI state) for reception of the PDSCH. In an example, the first QCL assumption (or the first TCI state) may indicate at least one first RS (e.g., CSI-RS, SS/PBCH block, for example RS-3 in FIG. 17). In an example, the first QCL assumption (or the first TCI state) may indicate a first QCL type (for example, QCL-TypeD).

In an example, based on the applying the first QCL assumption (or the first TCI state) for the reception of the PDSCH, the wireless device may determine that at least one first DM-RS antenna port for the PDSCH is quasi co-located with the at least one first RS. In an example, based on the applying the first QCL assumption (or the first TCI state) for the reception of the PDSCH, the wireless device may determine that at least one first DM-RS antenna port for the PDSCH is quasi co-located with the at least one first RS with the first QCL type.

In an example, the wireless device may determine the at least one first RS for the reception of the PDSCH based on the DCI comprising a TCI field indicating the first QCL assumption (or the first TCI state, for example, DCI→TCI-State→RS-3 in FIG. 17). For example, the first TCI state may indicate the at least one first RS.

In an example, the wireless device may determine, for the first QCL assumption (or the first TCI state), the at least one first RS based on a default PDSCH RS selection. In an example, the wireless device may perform the default PDSCH RS selection when a time offset (e.g., offset in FIG. 17) between a reception of the DCI and the reception of the PDSCH is lower than a threshold (e.g., timeDuration-ForQCL, Threshold-Sched-Offset). In an example, the wireless device may perform the default PDSCH RS selection based on the first coreset (on which the DCI scheduling the PDSCH is received) not being configured with a TCI-PresentInDCI field. In an example, the wireless device may perform the default PDSCH RS selection based on the DCI being a DCI format (e.g., DCI format 1_0) without (or not comprising) a TCI field.

In an example, the wireless device may determine that the PDSCH overlaps, in a time duration, with the second coreset and the third coreset. In an example, the time duration may be at least one symbol. In an example, the time duration may be at least one mini-slot. In an example, the time duration may be at least one slot. In an example, the time duration may be at least one subframe. In an example, the time duration may be at least one frame.

In an example, the first QCL assumption of the PDSCH may be different from the second QCL assumption of the second coreset and the third QCL assumption of the second coreset (e.g., in the time duration). In an example, the first QCL assumption being different from the second QCL assumption and the third QCL assumption may comprise that the wireless device may not receive the PDSCH and monitor the second coreset for the second PDCCH reception in the time duration simultaneously. In an example, the first QCL assumption being different from the second QCL assumption and the third QCL assumption may comprise that the wireless device may not receive the PDSCH and monitor the third coreset for the third PDCCH reception in the time duration simultaneously. In an example, the first QCL assumption being different from the second QCL assumption and the third QCL assumption may comprise the at least one first RS is different from the at least one second RS and the at least one third RS. In an example, the first QCL assumption being different from the second QCL assumption and the third QCL assumption may comprise the at least one first RS is not QCL-ed (e.g., QCL TypeD) with the at least one second RS and the at least one third RS.

In an example, the wireless device may monitor the second coreset for the second PDCCH reception with the second QCL assumption and monitor the third coreset for the third PDCCH reception with the third QCL assumption simultaneously. In an example, the wireless device may perform the second PDCCH reception and the third PDCCH reception simultaneously.

In an example, the time offset between the reception of the DCI and the reception of the PDSCH may be less than a threshold (e.g., timeDurationForQCL, Threshold-Sched-Offset). In an example, the time offset between the reception of the DCI and the reception of the PDSCH may be equal to or greater than a threshold (e.g., timeDurationForQCL, Threshold-Sched-Offset). In an example, the threshold may be based on a reported UE capability. In an example, the time offset being lower than the threshold may comprise that the PDSCH is scheduled before the threshold.

In an example, based on the determining that the PDSCH overlaps, in the time duration, with the second coreset and the third coreset, the wireless device selects a selected coreset among the second coreset and the third coreset.

In an example, the wireless device may select the selected coreset based on one or more criteria. In an example, the wireless device may select the selected coreset based on a variety of criteria.

The wireless device may select the selected coreset, for example, based on the second coreset-specific index of the second coreset and the third coreset-specific index of the third coreset. In an example, the selecting based on the second coreset-specific index and the third coreset-specific index may comprise selecting the selected coreset with a lowest (or a highest) coreset-specific index among the second coreset-specific index and the third coreset-specific index. In an example, the selecting the selected coreset based on the second coreset-specific index and the third coreset-specific index may comprise that the wireless device compares the second coreset-specific index and the third coreset-specific index.

In an example, based on the comparing, the wireless device may determine that the third coreset-specific index is lower (or higher) than the second coreset-specific index. Based on the determining, the wireless device may select the third coreset as the selected coreset.

In an example, based on the comparing, the wireless device may determine that the second coreset-specific index is lower (or higher) than the third coreset-specific index. Based on the determining, the wireless device may select the second coreset as the selected coreset.

In an example, the base station may configure the second coreset for the first cell identified with the first cell-specific index (e.g., provided by a higher layer parameter servCellIndex). In an example, the base station may configure the third coreset for the second cell identified with the second cell-specific index (e.g., provided by a higher layer parameter servCellIndex).

The wireless device may select the selected coreset, for example, based on the first cell-specific index and the second cell-specific index. In an example, the selecting the selected coreset based on the first cell-specific index and the second cell-specific index may comprise selecting a selected cell with a lowest (or a highest) cell-specific index among the first cell-specific index and the second cell-specific index. In an example, the selecting the selected coreset based on the first cell-specific index and the second cell-specific index may comprise that the wireless device compares the first cell-specific index and the second cell-specific index.

In an example, based on the comparing, the wireless device may determine that the first cell-specific index is lower (or higher) than the second cell-specific index. Based on the determining, the wireless device may select the first cell as the selected cell. Based on the selecting the first cell as the selected cell, the wireless device may select the second coreset as the selected coreset.

In an example, based on the comparing, the wireless device may determine that the second cell-specific index is lower (or higher) than the first cell-specific index. Based on the determining, the wireless device may select the second cell as the selected cell. Based on the selecting the second cell as the selected cell, the wireless device may select the third coreset as the selected coreset.

In an example, the one or more coresets may be associated (e.g., one-to-one, one-to-many, many-to-one) with one or more groups. In an example, each coreset of the one or more coresets may be associated with a group of the one or more groups. In an example, the first coreset may be associated with a first group (e.g., the first TCI state group, the first antenna port group, the first HARQ process group, the first coreset group, the second TCI state group, the second antenna port group, the second HARQ process group, the second coreset group). In an example, the second coreset may be associated with a second group (e.g., the first TCI state group, the first antenna port group, the first HARQ process group, the first coreset group). In an example, the third coreset may be associated with a third group (e.g., the second TCI state group, the second antenna port group, the second HARQ process group, the second coreset group). In an example, the one or more configuration parameters may indicate the association between the one or more coresets and the one or more groups (e.g., TCI state group-specific index, HARQ process group-specific index, antenna panel group-specific index, coreset group-specific index, and the like).

In an example, the first group and the second group may be the same. In an example, the first group and the second group may be different. In an example, the first group and the third group may be the same. In an example, the first group and the third group may be different. In an example, the third group and the second group may be the same. In an example, the third group and the second group may be different.

In an example, the wireless device may select the selected coreset, for example, based on the first group, the second group and the third group. In an example, the selecting the selected coreset, for example, based on the first group, the second group and the third group may comprise selecting the selected coreset with a group (e.g., the second group, the third group) same as the first group of the first coreset (scheduling the PDSCH). In an example, the first group and the second group may be the same. In an example, the first group and the third group may be different. Based on the first group and the second group being the same and the first group and the third group being different, the wireless device may select the second coreset, as the selected coreset, associated with the second group. In an example, the first group and the third group may be the same. In an example, the first group and the second group may be different. Based on the first group and the third group being the same and the first group and the second group being different, the wireless device may select the third coreset, as the selected coreset, associated with the third group.

In an example, the one or more configuration parameters may indicate one or more TCI state states. In an example, the one or more TCI states may be grouped/formed into one or more TCI state groups.

In an example, the one or more TCI states may comprise TCI-State-0, TCI-State-1, TCI-State-2, . . . , TCI-State-127. In an example, the one or more TCI state groups may comprise a first TCI state group and a second TCI state group. The first TCI state group may comprise TCI-State-0, TCI-State-1, TCI-State-2, . . . , TCI-State-63. The second TCI state group may comprise TCI-State-64, TCI-State-65, TCI-State-66, . . . , TCI-State-127.

In an example, the one or more configuration parameters may indicate TCI state group-specific indices (e.g., provided by a higher layer parameter) for the one or more TCI state groups. In an example, each TCI state group of the one or more TCI state groups may be identified by a respective one TCI state group-specific index of the TCI state group-specific indices. In an example, the first TCI state group may be identified by a first TCI state group-specific index. In an example, the second TCI state group may be identified by a second TCI state group-specific index.

In an example, the first coreset may be associated with the first TCI state group. The first coreset being associated with the first TCI state group may comprise that a QCL assumption (or a TCI state) of the first coreset is among the first TCI state group (e.g., TCI-State-0, TCI-State-1, TCI-State-2, . . . , TCI-State-63). In an example, the second coreset may be associated with the first TCI state group. The second coreset being associated with the first TCI state group may comprise that the second QCL assumption (or the second TCI state) of the second coreset is among the first TCI state group (e.g., TCI-State-0, TCI-State-1, TCI-State-2, . . . , TCI-State-63). In an example, the third coreset may be associated with the second TCI state group. The third coreset being associated with the second TCI state group may comprise that the third QCL assumption (or the third TCI state) of the third coreset is among the second TCI state group (e.g., TCI-State-64, TCI-State-65, TCI-State-66, . . . , TCI-State-127). In an example, based on the first coreset and the second coreset being associated with the first TCI state group, the first group and the second group may be the same. In an example, based on the first coreset being associated with the first TCI state group and the third coreset being associated with the second TCI state group, the first group and the third group may be different. In an example, based on the second coreset being associated with the first TCI state group and the third coreset being associated with the second TCI state group, the second group and the third group may be different.

In an example, the wireless device may be served by one or more TRPs comprising a first TRP and a second TRP. In an example, the first TRP may be associated with the first TCI state group. In an example, the second TRP may be associated with the second TCI state group. In an example, the first TRP being associated with the first TCI state group may comprise that a QCL assumption (or TCI state) of a downlink channel (e.g., PDSCH, PDCCH) scheduled/transmitted by the first TRP is among the first TCI state group (e.g., TCI-State-0, TCI-State-1, TCI-State-2, . . . , TCI-State-63). In an example, the second TRP being associated with the second TCI state group may comprise that a QCL assumption (or TCI state) of a downlink channel (e.g., PDSCH, PDCCH) scheduled/transmitted by the second TRP is among the second TCI state group (e.g., TCI-State-64, TCI-State-65, . . . , TCI-State-127).

In an example, based on the first group and the second group being the same and the first TRP being associated with the first TCI state group, the wireless device may receive a first PDCCH in the first coreset and a second PDCCH in the second coreset from the same TRP (e.g., first TRP). In an example, the first TRP may transmit a first DCI in the first coreset and a second DCI the second coreset. Based on the first TRP transmitting the first DCI in the first coreset and the second DCI in the second coreset, the first group and the second group may be the same.

In an example, the second TRP being associated with the second TCI state group, the wireless device may receive a third PDCCH in the third coreset from the second TRP. In an example, the second TRP may transmit a first DCI in the third coreset. In an example, the second TRP may not transmit a second DCI in the first and the second coreset. Based on the second TRP transmitting the first DCI in the third coreset and not transmitting the second DCI in the second coreset, the third group and the second group may be different. Based on the second TRP transmitting the first DCI in the third coreset and not transmitting the second DCI in the first coreset, the third group and the first group may be different.

In an example, the one or more configuration parameters may indicate one or more antenna ports. In an example, the one or more antenna ports may be grouped/formed into one or more antenna port groups. In an example, the one or more antenna port groups may comprise a first antenna port group and a second antenna port group. In an example, the wireless device may use the first antenna port group for the second PDCCH reception in the second coreset. In an example, the wireless device may use the second antenna port group for the third PDCCH reception in the third coreset.

In an example, the one or more configuration parameters may indicate antenna port group-specific indices (e.g., provided by a higher layer parameter) for the one or more antenna port groups. In an example, each antenna port group of the one or more antenna port groups may be identified by a respective one antenna port-group-specific index of the antenna port group-specific indices. In an example, the first antenna port group may be identified by a first antenna port group-specific index. In an example, the second antenna port group may be identified by a second antenna port group-specific index.

In an example, the first TRP may be associated with the first antenna port group. In an example, the second TRP may be associated with the second antenna port group. In an example, the first coreset may be associated with the first antenna port group. In an example, the second coreset may be associated with the first antenna port group. In an example, the third coreset may be associated with the second antenna port group. In an example, based on the first coreset and the second coreset being associated with the first antenna port group, the first group and the second group may be the same.

In an example, the one or more configuration parameters may indicate one or more HARQ process indices. In an example, the one or more HARQ process indices may be formed into one or more HARQ process groups. In an example, the one or more HARQ process groups may comprise a first HARQ process group and a second HARQ process group. In an example, the wireless device may use the first HARQ process group for the second PDCCH reception in the second coreset. In an example, the wireless device may use the second HARQ process group for the third PDCCH reception in the third coreset.

In an example, the one or more configuration parameters may indicate HARQ process group-specific indices (e.g., provided by a higher layer parameter) for the one or more HARQ process groups. In an example, each HARQ process group of the one or more HARQ process groups may be identified by a respective one HARQ process group-specific index of the HARQ process group-specific indices. In an example, the first HARQ process group may be identified by a first HARQ process group-specific index. In an example, the second HARQ process group may be identified by a second antenna port group-specific index.

In an example, the first TRP may be associated with the first antenna port group. In an example, the second TRP may be associated with the second antenna port group. In an example, the first coreset may be associated with the first HARQ process group. In an example, the second coreset may be associated with the first HARQ process group. In an example, the third coreset may be associated with the second HARQ process group. In an example, based on the first coreset and the second coreset being associated with the first HARQ process group, the first group and the second group may be the same.

In an example, based on the selecting the selected coreset, the wireless device may apply a selected RS of (or associated with) the selected coreset for the reception of the PDSCH.

In an example, based on the selecting the selected coreset, the wireless device may apply a selected QCL assumption (or a selected TCI state) of (or associated with) the selected coreset for the reception of the PDSCH.

In an example, based on the selecting the selected coreset, the wireless device may apply a selected RS of (or associated with) the selected coreset when receiving the PDSCH. In an example, based on the selecting the selected coreset, the wireless device may receive the PDSCH with a selected RS of (or associated with) the selected coreset.

In an example, when the selected coreset is the second coreset, the selected RS may be the at least one second RS. In an example, when the selected coreset is the third coreset, the selected RS may be the at least one third RS.

In an example, when the selected coreset is the second coreset, the selected QCL assumption (or the selected TCI state) may be the second QCL assumption (or the second TCI state). In an example, when the selected coreset is the third coreset, the selected QCL assumption (or the selected TCI state) may be the third QCL assumption (or the third TCI state).

Figure 18:
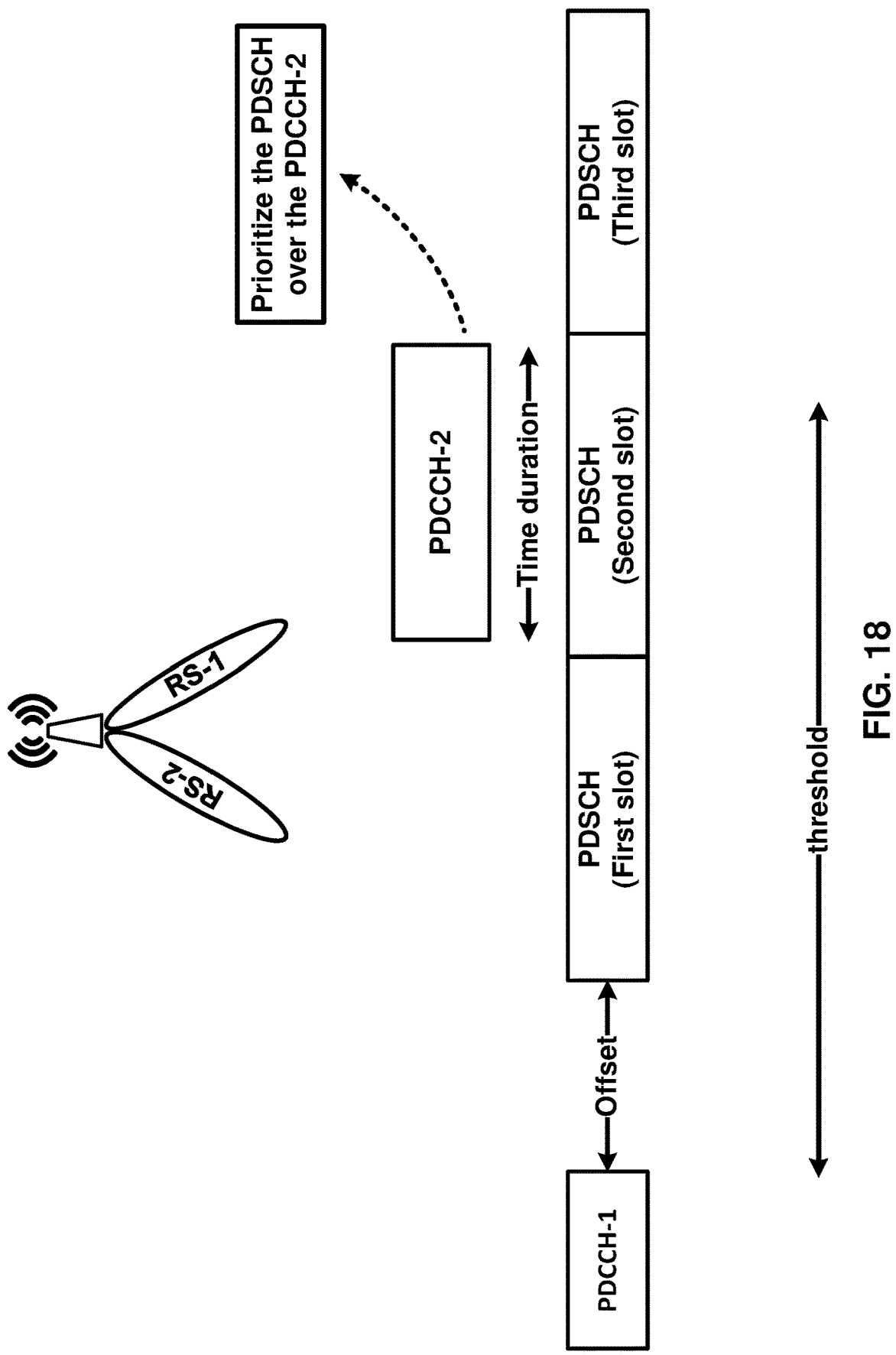
FIG. 18 is an example of a downlink beam management as per an aspect of an embodiment of the present disclosure.
Figure 19:
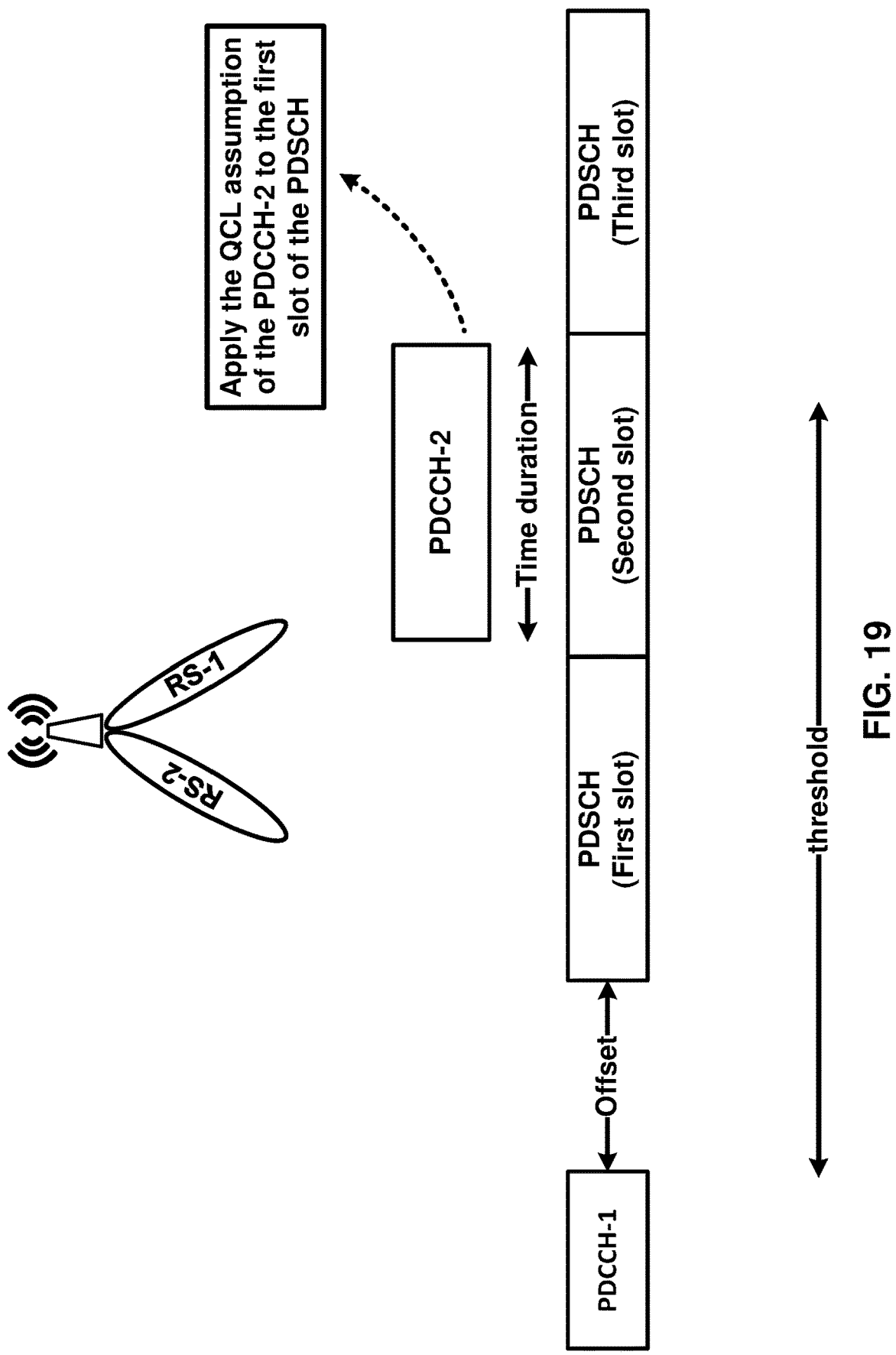
FIG. 19 is an example of a downlink beam management as per an aspect of an embodiment of the present disclosure.
Figure 20:
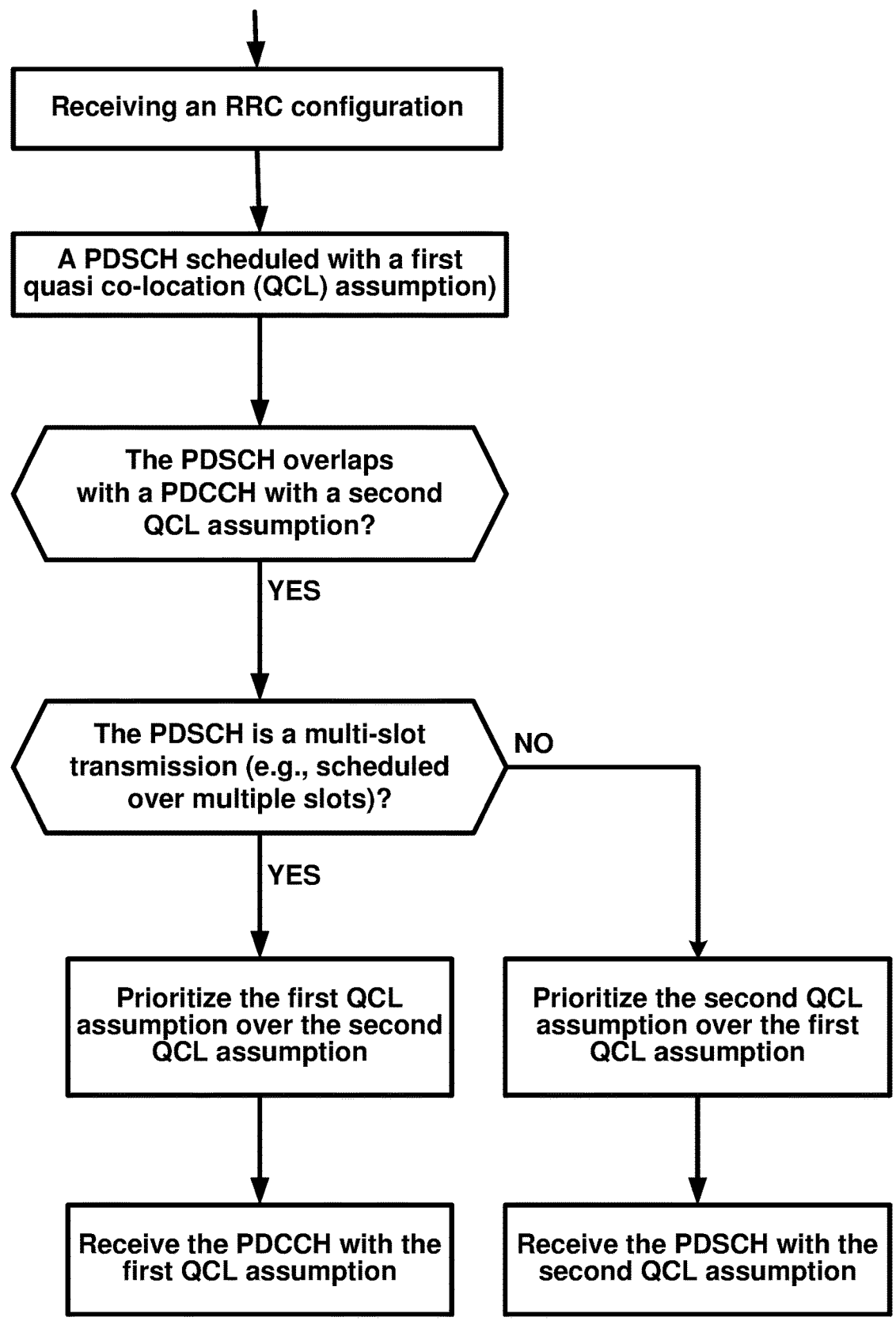
FIG. 20 is an example flowchart of a downlink beam management as per an aspect of an embodiment of the present disclosure.

FIG. 18 and FIG. 19 show examples of a downlink beam management as per an aspect of an embodiment of the present disclosure. FIG. 20 is a flow diagram of the BWP operation disclosed in FIG. 18.

In an example, a wireless device may receive one or more messages. The one or more messages may comprise one or more configuration parameters. The one or more configuration parameters may indicate one or more control resources sets comprising a second coreset.

In an example, the wireless device may apply a second QCL assumption (or a second TCI state) for a second PDCCH reception in the second coreset (e.g., PDCCH-2 in FIG. 18). In an example, the second QCL assumption (or the second TCI state) may indicate at least one second RS (e.g., CSI-RS, SS/PBCH block, for example RS-2 in FIG. 18). In an example, the second QCL assumption (or the second TCI state) may indicate a second QCL type (for example, QCL-TypeD).

In an example, the wireless device may receive a DCI. In an example, the wireless device may detect a PDCCH with the DCI. In an example, the wireless device may receive the DCI when monitoring the PDCCH. In an example, the DCI may schedule a PDSCH (e.g., PDSCH in FIG. 18). In an example, the wireless device may receive the DCI in the first coreset (e.g., PDCCH-1 in FIG. 18). In an example, the wireless device may receive the DCI in the second coreset (e.g., PDCCH-2 in FIG. 18).

In an example, the wireless device may apply a first QCL assumption (or a first TCI state) for reception of the PDSCH. In an example, the first QCL assumption (or the first TCI state) may indicate at least one first RS (e.g., CSI-RS, SS/PBCH block, for example RS-1 in FIG. 18). In an example, the first QCL assumption (or the first TCI state) may indicate a first QCL type (for example, QCL-TypeD).

In an example, the wireless device may determine that the PDSCH overlaps, in a time duration, with the second coreset. In an example, the time duration may be at least one symbol. In an example, the time duration may be at least one mini-slot. In an example, the time duration may be at least one slot. In an example, the time duration may be at least one subframe. In an example, the time duration may be at least one frame.

In an example, the wireless device may determine that the PDSCH overlaps, in the time duration, with the second coreset and the PDSCH is a multi-slot transmission. Based on the determining, the wireless device may prioritize the PDSCH over the second coreset.

In an example, based on the determining that the PDSCH overlaps, in the time duration, with the second coreset, the wireless device may determine whether the PDSCH is a single-slot transmission or a multi-slot transmission. In an example, the single-slot transmission may comprise that a duration of the PDSCH is a single (or one) slot. In an example, the multi-slot transmission may comprise that a duration of the PDSCH is at least two slots (e.g., First slot, Second slot, Third slot in FIG. 18). In an example, the single-slot transmission may comprise that a duration of the PDSCH is a single (or one) mini-slot. In an example, the multi-slot transmission may comprise that a duration of the PDSCH is at least two mini-slots.

In an example, the wireless device may determine that the PDSCH is the multi-slot transmission. In an example, the wireless device may prioritize the PDSCH over the second coreset based on the determining that the PDSCH is the multi-slot transmission.

In an example, the wireless device may determine that the PDSCH is the single-slot transmission. In an example, the wireless device may prioritize the second coreset over the PDSCH based on the determining that the PDSCH is the single-slot transmission.

In an example, a time offset (e.g., Offset in FIG. 18) between a reception of the DCI and a reception of the PDSCH may be less than a threshold (e.g., timeDuration-ForQCL, for example threshold in FIG. 18). In an example, the time offset between the reception of the DCI and the reception of the PDSCH may be equal to or greater than a threshold (e.g., timeDurationForQCL, Threshold-Sched-Offset). In an example, the threshold may be based on a reported UE capability. In an example, the time offset being lower than the threshold may comprise that the PDSCH is scheduled before the threshold.

In an example, prioritizing the PDSCH over the second coreset may comprise that the wireless device prioritizes the first QCL assumption (or the first TCI state) of the PDSCH over the second QCL assumption (or the second TCI state) of the second coreset. In an example, prioritizing the first QCL assumption of the PDSCH over the second QCL assumption of the second coreset may comprise that at least one second DM-RS antenna port for the second PDCCH reception in the second coreset is quasi co-located with the at least one first RS (of the first QCL assumption). In an example, prioritizing the first QCL assumption of the PDSCH over the second QCL assumption of the second coreset may comprise that the wireless device applies the at least one first RS (of the first QCL assumption) for the second PDCCH reception in the second coreset.

In an example, prioritizing the first QCL assumption of the PDSCH over the second QCL assumption of the second coreset may comprise the first QCL assumption overrides the second QCL assumption in the time duration.

In an example, the prioritizing the first QCL assumption over the second QCL assumption may comprise that the wireless device drops the second PDCCH reception in the second coreset. In an example, the wireless device may drop the second PDCCH reception at least in the time duration. In an example the dropping the second PDCCH reception may comprise that the wireless device stops the second PDCCH reception.

In an example, the prioritizing the first QCL assumption over the second QCL assumption may comprise that the wireless device performs the second PDCCH reception with the at least one second RS outside of the time duration (non-overlapped portions of the PDSCH and the second coreset). In an example, at least one second DM-RS antenna port for the second PDCCH reception in the second coreset is quasi co-located with the at least one second RS (of the second QCL assumption) outside of the time duration (non-overlapped portions of the PDSCH and the second coreset).

FIG. 19 shows an example of a downlink beam management as per an aspect of an embodiment of the present disclosure.

In an example, the PDSCH may be a multi-slot transmission. Based on being the multi-slot transmission, the PDSCH may comprise at least two slots (e.g., First slot, Second slot, Third slot in FIG. 19).

In an example, the PDSCH may overlap with the second coreset in a slot of the at least two slots. In an example, the time duration (e.g., at least one symbol) may be within the slot. In an example, the slot may be different from a first slot (e.g., First slot in FIG. 19) of the at least two slots. In an example, in FIG. 19, the slot may be the Second slot. In an example, in FIG. 19, the slot may be the Third slot.

In an example, based on the determining that the PDSCH overlaps with the second coreset in the slot different from the first slot, the wireless device may apply the second QCL assumption (or the second TCI state) for a reception of the PDSCH. In an example, based on the applying the second QCL assumption for the reception of the PDSCH, the wireless device may determine that at least one first DM-RS antenna port for the PDSCH is quasi co-located with the at least one second RS (of the second QCL assumption).

In an example, the wireless device may apply a first QCL assumption for the first slot of the PDSCH. In an example, based on the applying the first QCL assumption (or the first TCI state) for the first slot of the PDSCH, the wireless device may determine that at least one first DM-RS antenna port for the first slot of the PDSCH is quasi co-located with the at least one first RS.

In an example, based on the determining that the PDSCH overlaps with the second coreset in the slot different from the first slot, the wireless device may apply the second QCL assumption (or the second TCI state) for a reception of the PDSCH in the first slot. In an example, based on the applying the second QCL assumption for the reception of the PDSCH in the first slot, the wireless device may determine that at least one first DM-RS antenna port for the PDSCH in the first slot is quasi co-located with the at least one second RS (of the second QCL assumption).

Figure 21:
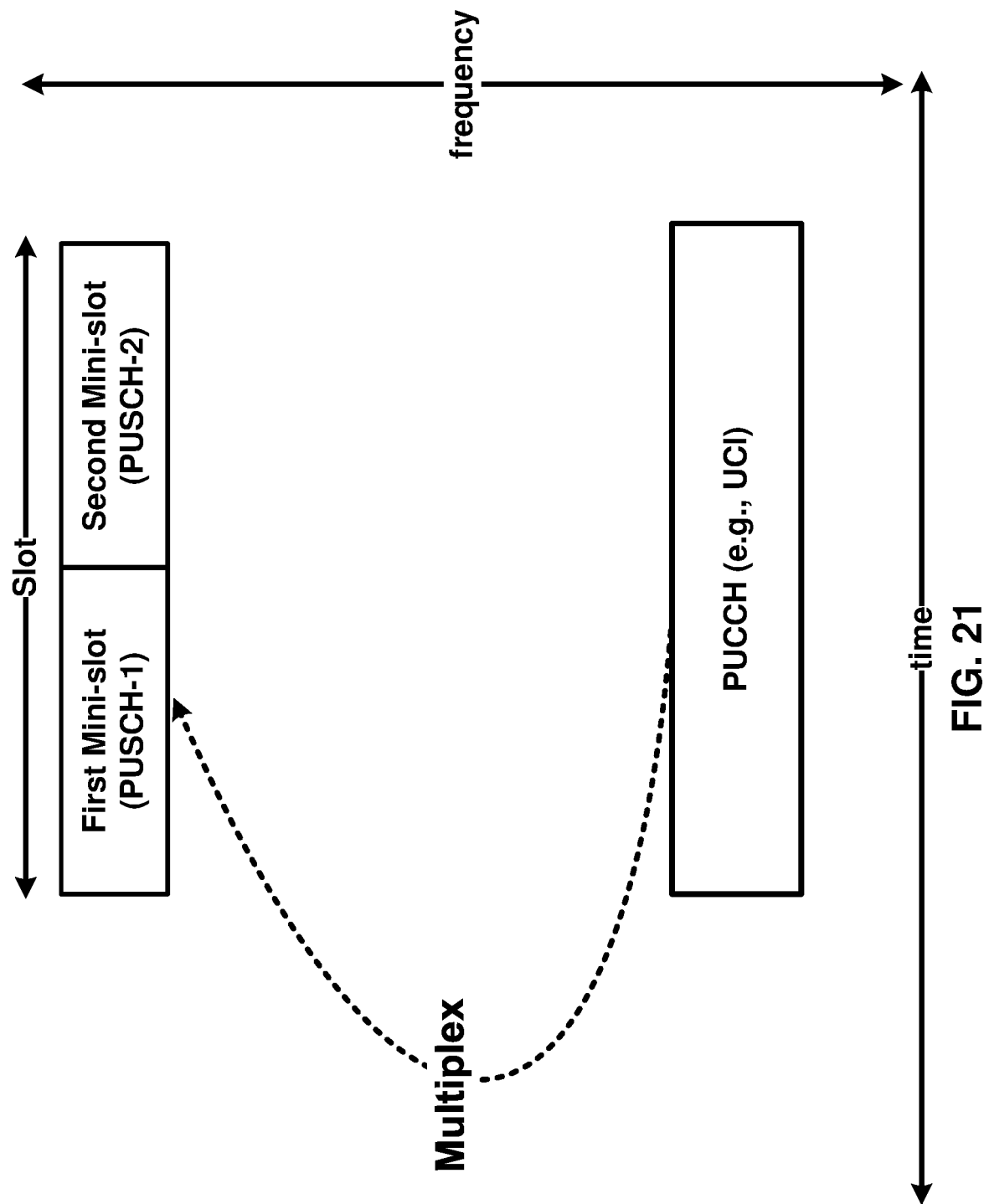
FIG. 21 is an example of an uplink multiplexing as per an aspect of an embodiment of the present disclosure.
Figure 22:
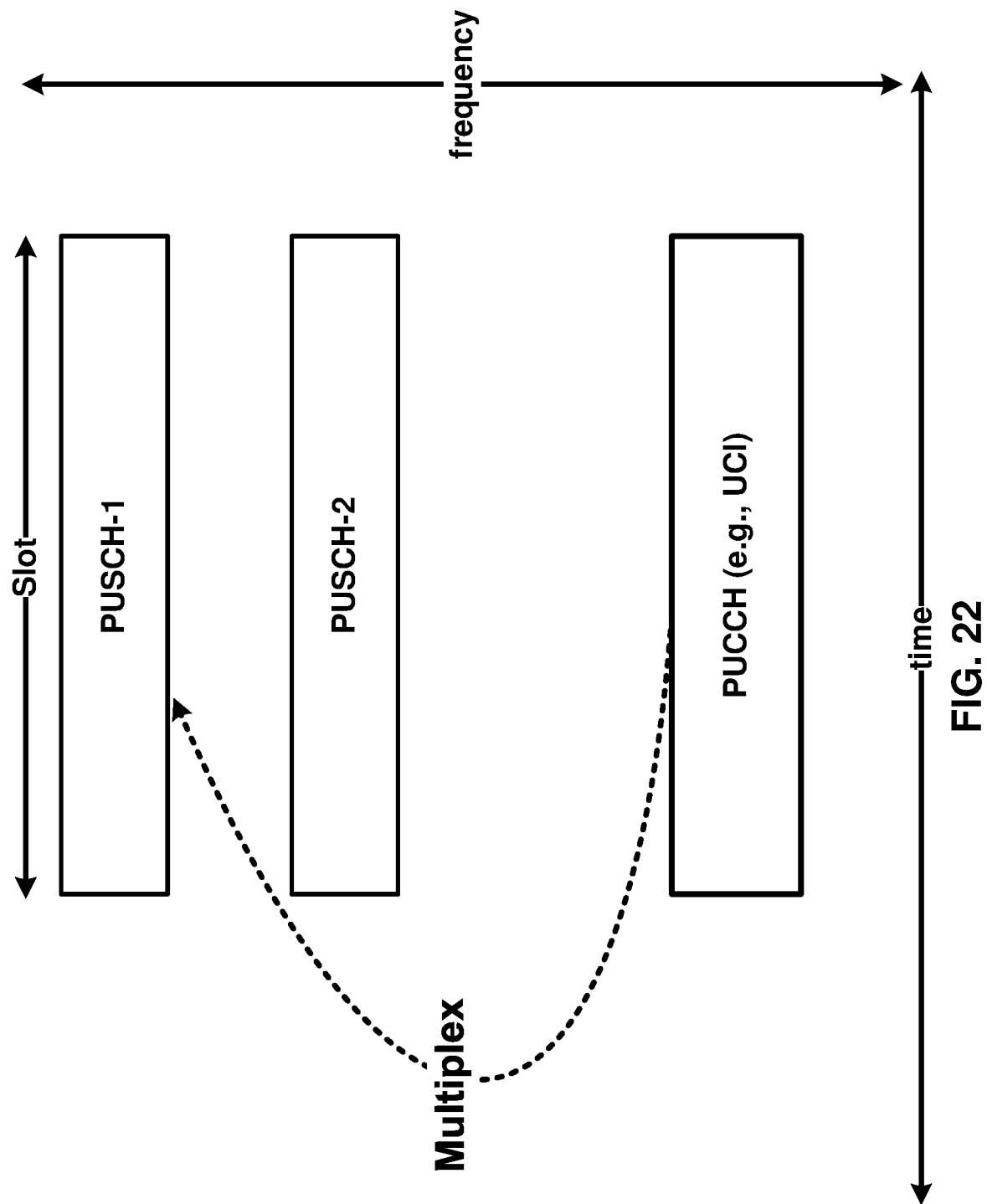
FIG. 22 is an example of an uplink multiplexing as per an aspect of an embodiment of the present disclosure.
Figure 23:
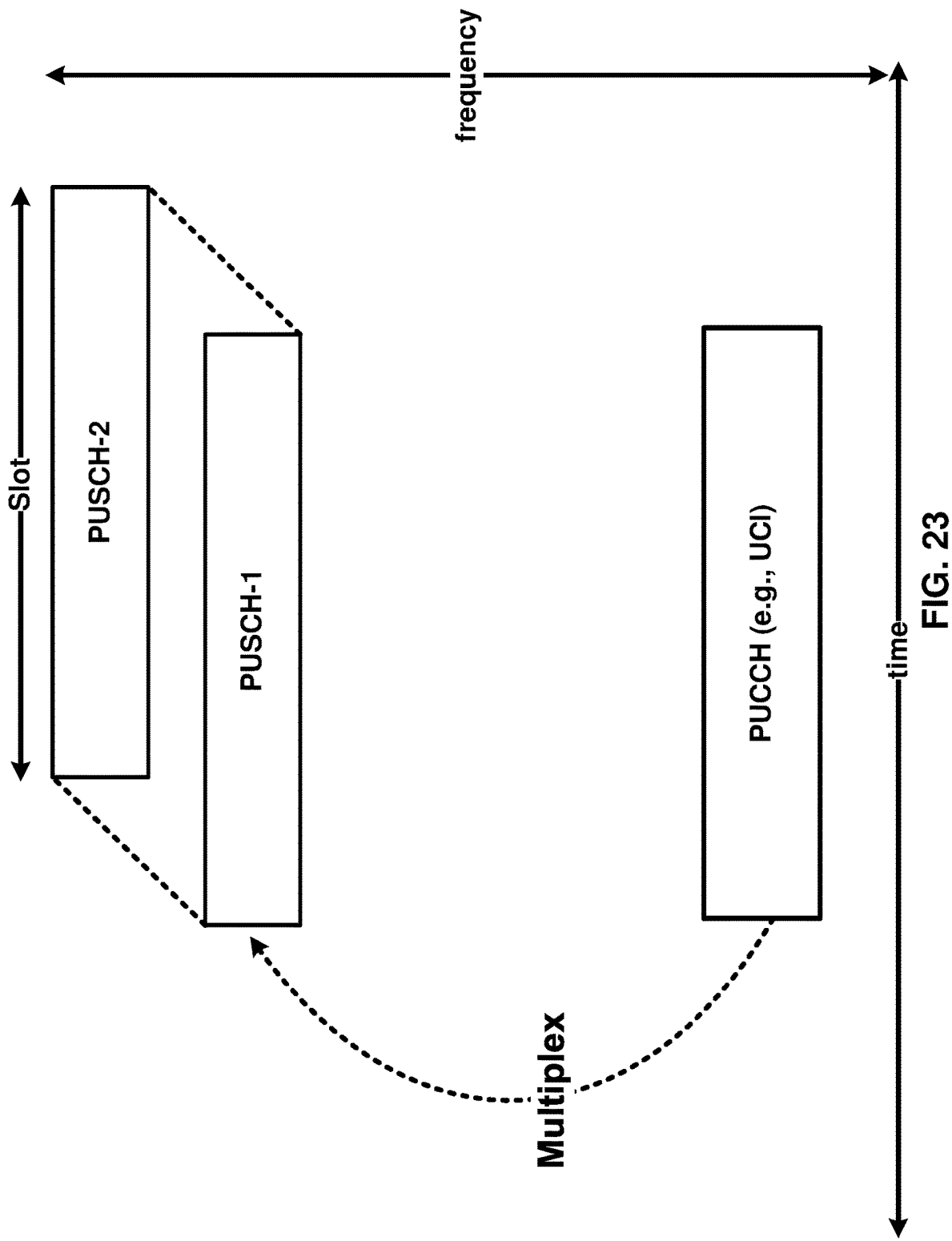
FIG. 23 is an example of an uplink multiplexing as per an aspect of an embodiment of the present disclosure.
Figure 24:
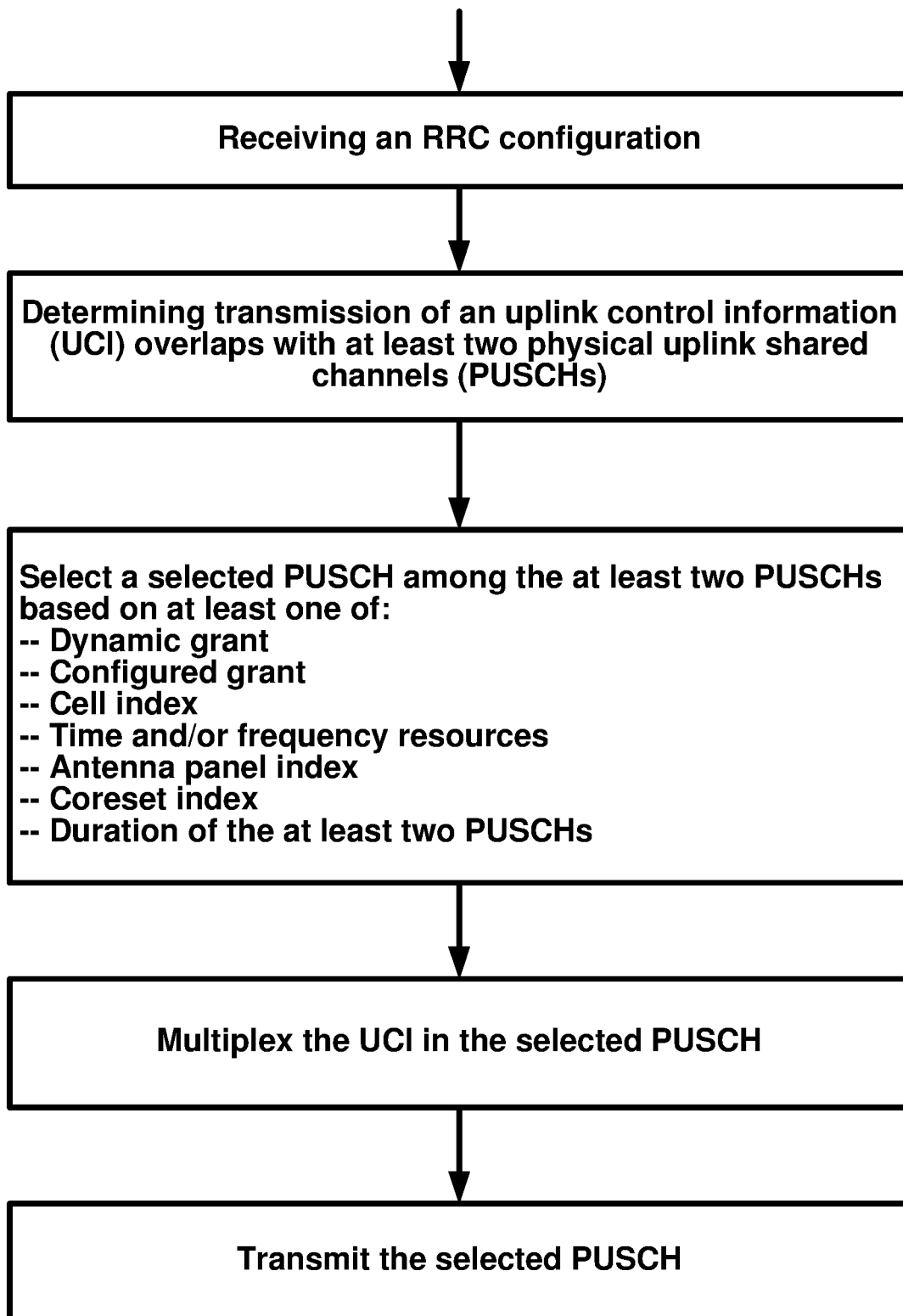
FIG. 24 is an example flowchart of an uplink multiplexing as per an aspect of an embodiment of the present disclosure.

FIG. 21, FIG. 22 and FIG. 23 show examples of an uplink multiplexing as per an aspect of an embodiment of the present disclosure. FIG. 24 is a flow diagram of the uplink multiplex disclosed in FIG. 21, FIG. 22 and FIG. 23.

In an example, a wireless device may transmit a first physical uplink shared channel (PUSCH) in a first time resource (e.g., symbol, mini-slot, slot, subframe, frame) via a first frequency resource (e.g., subcarrier, BWP, cell, frequency band). The first PUSCH is PUSCH-1 in FIG. 21-FIG. 23.

In an example, a wireless device may transmit a second PUSCH in a second time resource (e.g., symbol, mini-slot, slot, subframe, frame) via a second frequency resource (e.g., subcarrier, BWP, cell, frequency band). The second PUSCH is PUSCH-2 in FIG. 21-FIG. 23.

In an example, the first frequency resource and the second frequency resource may be the same (e.g., FIG. 21, FIG. 23). In an example, the first frequency resource and the second frequency resource may be different (e.g., FIG. 22). In an example, the first time resource and the second time resource may be the same (e.g., FIG. 22, FIG. 23). In an example, the first time resource and the second time resource may be different (e.g., FIG. 21).

In an example, the wireless device may determine that an uplink control information (UCI) overlaps with the first PUSCH and the second PUSCH (e.g., in the first time resource and the second time resource) in a time duration (e.g., at least one symbol, at least one mini-slot, at least one slot, and the like).

In an example, based on the determining that the UCI overlaps with the first PUSCH and the second PUSCH, the wireless device may select a selected PUSCH among the first PUSCH and the second PUSCH.

In an example, the wireless device may select the selected PUSCH based on one or more criteria. In an example, the wireless device may select the selected PUSCH based on a variety of criteria.

In an example, the wireless device may transmit the first PUSCH on/via/for the first cell identified with the first cell-specific index (e.g., provided by a higher layer parameter servCellIndex). In an example, the wireless device may transmit the second PUSCH on/via/for the second cell identified with the second cell-specific index (e.g., provided by a higher layer parameter servCellIndex).

The wireless device may select the selected PUSCH, for example, based on the first cell-specific index and the second cell-specific index. In an example, the selecting the selected PUSCH based on the first cell-specific index and the second cell-specific index may comprise selecting a selected cell with a lowest (or a highest) cell-specific index among the first cell-specific index and the second cell-specific index. In an example, the selecting the selected PUSCH based on the first cell-specific index and the second cell-specific index may comprise that the wireless device compares the first cell-specific index and the second cell-specific index.

In an example, based on the comparing, the wireless device may determine that the first cell-specific index is lower (or higher) than the second cell-specific index. Based on the determining, the wireless device may select the first cell as the selected cell. Based on the selecting the first cell as the selected cell, the wireless device may select the first PUSCH as the selected PUSCH.

In an example, based on the comparing, the wireless device may determine that the second cell-specific index is lower (or higher) than the first cell-specific index. Based on the determining, the wireless device may select the second cell as the selected cell. Based on the selecting the second cell as the selected cell, the wireless device may select the second PUSCH as the selected PUSCH.

The wireless device may select the selected PUSCH, for example, based on the first time resource and the second time resource. In an example, the selecting the selected PUSCH based on the first time resource and the second time resource may comprise selecting a selected time resource earliest (or latest) in time among the first time resource and the second time resource. In an example, the selecting the selected PUSCH based on the first time resource and the second time resource may comprise that the wireless device compares the first time resource and the second time resource.

In an example, based on the comparing, the wireless device may determine that the first time resource is earlier (or later) than the second time resource. Based on the determining, the wireless device may select the first time resource as the selected time resource. Based on the selecting the first time resource as the selected time resource, the wireless device may select the first PUSCH as the selected PUSCH.

In an example, based on the comparing, the wireless device may determine that the second time resource is earlier (or later) than the first time resource. Based on the determining, the wireless device may select the second time resource as the selected time resource. Based on the selecting the second time resource as the selected time resource, the wireless device may select the second PUSCH as the selected PUSCH.

The wireless device may select the selected PUSCH, for example, based on the first frequency resource and the second frequency resource. In an example, the selecting the selected PUSCH based on the first frequency resource and the second frequency resource may comprise selecting a selected frequency resource lower (or higher) in frequency among the first frequency resource and the second frequency resource. In an example, the selecting the selected PUSCH based on the first frequency resource and the second frequency resource may comprise that the wireless device compares the first frequency resource and the second frequency resource.

In an example, based on the comparing, the wireless device may determine that the first frequency resource is lower (or higher) than the second frequency resource. Based on the determining, the wireless device may select the first frequency resource as the selected frequency resource. Based on the selecting the first frequency resource as the selected frequency resource, the wireless device may select the first PUSCH as the selected PUSCH.

In an example, based on the comparing, the wireless device may determine that the second frequency resource is lower (or higher) than the first frequency resource. Based on the determining, the wireless device may select the second frequency resource as the selected frequency resource. Based on the selecting the second frequency resource as the selected frequency resource, the wireless device may select the second PUSCH as the selected PUSCH.

In an example, the wireless device may receive a first DCI in a first coreset identified with a first coreset-specific index. The first DCI may schedule the first PUSCH. In an example, the wireless device may receive a second DCI in a second coreset identified with a second coreset-specific index. The second DCI may schedule the second PUSCH.

The wireless device may select the selected PUSCH, for example, based on the first coreset-specific index and the second coreset-specific index. In an example, the selecting based on the first coreset-specific index and the second coreset-specific index may comprise selecting a selected coreset with a lowest (or a highest) coreset-specific index among the first coreset-specific index and the second coreset-specific index. In an example, the selecting the selected PUSCH based on the first coreset-specific index and the second coreset-specific index may comprise that the wireless device compares the first coreset-specific index and the second coreset-specific index.

In an example, based on the comparing, the wireless device may determine that the first coreset-specific index is lower (or higher) than the second coreset-specific index. Based on the determining, the wireless device may select the first coreset as the selected coreset. Based on the selecting the first coreset as the selected coreset, the wireless device may select the first PUSCH as the selected PUSCH.

In an example, based on the comparing, the wireless device may determine that the second coreset-specific index is lower (or higher) than the first coreset-specific index. Based on the determining, the wireless device may select the second coreset as the selected coreset. Based on the selecting the second coreset as the selected coreset, the wireless device may select the second PUSCH as the selected PUSCH.

In an example, the wireless device may be equipped with one or more antenna panels. In an example, the one or more configuration parameters may indicate panel-specific indices (e.g., provided by a higher layer parameter) for the one or more antenna panels. In an example, each antenna panel of the one or more antenna panels may be identified by a respective one panel-specific index of the panel-specific indices. In an example, a first antenna panel of the one or more antenna panels may be identified by a first panel-specific index. In an example, a second antenna panel of the one or more antenna panels may be identified by a second panel-specific index.

In an example, a panel-specific index may be used, by the wireless device and/or the base station, to indicate an antenna panel (or antenna panel-specific UL transmission) of the one or more antenna panels. In an example, the panel-specific index may be an SRS resource set ID. In an example, the panel-specific index may be associated to a reference RS resource and/or a resource set. In an example, the panel-specific index may be associated to (or assigned for) a target RS resource and/or a resource set. In an example, the panel-specific index may be configured in a spatial relation info.

In an example, the wireless device may transmit the first PUSCH via the first antenna panel identified by the first panel-specific index. In an example, the wireless device may transmit the second PUSCH via the second antenna panel identified by the second panel-specific index.

The wireless device may select the selected PUSCH, for example, based on the first panel-specific index and the second panel-specific index. In an example, the selecting based on the first panel-specific index and the second panel-specific index may comprise selecting a selected panel with a lowest (or a highest) panel-specific index among the first panel-specific index and the second panel-specific index. In an example, the selecting the selected PUSCH based on the first panel-specific index and the second panel-specific index may comprise that the wireless device compares the first panel-specific index and the second panel-specific index.

In an example, based on the comparing, the wireless device may determine that the first panel-specific index is lower (or higher) than the second panel-specific index. Based on the determining, the wireless device may select the first antenna panel as the selected panel. Based on the selecting the first antenna panel as the selected panel, the wireless device may select the first PUSCH as the selected PUSCH.

In an example, based on the comparing, the wireless device may determine that the second panel-specific index is lower (or higher) than the first panel-specific index. Based on the determining, the wireless device may select the second antenna panel as the selected panel. Based on the selecting the second antenna panel as the selected panel, the wireless device may select the second PUSCH as the selected PUSCH.

The wireless device may select the selected PUSCH, for example, based on a first duration of the first PUSCH and a second duration of the second PUSCH. In an example, the selecting based on the first duration and the second duration may comprise selecting the selected PUSCH with a lowest (or a highest) PUSCH duration among the first duration and the second duration. In an example, the selecting the selected PUSCH based on the first duration and the second duration may comprise that the wireless device compares the first duration and the second duration.

In an example, based on the comparing, the wireless device may determine that the first duration is lower (or higher) than the second duration. Based on the determining, the wireless device may select the first PUSCH as the selected PUSCH.

In an example, based on the comparing, the wireless device may determine that the second duration is lower (or higher) than the first duration. Based on the determining, the wireless device may select the second PUSCH as the selected PUSCH.

In an example, the first PUSCH may be scheduled by a first DCI (e.g., dynamic uplink grant). In an example, the second PUSCH may be scheduled by a second DCI (e.g., dynamic uplink grant).

In an example, the first PUSCH may be transmitted via a first periodic uplink resource configured by a first configured uplink grant (e.g., configured uplink grant). In an example, the second PUSCH may be scheduled by a second DCI (e.g., dynamic uplink grant).

In an example, the wireless device may select the selected PUSCH, for example, based on a first service (e.g., URLLC, eMBB, mMTC) of the first PUSCH and a second service (e.g., URLLC, eMBB, mMTC) of the second PUSCH. In an example, the selecting based on the first service and the second service may comprise selecting the selected PUSCH with a highest priority among the first service and the second service. In an example, the selecting the selected PUSCH based on the first service and the second service may comprise that the wireless device compares a first priority of the first PUSCH and a second priority of the second PUSCH.

In an example, based on the comparing, the wireless device may determine that the first priority of the first service is higher than the second priority of the second service. Based on the determining, the wireless device may select the first PUSCH as the selected PUSCH.

In an example, based on the comparing, the wireless device may determine that the first priority of the first service is lower than the second priority of the second service. Based on the determining, the wireless device may select the second PUSCH as the selected PUSCH.

In an example, the first PUSCH may be scheduled by a first DCI (e.g., dynamic uplink grant). In an example, the second PUSCH may be scheduled by a second DCI (e.g., dynamic uplink grant).

In an example, the first PUSCH may be transmitted via a first periodic uplink resource configured by a first configured uplink grant (e.g., configured uplink grant). In an example, the second PUSCH may be scheduled by a second DCI (e.g., dynamic uplink grant).

In an example, the wireless device may select the selected PUSCH, for example, based on a first group (e.g., the TCI state group, the antenna port group, the HARQ process group, the coreset group) of the UCI, a second group of the first PUSCH and a third group of the second PUSCH. In an example, the selecting the selected PUSCH, for example, based on the first group, the second group and the third group may comprise selecting the selected PUSCH with a group (e.g., the second group, the third group) same as the first group of the UCI. In an example, the first group and the second group may be the same. In an example, the first group and the third group may be different. Based on the first group and the second group being the same and the first group and the third group being different, the wireless device may select the first PUSCH, as the selected PUSCH, associated with the second group. In an example, the first group and the third group may be the same. In an example, the first group and the second group may be different. Based on the first group and the third group being the same and the first group and the second group being different, the wireless device may select the second PUSCH, as the selected PUSCH, associated with the third group.

In an example, based on the selecting the selected PUSCH, the wireless device multiplexes the UCI in the selected PUSCH. The wireless device may transmit the selected PUSCH with the UCI based on/after the multiplexing.

Figure 25:
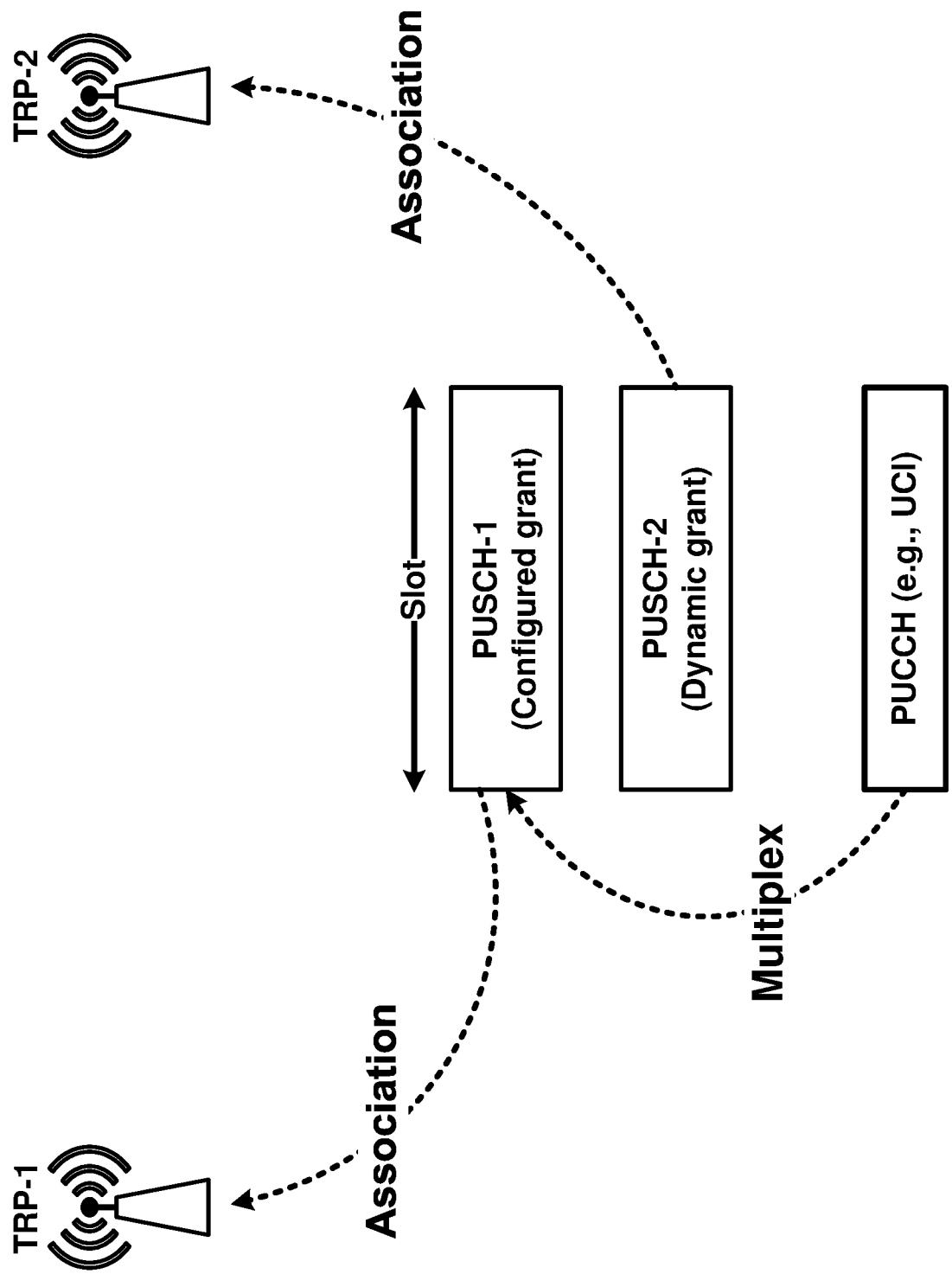
FIG. 25 is an example of an uplink multiplexing as per an aspect of an embodiment of the present disclosure.
Figure 26:
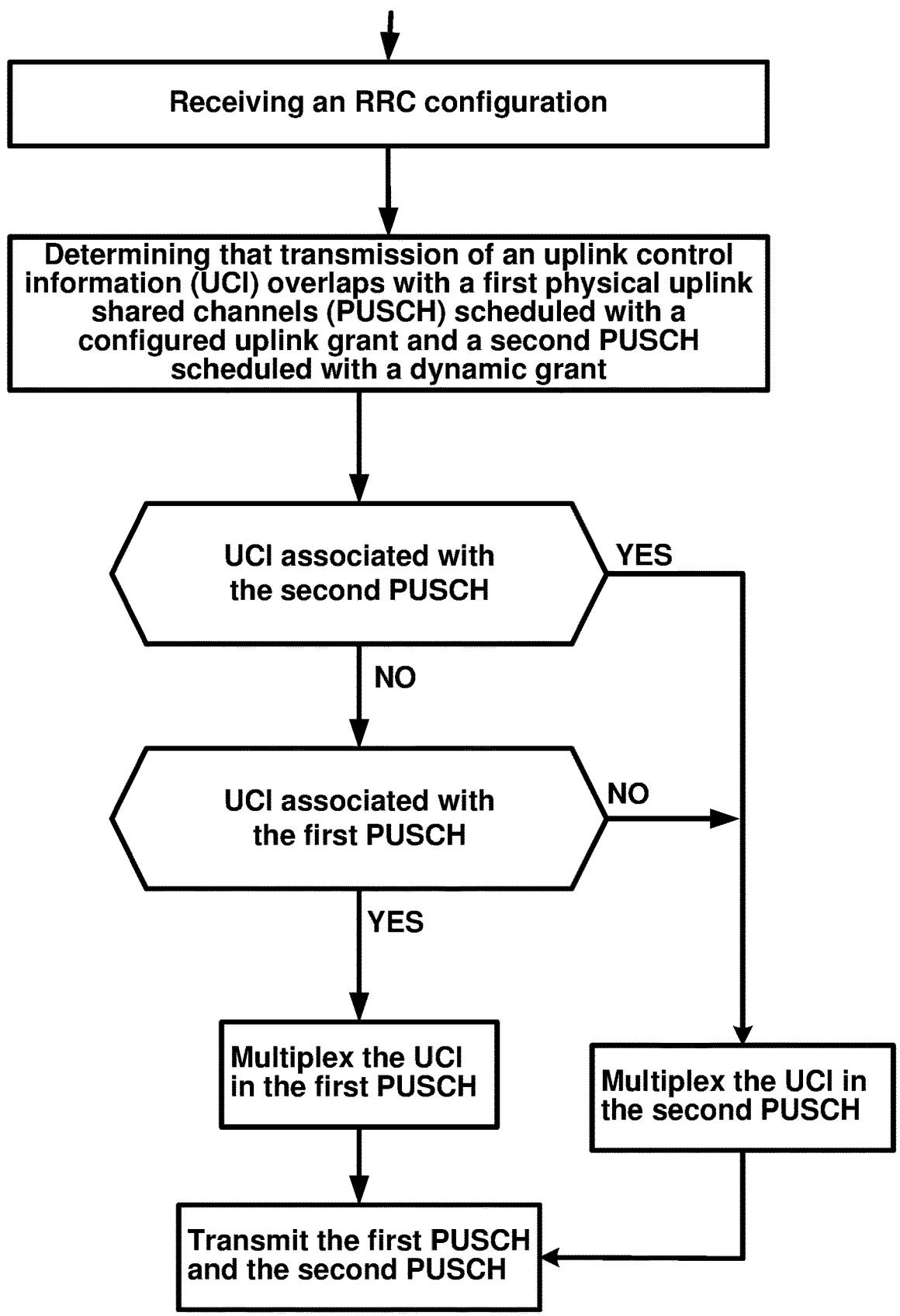
FIG. 26 is an example flowchart of an uplink multiplexing as per an aspect of an embodiment of the present disclosure.

FIG. 25 shows an example of an uplink multiplexing as per an aspect of an embodiment of the present disclosure. FIG. 26 is a flow diagram of the uplink multiplex disclosed in FIG. 25.

In an example, a wireless device may receive one or more messages. The one or more messages may comprise one or more configuration parameters.

In an example, the one or more configuration parameters may indicate one or more coresets. In an example, the one or more coresets may be grouped/formed into one or more coreset groups comprising a first coreset group and a second coreset group. In an example, a first coreset group of the one or more coreset groups may comprise a first coreset. In an example, a second coreset group of the one or more coreset groups may comprise a second coreset.

In an example, the one or more configuration parameters may indicate a configured uplink grant. The configured uplink grant may indicate a second time resource. The configured uplink grant may indicate a second frequency resource. In an example, the second time resource may be periodic. In an example, the one or more configuration parameters may associate the configured uplink grant with the second coreset group. In an example, the one or more configuration parameters may indicate an identifier of the second coreset group in a configuration of the configured uplink grant. In an example, the one or more configuration parameters may indicate an identifier (e.g., TCI state group, TRP ID, antenna port group, HARQ process group, coreset group), of the second coreset group for the configured uplink grant.

In an example, the wireless device may receive a first DCI. In an example, the wireless device may receive the first DCI in a first coreset of the first coreset group (of the one or more coreset groups). In an example, the first DCI may schedule a transmission of a first PUSCH in a first time resource.

In an example, the wireless device may determine that the first time resource overlaps with the second time resource of a second PUSCH for the configured uplink grant. In an example, determining that the first time resource overlaps with the second time resource may comprise that the first PUSCH and the second PUSCH may overlap in a time duration (e.g., at least one symbol, at least one mini-slot, at least one slot, etc.).

In an example, the wireless device may determine that an UCI overlaps with the first PUSCH and the second PUSCH in the time duration. In an example, the wireless device may receive a second DCI in the second coreset of the second coreset group (of the one or more coreset groups). In an example, the second DCI may schedule a PDSCH. In an example, the wireless device may transmit the UCI for the PDSCH scheduled by the second DCI (received in the second coreset).

In an example, based on the determining that the UCI for the PDSCH scheduled by the second DCI received in the second coreset associated with the second coreset group, the wireless device may multiplex the UCI in the second PUSCH in the time duration. The wireless device may transmit the second PUSCH with the UCI based on the multiplexing.

In an example, based on the determining that the UCI overlaps with the first PUSCH and the second PUSCH in the time duration, the wireless device may select a selected PUSCH among the first PUSCH and the second PUSCH based on whether the second coreset belongs to the first coreset group or the second coreset group. In an example, based on the selecting, the wireless device may multiplex the UCI in the selected PUSCH. In an example, the wireless device may select the selected PUSCH based on one or more criteria discussed in FIG. 21-FIG. 23.

In an example, a transmission of an uplink control information (UCI) may overlap in time with a transmission of a transport block. The wireless device may not transmit the UCI via a physical uplink control channel (PUCCH) resource and the transport block via a physical uplink shared channel (PUSCH) resource at the same time. The wireless device may not be capable of simultaneous PUSCH and PUCCH transmissions. In an example, the PUCCH resource and the PUSCH resource may be on/in the same cell. The wireless device may multiplex the UCI in the PUSCH resource. The wireless device may multiplex the UCI in the PUSCH resource based on not being capable of simultaneous PUSCH and PUCCH transmissions. The wireless device may transmit, via the PUSCH resource, the UCI based on the multiplexing.

In an example, a wireless device may be served by a plurality of TRPs comprising a first TRP and a second TRP. A backhaul between the first TRP and the second TRP may be non-ideal (e.g., 5 ms delay, 10 ms delay, 50 ms delay, etc.). Based on the backhaul being non-ideal, the scheduling decisions at the first TRP and the second TRP may be independent. Independent scheduling decisions at the first TRP and the second TRP may result in collisions (e.g., PUCCH/PUSCH collisions between the first TRP and the second TRP). For example, when the first TRP schedules transmission of a transport block via a PUSCH resource in a time slot, the second TRP may configure/indicate transmission of an UCI via a PUCCH resource in the same time slot. The transmission of the transport block via the PUSCH resource for the first TRP may overlap in the time slot with the UCI via the PUCCH resource for the second TRP. The wireless device may not transmit the transport block to the first TRP and the UCI to the second TRP simultaneously.

Implementation of the legacy behavior, where the wireless device multiplexes the UCI of the second TRP in the PUSCH resource of the first TRP may result in a degraded performance. For example, when the wireless device transmits the UCI via the PUSCH resource, the first TRP may not be aware of the UCI being multiplexed in the PUSCH resource based on the backhaul being non-ideal (e.g., long delay). The first TRP may not decode/receive transport block transmitted via the PUSCH resource based on not being aware of the UCI being multiplexed in the PUSCH resource. This may reduce data rate and/or increase latency/delay of a successful communication. For example, the second TRP may not be aware of the UCI being multiplexed in the PUSCH resource of the first TRP based on the backhaul being non-ideal. When the wireless device transmits the UCI via the PUSCH resource of the first TRP, the second TRP may not receive the UCI. If the UCI is an ACK/NACK of a PDSCH scheduled by the second TRP, the second TRP may transmit a downlink control information (DCI) rescheduling the PDSCH based on not receiving the UCI for the PDSCH. This may increase signaling overhead. There is a need to enhance multiplexing of an UCI in a PUSCH resource when the wireless device is served by a plurality of TRPs.

In an example, when a wireless device is served by a plurality of TRPs, a PUCCH resource for an UCI may overlap in time with a PUSCH resource of a transport block. In an example embodiment, the wireless device may multiplex the UCI in the PUSCH resource when the UCI and the PUSCH resource are configured/indicated for (or belong to) the same TRP. For example, the UCI and the PUSCH resource may be configured/indicated for (or may belong to) a first TRP of the plurality of TRPs. The wireless device may multiplex the UCI of the first TRP in the PUSCH resource of the first TRP and transmit via the PUSCH resource of the first TRP. The first TRP may be aware of the PUCCH resource overlapping in time with the PUSCH resource. The first TRP may be aware of the multiplexing of the UCI in the PUSCH resource. The first TRP may decode/receive the transport block and the UCI successfully based on the being aware of the multiplexing. In an example embodiment, the wireless device may not multiplex the UCI in the PUSCH resource when the UCI and the PUSCH resource are configured/indicated for (or belong to) different TRPs.

In an example, multiplexing of the UCI in the PUSCH resource when the UCI and the PUSCH are configured/indicated for the same TRP and not multiplexing the UCI in the PUSCH resource when the UCI and the PUSCH are configured/indicated for different TRPs may reduce latency/delay of data communication. This may reduce signaling overhead. This may increase data rate. The reduced signaling overhead and latency/delay may reduce power consumption at the wireless device and/or the base station.

In an example, a wireless device may differentiate PUCCH/PUSCH resources configured/indicated for (or belonging to) a TRP.

In an example, a wireless device may receive, via a control resource set (coreset), a DCI scheduling a transport block via a PUSCH resource. The base station may configure the coreset with a coreset pool index (or a TRP index or a coreset group index). The coreset pool index may indicate the TRP of the PUSCH resource. Based on the coreset pool index of the coreset that the wireless device receives the DCI, the wireless device may determine the TRP of the PUSCH resource. For example, the first TRP may transmit via one or more first coresets configured with a first coreset pool index that is equal to zero. The second TRP may transmit via one or more second coresets configured with a second coreset pool index that is equal to one. The first TRP may not transmit via the one or more second coresets. The second TRP may not transmit via the one or more first coresets. The PUSCH resource may be associated with the first TRP when the wireless device receives the DCI via a coreset with the first coreset pool index. The PUSCH resource may be associated with the second TRP when the wireless device receives the DCI via a coreset with the second coreset pool index.

In an example, the wireless device may not receive a DCI scheduling a transport block for a configured uplink grant (e.g., Type-1 configured uplink grant). The base station may not transmit a DCI, via a coreset, activating the configured uplink grant. Based on not receiving a DCI for the configured uplink grant, the wireless device may not differentiate a TRP of a PUSCH resource of the configured uplink grant. In an example, the base station may configure a coreset pool index for a configured uplink grant. The wireless device may differentiate a TRP of a PUSCH resource of the configured uplink grant based on the coreset pool index configured for the configured uplink grant. For example, a first configured uplink grant may be configured, by RRC configuration parameters transmitted by a base station, with a first coreset pool index that is equal to zero. A second configured uplink grant may be configured, by the RRC configuration parameters transmitted by the base station, with a second coreset pool index that is equal to one. A PUSCH resource of the first configured uplink grant may be associated with the first TRP based on the first configured uplink grant being configured with the first coreset pool index that is equal to zero. A PUSCH resource of the second configured uplink grant may be associated with the second TRP based on the second configured uplink grant being configured with the second coreset pool index that is equal to one.

Based on the differentiating PUCCH/PUSCH resources configured/indicated for (or belonging to) a TRP, among the plurality of TRPs, the wireless device may or may not multiplex an UCI in a PUSCH resource. This may reduce signaling overhead. This may increase data rate. The reduced signaling overhead and latency/delay may reduce power consumption at the wireless device and/or the base station.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 27:
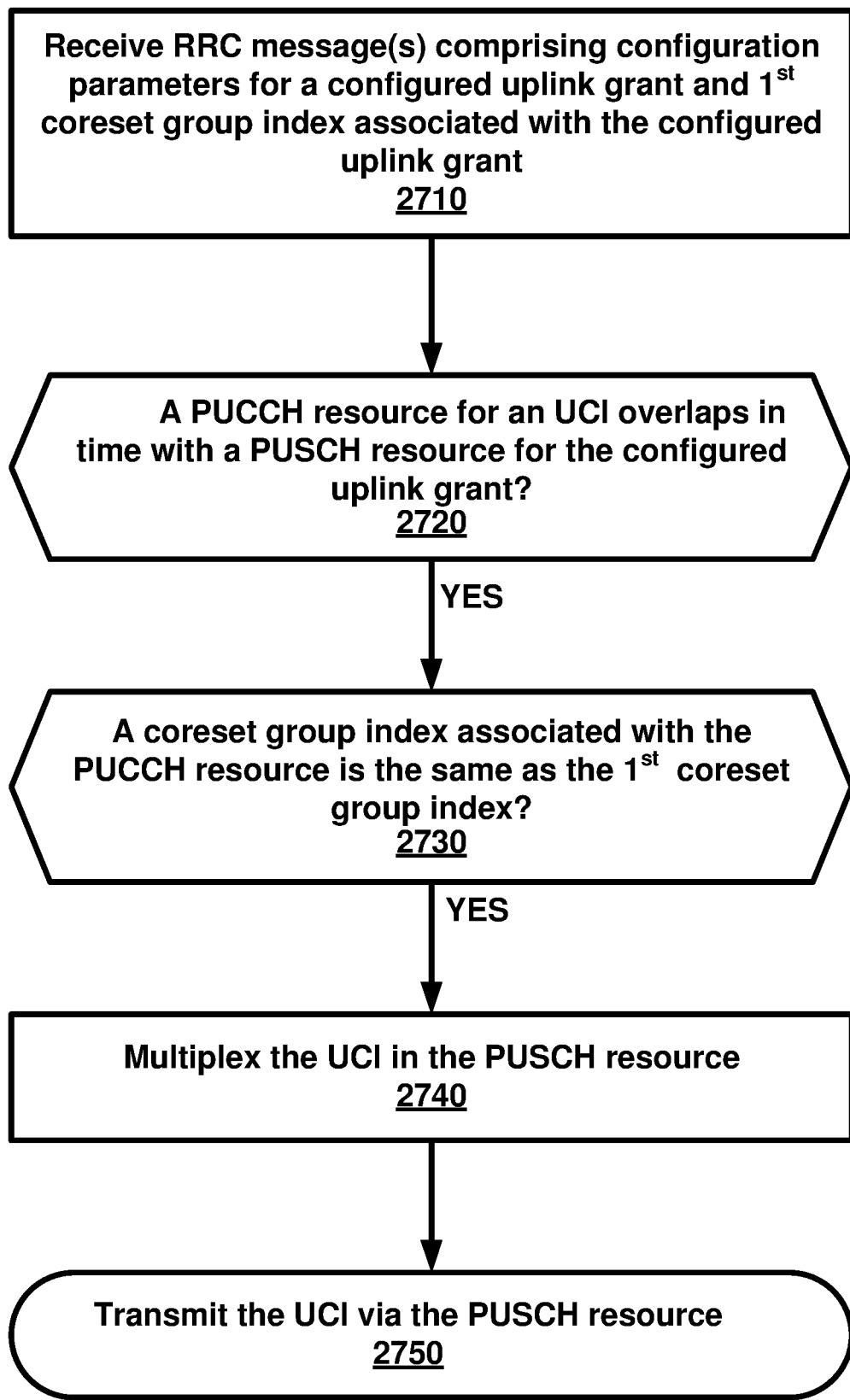
FIG. 27 is an example flowchart of an uplink multiplexing as per an aspect of an embodiment of the present disclosure.

FIG. 27 is a flow diagram as per an aspect of an example embodiment of the present disclosure. At 2710, a wireless device may receive one or more radio resource control (RRC) messages. The one or more RRC messages may comprise configuration parameters for a configured uplink grant. The one or more RRC messages may comprise a first control resource set (coreset) group index associated with the configured uplink grant. At 2720, the wireless device may determine that a physical uplink control channel (PUCCH) resource for an uplink control information (UCI) overlaps in time with a physical uplink shared channel (PUSCH) resource for the configured uplink grant. At 2730, the wireless device may determine that a coreset group index associated with the PUCCH resource is the same as the first coreset group index. At 2740, based on the determining that the PUCCH resource overlaps in time with the PUSCH resource and the coreset group index is the same as the first coreset group index, the wireless device may multiplex the UCI in the PUSCH resource. At 2750, the wireless device may transmit the UCI via the PUSCH resource.

Figure 28:
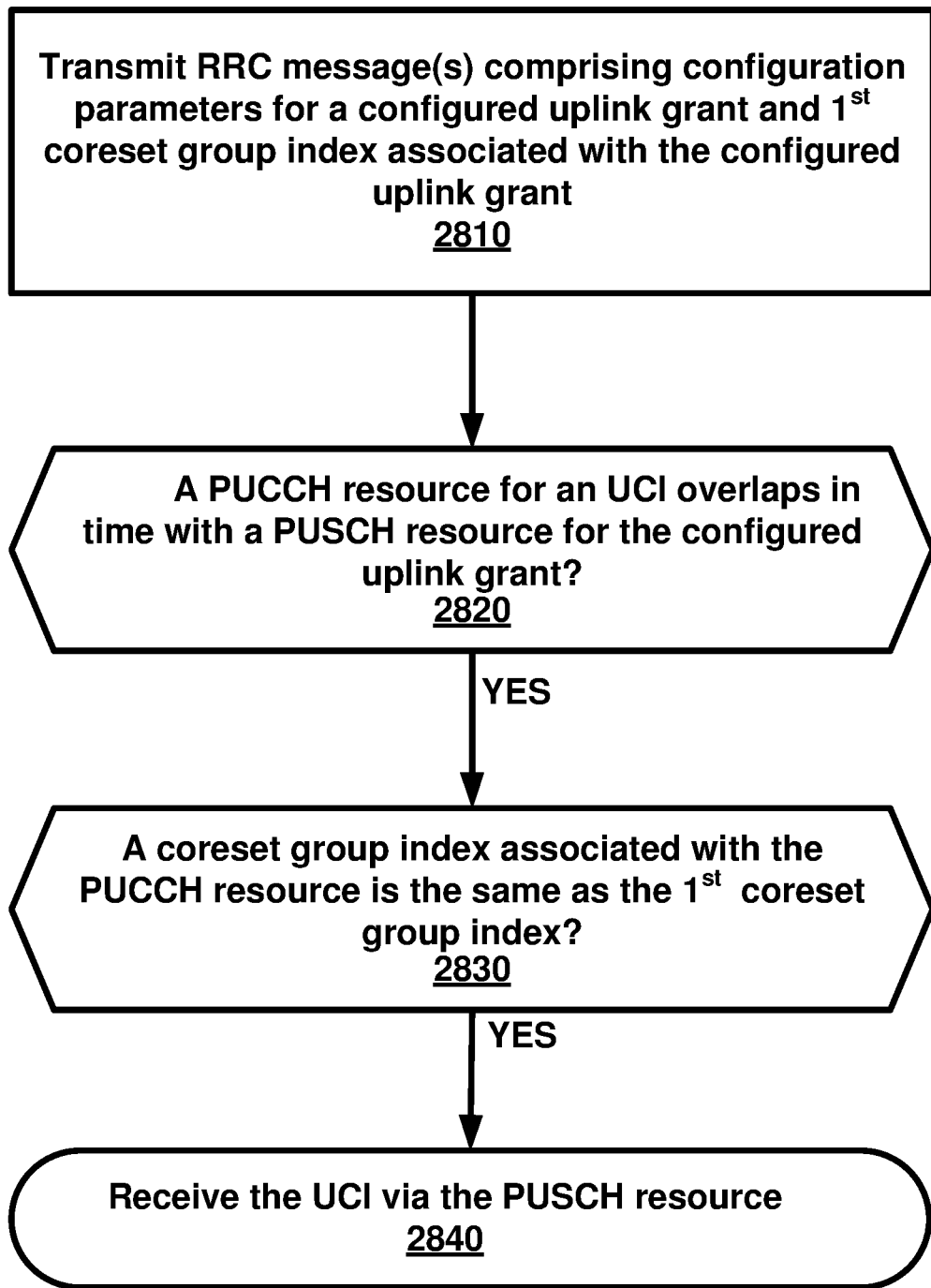
FIG. 28 is an example flowchart of an uplink multiplexing as per an aspect of an embodiment of the present disclosure.

FIG. 28 is a flow diagram as per an aspect of an example embodiment of the present disclosure. At 2810, a base station may transmit one or more radio resource control (RRC) messages. The one or more RRC messages may comprise configuration parameters for a configured uplink grant. The one or more RRC messages may comprise a first control resource set (coreset) group index associated with the configured uplink grant. At 2820, the base station may determine that a physical uplink control channel (PUCCH) resource for an uplink control information (UCI) overlaps in time with a physical uplink shared channel (PUSCH) resource for the configured uplink grant. At 2830, the base station may determine that a coreset group index associated with the PUCCH resource is the same as the first coreset group index. At 2840, based on the determining that the PUCCH resource overlaps in time with the PUSCH resource and the coreset group index is the same as the first coreset group index, the base station may receive the UCI via the PUSCH resource.

According to an example embodiment, a wireless device may receive one or more radio resource control (RRC) messages. The one or more RRC messages may comprise configuration parameters for a configured uplink grant. The one or more RRC messages may comprise a first control resource set (coreset) group index associated with the configured uplink grant. According to an example embodiment, the wireless device may determine that a physical uplink control channel (PUCCH) resource for an uplink control information (UCI) overlaps in time with a physical uplink shared channel (PUSCH) resource for the configured uplink grant. According to an example embodiment, the wireless device may determine that a coreset group index associated with the PUCCH resource is the same as the first coreset group index. According to an example embodiment, based on the determining that the PUCCH resource overlaps in time with the PUSCH resource and the coreset group index is the same as the first coreset group index, the wireless device may multiplex the UCI in the PUSCH resource. According to an example embodiment, the wireless device may transmit the UCI via the PUSCH resource.

According to an example embodiment, the wireless device may transmit a second UCI via a second PUCCH resource based on determining that the second PUCCH resource for the second UCI overlaps in time with a second PUSCH resource for the configured uplink grant and a coreset group index associated with the second PUCCH resource is different from the first coreset group index.

According to an example embodiment, the wireless device may not multiplex the second UCI in the second PUSCH resource.

According to an example embodiment, the first coreset group index may identify a first coreset group associated with the configured uplink grant.

According to an example embodiment, the one or more RRC messages may comprise the coreset group index for the PUCCH resource.

According to an example embodiment, the PUCCH resource being associated with the coreset group index may comprise receiving, via a coreset with the coreset group index, a downlink control information (DCI). The DCI may schedule a physical downlink shared channel (PDSCH). The DCI may indicate the PUCCH resource for transmission of the UCI of the PDSCH. According to an example embodiment, the one or more RRC messages may comprise the coreset group index for the coreset. According to an example embodiment, the UCI may be a hybrid automatic repeat request acknowledgement (HARQ-ACK) of the PDSCH.

According to an example embodiment, the UCI overlapping in time may comprise the UCI overlapping in at least one symbol. According to an example embodiment, the UCI overlapping in time may comprise the UCI overlapping in at least one mini-slot. According to an example embodiment, the UCI overlapping in time may comprise the UCI overlapping in at least one slot.

According to an example embodiment, the UCI may comprise a scheduling request. According to an example embodiment, the UCI may comprise a HARQ-ACK. According to an example embodiment, the UCI may comprise a channel-state-information (CSI) report.

According to an example embodiment, the configured uplink grant may be for transmission of transport blocks to a transmission reception point (TRP) associated with the first coreset group index. According to an example embodiment, the TRP being associated with the first coreset group index may comprise the TRP transmitting, via one or more first coresets with the first coreset group index, one or more downlink control information. According to an example embodiment, the TRP being associated with the first coreset group index may comprise the TRP not transmitting, via one or more second coresets with a second coreset group index that is different from the first coreset group index, one or more downlink control information. According to an example embodiment, the one or more RRC messages may comprise the first coreset group index for the one or more first coresets. According to an example embodiment, the one or more RRC messages may comprise the second coreset group index for the one or more second coresets.

According to an example embodiment, a wireless device may receive one or more radio resource control (RRC) messages. The one or more RRC messages may comprise configuration parameters for a configured uplink grant. The one or more RRC messages may comprise a first coreset group index associated with the configured uplink grant. According to an example embodiment, the wireless device may multiplex an uplink control information (UCI) in a physical uplink shared channel (PUSCH) resource for the configured uplink grant based on determining that a physical uplink control channel (PUCCH) resource for the UCI overlaps in time with the PUSCH resource; and a coreset group index associated with the PUCCH resource is the same as the first coreset group index. According to an example embodiment, the wireless device may transmit the UCI via the PUSCH resource.

According to an example embodiment, a wireless device may receive one or more radio resource control (RRC) messages. The one or more RRC messages may comprise configuration parameters for a configured uplink grant. The one or more RRC messages may comprise a first coreset group index associated with the configured uplink grant. According to an example embodiment, the wireless device may transmit an uplink control information (UCI) via a physical uplink shared channel (PUSCH) resource for the configured uplink grant based on determining that a physical uplink control channel (PUCCH) resource for the UCI overlaps in time with the PUSCH resource; and a coreset group index associated with the PUCCH resource is the same as the first coreset group index.

According to an example embodiment, a wireless device may receive one or more radio resource control (RRC) messages. The one or more RRC messages may comprise configuration parameters for a configured uplink grant. The one or more RRC messages may comprise a first control resource set (coreset) group index associated with the configured uplink grant. According to an example embodiment, the wireless device may determine to multiplex an uplink control information (UCI) with a resource of the configured uplink grant based on the first coreset group index. According to an example embodiment, the wireless device may transmit the UCI via the resource.

According to an example embodiment, a wireless device may receive one or more radio resource control (RRC) messages. The one or more RRC messages may comprise a first control resource set (coreset) group index associated with a configured uplink grant. According to an example embodiment, a wireless device may transmit an uplink control information (UCI) via a resource of the configured uplink grant based on the first coreset group index.

According to an example embodiment, a wireless device may receive one or more radio resource control (RRC) messages. The one or more RRC messages may comprise configuration parameters for a configured uplink grant. The one or more RRC messages may comprise a first control resource set (coreset) group index associated with the configured uplink grant. According to an example embodiment, a wireless device may transmit, via a resource of the configured uplink grant, a transport block based on the first coreset group index.

According to an example embodiment, a wireless device may receive one or more radio resource control (RRC) messages. The one or more RRC messages may comprise configuration parameters for a configured uplink grant. The one or more RRC messages may comprise a first control resource set (coreset) group index of the configured uplink grant. According to an example embodiment, a wireless device may transmit, via a resource of the configured uplink grant, a transport block based on the first coreset group index.

According to an example embodiment, a wireless device may receive one or more radio resource control (RRC) messages. The one or more RRC messages may comprise configuration parameters for a configured uplink grant. The one or more RRC messages may comprise a first control resource set (coreset) group index of the configured uplink grant. According to an example embodiment, a wireless device may transmit, via a resource of the configured uplink grant, an uplink control information based on the first coreset group index.

According to an example embodiment, a wireless device may receive one or more radio resource control (RRC) messages. The one or more RRC messages may comprise a first control resource set (coreset) group index associated with a configured uplink grant. According to an example embodiment, a wireless device may transmit an uplink control information (UCI) via a resource of the configured uplink grant based on the first coreset group index.

According to an example embodiment, the configured uplink grant may be of Type 1. According to an example embodiment, the one or more RRC messages may comprise configuration parameters for the configured uplink grant of Type 1. According to an example embodiment, the resource may be a physical uplink shared channel (PUSCH) resource. According to an example embodiment, the wireless device may determine that a physical uplink control channel (PUCCH) resource for the UCI overlaps in time with the PUSCH resource for the configured uplink grant; and a coreset group index associated with the PUCCH resource is the same as the first coreset group index. According to an example embodiment, the transmitting the UCI based on the first coreset group index may comprise multiplexing the UCI in the PUSCH resource based on the determining; and transmitting the UCI via the PUSCH resource.

According to an example embodiment, a wireless device may receive a downlink control information (DCI) in a control resource set (coreset) with a first coreset group index. According to an example embodiment, the DCI may schedule transmission of a transport block via a physical uplink shared channel (PUSCH) resource. According to an example embodiment, the wireless device may determine that a physical uplink control channel (PUCCH) resource for an uplink control information (UCI) overlaps in time with the PUSCH resource of the transport block. According to an example embodiment, the wireless device may determine that a coreset group index associated with the PUCCH resource is the same as the first coreset group index. According to an example embodiment, based on the determining that the PUCCH resource overlaps in time with the PUSCH resource and the coreset group index is the same as the first coreset group index, the wireless device may multiplex the UCI in the PUSCH resource. According to an example embodiment, the wireless device may transmit the UCI via the PUSCH resource.

According to an example embodiment, the wireless device may receive a second DCI in a second coreset with a second coreset group index. According to an example embodiment, the second DCI may schedule transmission of a second transport block via a second PUSCH resource. According to an example embodiment, the wireless device may transmit a second UCI via a second PUCCH resource based on determining that the second PUCCH resource for the second UCI overlaps in time with the second PUSCH resource for the second transport block; and a coreset group index associated with the second PUCCH resource is different from the second coreset group index. According to an example embodiment, the wireless device may not multiplex the second UCI in the second PUSCH resource.

According to an example embodiment, the PUCCH resource being associated with the coreset group index may comprise receiving, via a coreset with the coreset group index, a second DCI. The second DCI may schedule a physical downlink shared channel (PDSCH). The second DCI may indicate the PUCCH resource for transmission of the UCI of the PDSCH.

According to an example embodiment, the wireless device may receive one or more radio resource control (RRC) messages comprising configuration parameters. According to an example embodiment, the configuration parameters may indicate the coreset group index for the PUCCH resource. According to an example embodiment, the configuration parameters may indicate the coreset group index for the coreset.

According to an example embodiment, a wireless device may receive one or more radio resource control (RRC) messages. The one or more RRC messages may comprise configuration parameters for a configured uplink grant. The one or more RRC messages may comprise a first control resource set (coreset) group index associated with the configured uplink grant. According to an example embodiment, based on a physical uplink control channel (PUCCH) resource for an uplink control information (UCI) overlapping in time with a physical uplink shared channel (PUSCH) resource for the configured uplink grant, the wireless device may determine whether a coreset group index associated with the PUCCH resource is the same as the first coreset group index. According to an example embodiment, the wireless device may multiplex the UCI in the PUSCH resource based on the determining that the coreset group index and the first coreset group index are the same. According to an example embodiment, the wireless device may transmit the UCI via the PUSCH resource.

According to an example embodiment, a wireless device may determine that a physical uplink control channel (PUCCH) resource for an uplink control information (UCI) overlaps in time with a first physical uplink shared channel (PUSCH) resource; and a second PUSCH resource. The PUCCH resource may be associated with a first coreset group index. The first PUSCH resource may be associated with a second coreset group index. The second PUSCH resource may be associated with a third coreset group index. According to an example embodiment, the wireless device may select a selected PUSCH resource among the first PUSCH resource and the second PUSCH resource based on the first coreset group index, the second coreset group index and the third coreset group index. According to an example embodiment, the wireless device may multiplex the UCI in the selected PUSCH resource. According to an example embodiment, the wireless device may transmit the UCI via the selected PUSCH resource.

According to an example embodiment, the selecting the selected PUSCH resource based on the first coreset group index, the second coreset group index and the third coreset group index may comprise selecting the selected PUSCH resource associated with a coreset group index that is same as the first coreset group index. According to an example embodiment, the wireless device may select the first PUSCH resource as the selected PUSCH resource based on the first coreset group index and the second coreset group index being the same; and the first coreset group index and the third coreset group index being different. According to an example embodiment, the wireless device may select the second PUSCH resource as the selected PUSCH resource based on the first coreset group index and the third coreset group index being the same; and the first coreset group index and the second coreset group index being different.

According to an example embodiment, the PUCCH resource being associated with the first coreset group index may comprise receiving, via a first coreset with the first coreset group index, a downlink control information (DCI). The DCI may schedule a physical downlink shared channel (PDSCH). The DCI may indicate the PUCCH resource for transmission of the UCI of the PDSCH.

According to an example embodiment, the first PUSCH resource associated with the second coreset group index may comprise receiving, via a second coreset with the second coreset group index, a second DCI. The second DCI may schedule a first transport block via the first PUSCH resource. According to an example embodiment, the second PUSCH resource associated with the third coreset group index may comprise receiving, via a third coreset with the third coreset group index, a third DCI. The third DCI may schedule a second transport block via the second PUSCH resource. According to an example embodiment, the second coreset may be identified with a first coreset index. According to an example embodiment, the third coreset may be identified with a second coreset index. According to an example embodiment, the selecting the selected PUSCH resource may be further based on the first coreset index and the second coreset index. According to an example embodiment, the selecting the selected PUSCH resource based on the first coreset index and the second coreset index may comprise selecting the first PUSCH resource as the selected PUSCH resource based on the first coreset index being higher or lower than the second coreset index.

According to an example embodiment, the wireless device may receive one or more messages comprising one or more configuration parameters. The one or more configuration parameters may indicate the second coreset group index for a first configured uplink grant. According to an example embodiment, the one or more configuration parameters may indicate the third coreset group index for a second configured uplink grant. According to an example embodiment, the first PUSCH resource associated with the second coreset group index may comprise transmitting a first transport block via the first PUSCH resource of the first configured uplink grant. According to an example embodiment, the second PUSCH resource associated with the third coreset group index may comprise transmitting a second transport block via the second PUSCH resource of the second configured uplink grant.

According to an example embodiment, the wireless device may transmit the UCI is based on the multiplexing the UCI in the selected PUSCH resource.

According to an example embodiment, the wireless device may transmit a first transport block via the first PUSCH resource of a first cell identified with a first cell index. According to an example embodiment, the wireless device may transmit a second transport block via the second PUSCH resource of a second cell identified with a second cell index. According to an example embodiment, the selecting the selected PUSCH resource may be further based on the first cell index and the second cell index. According to an example embodiment, the selecting the selected PUSCH resource based on the first cell index and the second cell index may comprise selecting the first PUSCH resource as the selected PUSCH based on the first cell index being lower or higher than the second cell index.

According to an example embodiment, the first PUSCH resource may comprise a first time resource. According to an example embodiment, the second PUSCH resource may comprise a second time resource. According to an example embodiment, the selecting the selected PUSCH resource may be further based on the first time resource and the second time resource. According to an example embodiment, the selecting the selected PUSCH resource based on the first time resource and the second time resource may comprise selecting the first PUSCH resource as the selected PUSCH resource based on the first time resource being earlier or later in time than the second time resource.

According to an example embodiment, the first PUSCH resource may comprise a first frequency resource. According to an example embodiment, the second PUSCH resource may comprise a second frequency resource. According to an example embodiment, the selecting the selected PUSCH resource may be further based on the first frequency resource and the second frequency resource. According to an example embodiment, the selecting the selected PUSCH resource based on the first frequency resource and the second frequency resource may comprise selecting the first PUSCH resource as the selected PUSCH resource based on the first frequency resource being higher or lower in frequency than the second frequency resource.

According to an example embodiment, the wireless device may transmit a first transport block via the first PUSCH resource with a first antenna panel identified with a first antenna panel index. According to an example embodiment, the wireless device may transmit a second transport block via the second PUSCH resource with a second antenna panel identified with a second antenna panel index. According to an example embodiment, the selecting the selected PUSCH resource may be further based on the first antenna panel index and the second antenna panel index. According to an example embodiment, the selecting the selected PUSCH resource based on the first antenna panel index and the second antenna panel index may comprise selecting the first PUSCH resource as the selected PUSCH resource based on the first antenna panel index being higher or lower than the second antenna panel index.

According to an example embodiment, the selecting the selected PUSCH resource may be further based on a first duration of the first PUSCH resource and a second duration of the second PUSCH resource. According to an example embodiment, the selecting the selected PUSCH resource based on the first duration and the second duration may comprise selecting the first PUSCH resource as the selected PUSCH resource based on the first duration being longer or shorter in time than the second duration.

According to an example embodiment, the selecting the selected PUSCH resource may be further based on a first service type of the first PUSCH resource and a second service type of the second PUSCH resource. According to an example embodiment, the selecting the selected PUSCH resource being based on the first service type and the second service type may comprise selecting the first PUSCH resource as the selected PUSCH resource based on the first service type having a higher or lower priority than the second service type. According to an example embodiment, the first service type may be enhanced Mobile Broadband (eMBB). According to an example embodiment, the first service type may be Ultra Reliable Low Latency Communications (uRLLC). According to an example embodiment, the first service type may be massive Machine Type Communications (mMTC).

According to an example embodiment, a wireless device may receive, via a first control resource set (coreset) with a first coreset group index, a downlink control information (DCI). The DCI may schedule a physical downlink shared channel (PDSCH). According to an example embodiment, the wireless device may determine that the PDSCH overlaps in time with a second coreset with a second coreset group index and a third coreset with a third coreset group index. According to an example embodiment, in response to the determining that the PDSCH overlaps in time with the second coreset and the third coreset, the wireless device may select a selected coreset among the second coreset and the third coreset based on the first coreset group index, the second coreset group index and the third coreset group index. According to an example embodiment, the wireless device may receive the PDSCH based on a reference signal associated with the selected coreset.

According to an example embodiment, the selecting the selected coreset may comprise selecting a selected coreset with a selected coreset group index that is the same as the first coreset group index. According to an example embodiment, the selected coreset may be the second coreset based on the second coreset group index and the first coreset group index being the same; and the third coreset group index and the first coreset group index being different. According to an example embodiment, the selected coreset may be the third coreset based on the third coreset group index and the first coreset group index being the same; and the second coreset group index and the first coreset group index being different.

According to an example embodiment, a base station may transmit one or more radio resource control (RRC) messages. The one or more RRC messages may comprise configuration parameters for a configured uplink grant. The one or more RRC messages may comprise a first coreset group index associated with the configured uplink grant. According to an example embodiment, the base station may determine that a physical uplink control channel (PUCCH) resource for an uplink control information (UCI) overlaps in time with a physical uplink shared channel (PUSCH) resource for the configured uplink grant. According to an example embodiment, the base station may determine that a coreset group index associated with the PUCCH resource is the same as the first coreset group index. According to an example embodiment, based on determining that the PUCCH resource overlaps in time with the PUSCH resource and the coreset group index is the same as the first coreset group index, the base station may receive the UCI via the PUSCH resource of the configured uplink grant.

According to an example embodiment, a base station may transmit one or more radio resource control (RRC) messages. The one or more RRC messages may comprise a first coreset group index associated with a configured uplink grant. According to an example embodiment, based on the first coreset group index, the base station may receive an uplink control information (UCI) via a resource of the configured uplink grant.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like.

There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
receiving, by a wireless device and via a first control resource set (coreset) with a first coreset group index, downlink control information (DCI) scheduling a physical downlink shared channel (PDSCH) transmission;
determining that:
a first quasi co-location (QCL) of the PDSCH transmission is different from a second QCL of a second coreset that overlaps in at least one symbol with the PDSCH transmission; and
the first coreset group index is the same as a second coreset group index of the second coreset; and
based on the determining, receiving the PDSCH transmission with the second QCL of the second coreset.

2. The method of claim 1, wherein a time offset between the DCI and the PDSCH transmission is less than a threshold.

3. The method of claim 2, further comprising transmitting, to a base station, a user equipment (UE) capability information indicating the threshold.

4. The method of claim 1, further comprising receiving one or more messages comprising one or more configuration parameters indicating:
the first coreset group index for the first coreset; and
the second coreset group index for the second coreset.

5. The method of claim 1, further comprising determining the first QCL of the PDSCH transmission based on a QCL of a coreset with a lowest coreset index.

6. The method of claim 5, wherein the determining the first QCL based on the QCL of the coreset is in response to a time offset, between the DCI and the PDSCH transmission, being less than a threshold.

7. The method of claim 1, further comprising determining the first QCL based on the first coreset in response to a time offset, between the DCI and the PDSCH transmission, being equal to or greater than a threshold.

8. The method of claim 1, wherein the receiving the PDSCH transmission with the second QCL comprises at least one demodulation reference signal (DMRS) of the PDSCH transmission is quasi co-located with a reference signal indicated by the second QCL.

9. The method of claim 8, further comprising monitoring a physical downlink control channel (PDCCH) transmission in the second coreset based on the second QCL, wherein:
at least one DMRS antenna port of the PDCCH transmission in the second coreset is quasi co-located with the reference signal.

10. The method of claim 1, wherein the first QCL is different from the second QCL based on a first reference signal indicated by the first QCL not being quasi co-located with a second reference signal indicated by the second QCL.

11. A wireless device comprising:
one or more processors; and
memory storing instructions that, when executed by the one or more processors, cause the wireless device to:
receive, via a first control resource set (coreset) with a first coreset group index, downlink control information (DCI) scheduling a physical downlink shared channel (PDSCH) transmission;
determine that:
a first quasi co-location (QCL) of the PDSCH transmission is different from a second QCL of a second coreset that overlaps in at least one symbol with the PDSCH transmission; and
the first coreset group index is the same as a second coreset group index of the second coreset; and
based on the determining, receive the PDSCH transmission with the second QCL of the second coreset.

12. The wireless device of claim 11, wherein a time offset between the DCI and the PDSCH transmission is less than a threshold.

13. The wireless device of claim 12, wherein the instructions, when executed by the one or more processors, further cause the wireless device to transmit, to a base station, a user equipment (UE) capability information indicating the threshold.

14. The wireless device of claim 11, wherein the instructions, when executed by the one or more processors, further cause the wireless device to receive one or more messages comprising one or more configuration parameters indicating:
the first coreset group index for the first coreset; and
the second coreset group index for the second coreset.

15. The wireless device of claim 11, wherein the instructions, when executed by the one or more processors, further cause the wireless device to determine the first QCL of the PDSCH transmission based on a QCL of a coreset with a lowest coreset index.

16. The wireless device of claim 15, wherein the determining the first QCL based on the QCL of the coreset is in response to a time offset, between the DCI and the PDSCH transmission, being less than a threshold.

17. The wireless device of claim 11, wherein the instructions, when executed by the one or more processors, further cause the wireless device to determine the first QCL based on the first coreset in response to a time offset, between the DCI and the PDSCH transmission, being greater than a threshold.

18. The wireless device of claim 11, wherein the receiving the PDSCH transmission with the second QCL comprises at least one demodulation reference signal (DMRS) of the PDSCH transmission is quasi co-located with a reference signal indicated by the second QCL.

19. The wireless device of claim 11, wherein the first QCL is different from the second QCL based on a first reference signal indicated by the first QCL not being quasi co-located with a second reference signal indicated by the second QCL.

20. A system comprising:
a base station comprising one or more first processors and memory storing instructions that, when executed by the one or more first processors, cause the base station to:
transmit, by a base station to a wireless device and via a first control resource set (coreset) with a first coreset group index, downlink control information (DCI) scheduling a physical downlink shared channel (PDSCH) transmission; and
transmit the PDSCH transmission; and
a wireless device comprising one or more second processors and memory storing instructions that, when executed by the one or more second processors, cause the wireless device to:
receive, via the first coreset with the first coreset group index, the DCI scheduling the PDSCH transmission;
determine that:
   a first quasi co-location (QCL) of the PDSCH transmission is different from a second QCL of a second coreset that overlaps in at least one symbol with the PDSCH transmission; and
   the first coreset group index is the same as a second coreset group index of the second coreset; and
based on the determining, receive the PDSCH transmission with the second QCL of the second coreset.

* * * * *